us012540365B2

United States Patent
Li et al.

(10) Patent No.: US 12,540,365 B2
(45) Date of Patent: Feb. 3, 2026

(54) LOW-CARBON, LOW-ALLOY AND HIGH-FORMABILITY DUAL-PHASE STEEL HAVING TENSILE STRENGTH OF GREATER THAN OR EQUAL TO 590 MPA, HOT-DIP GALVANIZED DUAL-PHASE STEEL, AND MANUFACTURING METHOD THEREFOR

(71) Applicant: BAOSHAN IRON & STEEL CO., LTD., Shanghai (CN)

(72) Inventors: Jun Li, Shanghai (CN); Jian Wang, Shanghai (CN); Junfei Wang, Shanghai (CN); Chao Wang, Shanghai (CN); Baoping Zhang, Shanghai (CN); Huafei Liu, Shanghai (CN); Jingge Dai, Shanghai (CN); Yimin Liu, Shanghai (CN); Fengzhi Lu, Shanghai (CN); Honglin Yang, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 73 days.

(21) Appl. No.: 18/552,929

(22) PCT Filed: Mar. 31, 2022

(86) PCT No.: PCT/CN2022/084537
§ 371 (c)(1),
(2) Date: Sep. 28, 2023

(87) PCT Pub. No.: WO2022/206915
PCT Pub. Date: Oct. 6, 2022

(65) Prior Publication Data
US 2025/0084500 A1    Mar. 13, 2025

(30) Foreign Application Priority Data

Apr. 2, 2021  (CN) .......................... 202110360130.6
Apr. 2, 2021  (CN) .......................... 202110360135.9
(Continued)

(51) Int. Cl.
*B32B 15/01*        (2006.01)
*C21D 1/18*         (2006.01)
(Continued)

(52) U.S. Cl.
CPC .......... *C21D 9/0081* (2013.01); *B32B 15/013* (2013.01); *C21D 1/18* (2013.01);
(Continued)

(58) Field of Classification Search
None
See application file for complete search history.

(56) References Cited

U.S. PATENT DOCUMENTS

2014/0141279 A1    5/2014    Jamwal et al.

FOREIGN PATENT DOCUMENTS

CN      1782116 A     6/2006
CN    102433509 A     5/2012
(Continued)

OTHER PUBLICATIONS

International Search Report for PCT/CN2022/084537 dated Jun. 29, 2022.
(Continued)

*Primary Examiner* — Daniel J. Schleis
(74) *Attorney, Agent, or Firm* — Lei Fang, Esq.; Smith Tempel Blaha LLC

(57) ABSTRACT

A low-carbon, low-alloy and high-formability dual-phase steel having a tensile strength of greater than or equal to 590 MPa, a hot-dip galvanized dual-phase steel, and a manufac-
(Continued)

turing method therefor. The steel comprises the following components, in percentage by mass: 0.04-0.12% of C, 0.1-0.5% of Si, 1.0-2.0% of Mn, P≤0.02%, S≤0.015%, 0.02-0.06% of Al, and can further comprise one or two of Cr, Mo, Ti, Nb and V, wherein Cr+Mo+Ti+Nb+V≤0.5%, and the balance is Fe and other unavoidable impurities. The manufacturing method includes smelting, casting, hot rolling, cold rolling, and rapid heat treatment processes. With the present invention, the recovery of a deformed structure, recrystallization and austenite transformation processes are changed, the nucleation rate is increased, the grain growth time is shortened, grains are refined, the strength and n value of the material are improved, and the interval range of the material performance is expanded.

19 Claims, 9 Drawing Sheets

(30) Foreign Application Priority Data

Apr. 2, 2021 (CN) .......................... 202110360526.0
Apr. 2, 2021 (CN) .......................... 202110360561.2

(51) Int. Cl.

| | |
|---|---|
| C21D 6/00 | (2006.01) |
| C21D 8/02 | (2006.01) |
| C21D 9/00 | (2006.01) |
| C22C 38/00 | (2006.01) |
| C22C 38/02 | (2006.01) |
| C22C 38/04 | (2006.01) |
| C22C 38/06 | (2006.01) |
| C22C 38/12 | (2006.01) |
| C22C 38/14 | (2006.01) |
| C22C 38/24 | (2006.01) |
| C22C 38/26 | (2006.01) |
| C22C 38/28 | (2006.01) |
| C22C 38/38 | (2006.01) |
| C23C 2/02 | (2006.01) |
| C23C 2/06 | (2006.01) |
| C23C 2/28 | (2006.01) |
| C23C 2/40 | (2006.01) |

(52) U.S. Cl.
CPC ............. *C21D 6/002* (2013.01); *C21D 6/005* (2013.01); *C21D 6/008* (2013.01); *C21D 8/0205* (2013.01); *C21D 8/0226* (2013.01); *C21D 8/0236* (2013.01); *C21D 8/0263* (2013.01); *C21D 8/0278* (2013.01); *C22C 38/002* (2013.01); *C22C 38/02* (2013.01); *C22C 38/04* (2013.01); *C22C 38/06* (2013.01); *C22C 38/12* (2013.01); *C22C 38/14* (2013.01); *C22C 38/24* (2013.01); *C22C 38/26* (2013.01); *C22C 38/28* (2013.01); *C22C 38/38* (2013.01); *C23C 2/0224* (2022.08); *C23C 2/06* (2013.01); *C23C 2/285* (2013.01); *C23C 2/29* (2022.08); *C23C 2/40* (2013.01); *B32B 2311/20* (2013.01); *C21D 2211/005* (2013.01); *C21D 2211/008* (2013.01)

(56) References Cited

FOREIGN PATENT DOCUMENTS

| | | | |
|---|---|---|---|
| CN | 102492823 | A | 6/2012 |
| CN | 102517496 | A | 6/2012 |
| CN | 102605240 | A | 7/2012 |
| CN | 105603325 | A | 5/2016 |
| CN | 106399857 | A | 2/2017 |
| CN | 107502819 | A | 12/2017 |
| CN | 106011643 | B | 5/2018 |
| CN | 108517466 | A * | 9/2018 |
| CN | 109097705 | A | 12/2018 |
| CN | 109161805 | A | 1/2019 |
| CN | 110578093 | A | 12/2019 |
| EP | 2811047 | A1 | 12/2014 |
| JP | 2004250774 | A | 9/2004 |
| JP | 2010126747 | A | 6/2010 |
| JP | 201377673 | A | 9/2013 |
| WO | 2004048634 | A1 | 6/2004 |
| WO | 2018147211 | A1 | 2/2019 |
| WO | 2020103927 | A1 | 5/2020 |

OTHER PUBLICATIONS

International Written Opinion for PCT/CN2022/084537 dated Jun. 29, 2022.
The Extended EP search report dated Jun. 9, 2024 for EP App No. 22779095.3.
JP OA dated Dec. 3, 2024 for JP App No. 585155.

* cited by examiner

LOW-CARBON, LOW-ALLOY AND HIGH-FORMABILITY DUAL-PHASE STEEL HAVING TENSILE STRENGTH OF GREATER THAN OR EQUAL TO 590 MPA, HOT-DIP GALVANIZED DUAL-PHASE STEEL, AND MANUFACTURING METHOD THEREFOR

CROSS-REFERENCE TO RELATED APPLICATIONS

This application is a 371 U.S. National Phase of PCT International Application No. PCT/CN2022/084537 filed on Mar. 31, 2022, which claims benefit and priority to Chinese patent application Nos. CN202110360135.9; CN202110360561.2; CN202110360130.6; and CN202110360526.0, respectively, each of which was filed on Apr. 2, 2021, the contents of each of the above listed applications are incorporated by reference herein in their entireties.

TECHNICAL FIELD

The present disclosure relates to the field of rapid heat treatment of materials, and in particular relates to a low carbon low alloy dual-phase steel with high formability and hot-galvanized dual-phase steel with high formability having a tensile strength≥590 MPa and a manufacturing method for the same by rapid heat treatment.

BACKGROUND ART

With the gradual improvement of people's awareness of energy conservation and material service safety, many car manufacturers choose high-strength steel as automotive materials. The use of high-strength steel plate in automotive industry can reduce the thickness of the steel plate and improve dent resistance, durable strength, large deformation impact toughness and collision safety of the automobiles at the same time. Therefore, the automotive steel plate will inevitably develop in the direction of high strength, high toughness and easy forming.

Among the high-strength steels used in automobiles, dual-phase steels are the most widely used and have the best application prospects. Low-carbon low-alloy dual phase steel has the characteristics of small yield ratio, high initial work hardening rate and good matching of strength and plasticity, and has become widely used steel for stamping automotive structures with high strength and good formability.

Traditional dual-phase steel is obtained from cold rolled low carbon steel or low alloy high strength steel by rapid cooling treatment after soaking annealing in critical zone or controlled rolling and cooling of hot rolling, and its microstructure is mainly of ferrite and martensite. Dual-phase steels use the principle of "composite materials" to maximize the advantages of each phase (ferrite and martensite) in steel, while reducing or eliminating the drawbacks of one phase due to the presence of other phases.

The mechanical properties of dual-phase steel mainly depend on the following three aspects:
1. The grain size of the matrix phase and the distribution of alloying elements;
2. The size, shape, distribution and volume fraction of the second phase;
3. The characteristics of the combination of the matrix and the second phase.

Therefore, how to obtain low-cost, high-performance dual-phase steel products with good matching of strength and plasticity has become the goal pursued by major steel companies, and has been widely concerned by steel companies and automobile users.

Cold-rolled dual-phase steel is obtained by a rapid cooling process after soaking at the critical zone temperature, wherein the process mainly comprises three steps:
Step 1: heating the strip steel to the critical zone temperature of ferrite and austenite for soaking and heat preservation;
Step 2: cooling the sample to a certain temperature between $M_s$~$M_f$ at a cooling rate higher than the critical cooling rate to obtain a certain amount of dual-phase structure of martensite and ferrite;
Step 3: heat preserving or heating the strip steel to a temperature not higher than $M_s$ for tempering to obtain a good microstructure matching of hard martensite and soft ferrite, and finally obtaining the dual-phase structure of martensite and ferrite.

At present, 590 MPa grade cold-rolled dual-phase steel produced by traditional continuous annealing process has a relatively long heating time and soaking time due to its slow heating rate. The entire continuous annealing period takes 5-8 min. The recrystallization and phase transition in the heating process are carried out sequentially, and generally do not overlap, so the ferrite recrystallization grains and austenite grains are nucleated and fully grown, respectively, and finally the grain size of dual-phase structure of ferrite and martensite is relatively large, usually about 10-20 µm.

The main control means for dual-phase steel in the existing technology is to change the phase structure ratio and distribution of the dual-phase steel by adding alloying elements and adjusting the soaking temperature as well as the temperature and time of quenching and tempering processes in the annealing process, so as to obtain relatively optimized performance of the product.

Chinese patent application CN10961805A discloses "A 590 MPa grade automobile lightweight cold-rolled dual phase steel and a manufacturing method thereof". The steel in this invention comprises the following chemical components in mass percentages: C: 0.06~0.08%, Si: 0.05~0.10%, Mn: 1.7~1.8%, P≤0.01%, S≤0.005%, Al: 0.02~0.05%, Cr: 0.20~0.30% and is obtained by traditional continuous annealing method. The dual phase steel has mechanical properties as follows: a yield strength of 374-406 MPa, a tensile strength of 630-653 MPa, an elongation of 24-26%. The steel contains higher alloy, which increases the cost, while causing difficulties to the manufacturing process, reducing the welding performance of the material and other use performance.

Chinese patent application CN106011643B discloses "Cold-rolled dual phase steel having a tensile strength of 590 MPa grade and a manufacturing method thereof". The steel in this invention comprises the following chemical components in mass percentages: C: 0.06~0.1%, Si: 0.26~0.6%, Mn: 1.2~1.6%, Cr: 0.10~0.45%, Al: 0.02~0.06%, P≤0.02%, S≤0.015%, N≤0.006%, with a balance of Fe and other unavoidable impurities. The method of this invention adopts traditional continuous annealing method and a small amount of Cr element is added instead of Mn element to ensure the hardenability. The dual phase steel has mechanical properties as follows: a yield strength of 290-330 MPa, a tensile strength of 600-650 MPa, an elongation of 23-27%. In this invention, precious metal Cr element is added to reduce the Mn content, which increases the manufacturing cost and difficulty, and the annealing temperature is also higher due to high alloy content.

Chinese patent application CN105543674B discloses "A manufacturing method for cold-rolled ultra-high strength dual-phase steel with high local forming performance", the chemical composition of the inventive high-strength dual-phase steel by weight percentage is: C: 0.08~0.12%, Si: 0.1~0.5%, Mn: 1.5~2.5%, Al: 0.015~0.05%, with a balance of Fe and other unavoidable impurities. The chemical composition is selected as a raw material and smelted into a casting slab. The casting slab is heated at 1150~1250° C. for 1.5~2 hours and then hot rolled. The initial rolling temperature for hot rolling is 1080~1150° C., and the final rolling temperature is 880~930° C. After rolling, the steel is cooled to 450~620° C. at a cooling rate of 50~200° C./s for coiling, to obtain a hot-rolled steel plate with bainite as the main structure. The hot-rolled steel plate is cold-rolled, and then heated to 740~820° C. at a speed of 50~300° C./s for annealing with a holding time of 30 s~3 min, and cooled to 620~680° C. at a cooling rate of 2~6° C./s, and then cooled to 250~350° C. at a cooling rate of 30~100° C./s for over ageing treatment for 3~5 min, thereby obtaining an ultra-high strength dual-phase steel with ferritic+martensitic dual-phase structure. The ultra-high strength dual phase steel has a yield strength of 650~680 MPa, a tensile strength of 1023~1100 MPa, an elongation of 12.3~13%, and it does not crack when bends 180° in the rolling direction.

The most important feature of the patent is the combination of the control of cooling conditions after hot rolling with rapid heating in the continuous annealing process, that is, by controlling the cooling process after hot rolling, the banded structure is eliminated to homogenize the structure; and rapid heating is adopted in the subsequent continuous annealing process to achieve structure refinement on the basis of ensuring structure uniformity. It can be seen that the patented technology adopts rapid heating annealing with a proviso that the hot-rolled raw material with bainite as the main structure is obtained after hot rolling. Its purpose is mainly to ensure the uniformity of the structure and avoid the appearance of banded structure which leads to uneven local deformation.

The main shortcomings of this patent are:
First, to obtain hot-rolled raw materials with bainite structure, the hot-rolled raw materials is required to have high strength and large deformation resistance, which brings great difficulties to the subsequent pickling and cold rolling production;
Second, its understanding of rapid heating is limited to the level of shortening the heating time and refining grains. Its heating rate is not differed according to the changes of material microstructure in different temperature sections. But all are heated at a rate of 50-300° C./s, resulting in an increase in the production cost of rapid heating;
Third, the soaking time is 30 s-3 min. The increase of soaking time will inevitably weaken a part of the refinement grain effect produced by rapid heating, which is not conducive to the improvement of material strength and toughness;
Fourth, it is necessary to carry out 3-5 minutes of over aging treatment in the method and it is actually too long and unnecessary for rapid heat treatment of DP steel. Moreover, the increase of soaking time and over-ageing time is not conducive to saving energy, reducing unit equipment investment and unit floor space, and is not conducive to the stable operation of strip at high-speed in the furnace, which is obviously not a rapid heat treatment process in the strict sense.

Chinese patent application 201711385126.5 discloses "a 780 MPa grade low carbon low alloy TRIP steel". It has a chemical composition by mass percentage of: C: 0.16-0.22%, Si: 1.2-1.6%, Mn: 1.6-2.2%, with a balance of Fe and other unavoidable impurities, which is obtained by the following rapid heat treatment process: the strip steel is rapidly heated from room temperature to 790~830° C. of austenitic and ferritic dual-phase zone with a heating rate of 40~300° C./s. The residence time in the heating target temperature range of the dual-phase zone is 60~100 s. The strip steel is rapidly cooled from the temperature of the dual-phase zone to 410~430° C. at a cooling rate of 40~100° C./s, and held in this temperature range for 200~300 s. The strip steel is quickly cooled to room temperature from 410~430° C. It is characterized in that: the metallographic structure of TRIP steel is a three-phase structure of bainite, ferrite and austenite. The TRIP steel has significantly refined average grain size, a tensile strength of 950~1050 MPa, an elongation of 21~24% and a maximum product of strength and elongation up to 24 GPa %.

The shortcomings of this patent are mainly as follows:
First, the patent discloses a 780 MPa grade low-carbon low-alloy TRIP steel product and its process technology. But the tensile strength of the TRIP steel product is 950~1050 MPa, which is too high for a 780 MPa grade product since its use effect by the users may be not good, and too low for a 980 MPa grade product since it cannot well meet the user's strength requirements;
Second, the patent adopts one-stage rapid heating, and the same rapid heating rate is adopted in the entire heating temperature range, which is not treated differently according to the requirement of material structure changes in different temperature sections. All heated rapidly at a rate of 40~300° C./s will inevitably lead to an increase in the production cost of the rapid heating process;
Third, the soaking time in the patent is set at 60~100 s, which is similar to the soaking time of the traditional continuous annealing, and the increase of the soaking time inevitably partially weakens the refinement grain effect produced by rapid heating and is very unfavorable to the improvement of material strength and toughness;
Fourth, it is required to perform bainite isothermal treatment for 200~300 s in this patent, which is actually too long and unnecessary for rapid heat treatment products since it does not work as it should. Moreover, the increase of soaking time and isothermal treatment time is not conducive to saving energy, reducing unit equipment investment and unit floor space, and is not conducive to the stable operation of strip steel at high-speed in the furnace, which is obviously not a rapid heat treatment process in the strict sense.

Chinese patent application CN108774681A discloses "a rapid heat treatment method of high-strength steel", which uses ceramic sheet electric heating device to obtain a maximum heating rate of 400° C./s, and adopts a fan for air cooling after heating to 1000~1200° C. It is cooled to room temperature at a maximum cooling rate of nearly 3000° C./s. In the inventive method, the heat treatment device using ceramic sheet electric heating has a processing speed of 50 cm/min. The inventive steel is characterized in that it has a carbon content as high as 0.16~0.55%, and also comprises Si, Mn, Cr, Mo and other alloying elements. This method is mainly suitable for steel wire, wire rod or steel strip below 5 mm. The patent describes a rapid heat treatment method by ceramic sheet electrical heating. The main purpose of the invention is to solve the problems of low heat treatment efficiency, waste of energy and environmental pollution of products such as high-strength steel wire and wire rod. The influence and effect of rapid heating on the microstructure and properties of materials are not mentioned. The invention does not combine the composition and microstructure characteristics of steel grades. The use of fan blowing air cooling provides a maximum cooling rate close to 3000° C./s, which should refer to the instantaneous cooling rate of the high temperature section, and it is well-known that the average cooling rate is impossible to reach 3000° C./s. At the same time, the use of too high cooling rate in the high temperature section to produce wide and thin strip steel will lead to problems such as excessive internal stress and poor steel plate shape, and it is not suitable for large-scale industrial continuous heat treatment production of wide and thin steel plate.

Chinese patent application CN106811698B discloses "A high-strength steel plate based on fine microstructure control and a manufacturing method thereof". The high-strength dual-phase steel has a chemical composition by weight percentage of: C: 0.08~0.40%, Si: 0.35~3.5%, Mn: 1.5~7.0%, P≤0.02%, S≤0.02%, Al: 0.02~3.0% and also comprises at least one of Cr: 0.50~1.5%, Mo: 0.25~0.60%, Ni: 0.5~2.5%, Cu: 0.20~0.50%, B: 0.001~0.005%, V: 0.10~0.5%, Ti: 0.02~0.20%, Nb: 0.02~0.20%, with a balance of Fe and other unavoidable impurities. Its mechanical properties are as follows: a tensile strength Rm is greater than 1000 MPa, an elongation $A_{50\ mm}$ is greater than 28%. The content of the components C, Si and Mn of the invention is relatively high, and the steel strips with different components are recrystallized and annealed by removing the soaking and heat preservation section, i.e., performing soaking-free annealing on the traditional continuous annealing production line. The specific annealing parameter range is as follows: after rapid heating to 800~930° C. at a rate of no less than 20° C./s, it is immediately cooled to the $M_s$~$M_f$ point at a cooling rate of no less than 40° C./s, and then heated to $M_f$~$M_f$ point+100° C. and held for 30 s to 30 min, and finally cooled to room temperature.

The main feature of the invention is characterized in that by controlling the morphology and structure of martensite strengthening phase, a fine martensite structure with fine needles and short rods is obtained, and by reheating to diffuse C atom into the residual austenite, a relatively stable residual austenite is obtained, so that it has a certain deformation ability, thereby improving plasticity and toughness of the high-strength steel.

The so-called rapid heating of the invention actually uses low heating rate, which is 20~60° C./s and belongs to the medium heating rate, and a cooling rate of 40~100° C./s. Its consideration of rapid heating, rapid cooling and omitting the soaking section is to shorten the residence time of high-strength steel in the high temperature section, ensure that the grains of steel are fine and the structure and chemical composition are not completely homogenized during the austenitization process, so as to ensure that plenty of large-size slat-like martensite is not generated after cooling, and a certain amount of membranous residual austenite structure is obtained at the same time. However, this inevitably leads to the difficulty in controlling the heating temperature, and the fluctuation of the structure and performance increases.

The method is still based on the heating technology and cooling technology of the existing traditional continuous annealing unit. By omitting the soaking section (shortening the soaking time to 0), increasing the alloy content and performing quenching and tempering treatment, the high-strength steel product with a certain matching of strength and toughness is finally obtained. It has not been specifically developed for each strength grade of steel grade in this invention. Moreover, the heating rate is a medium heating rate. It does not belong to rapid heating and there is no soaking time. It does not reflect a true rapid heat treatment method and a complete annealing cycle. Therefore, there is no prospect of commercial application.

Chinese patent application CN107794357B and US patent application US2019/0153558A1 disclose "A method for producing ultra-high strength martensitic cold-rolled steel plate by ultra-fast heating process". The high-strength dual-phase steel has a chemical composition by weight percentage of: C: 0.10~0.30%, Mn: 0.5~2.5%, Si: 0.05~0.3%, Mo: 0.05~0.3%, Ti: 0.01~0.04%, Cr: 0.10~0.3%, B: 0.001~0.004%, P≤0.02%, S≤0.02%, with a balance of Fe and other unavoidable impurities. Its mechanical properties of the dual-phase steel are as follows: a yield strength $Rp_{0.2}$ of greater than 1100 MPa, a tensile strength $R_m$=1800-2300 MPa, a maximum elongation of 12.3%, and a uniform elongation of 5.5~6%. The invention provides an ultra-rapid heating production process for ultra-high-strength martensitic cold-rolled steel plate, which comprises process characteristics of first heating the cold-rolled steel plate to 300~500° C. at 1~10° C./s, and then reheating it to single-phase austenite zone of 850~950° C. at a heating rate of 100~500° C./s; then immediately water-cooling the steel plate to room temperature after heat preservation for no more than 5 s to obtain an ultra-high strength cold-rolled steel plate.

The deficiencies of the process described in the patent include:

First, the annealing temperature of the inventive steel has entered the ultra-high temperature range of the single-phase austenitic zone, and it also contains more alloying elements and has a yield strength and a tensile strength of more than 1000 MPa. It brings great difficulties to the heat treatment process, the process before heat treatment and subsequent use by users;

Second, the ultra-rapid heating annealing method of the invention adopts a holding time of no more than 5 s, which not only has poor controllability of heating temperature, but also leads to uneven distribution of alloying elements in the final product, resulting in uneven and unstable microstructure properties of the product;

Third, the final fast cooling for cooling to room temperature is performed by water quenching without necessary tempering treatment, so that the microstructure and performance of the final product and the distribution of alloying elements in the final structure cannot provide the product with optimized strength and toughness, resulting in excess strength of the final product, but insufficient plasticity and toughness;

Fourth, the method of the invention will cause problems such as poor steel plate shape and surface oxidation due to high cooling rate of water quenching. Therefore, the patented technology has no or little practical application value.

At present, limited by the equipment capacity of the traditional continuous annealing furnace production line, the research on cold-rolled dual-phase steel products and annealing process is based on that the strip steel is slowly heated at a heating rate (5~20° C./s) of the existing industrial equipment, so that it completes the recovery, recrystallization and austenitization phase transition in sequence. Therefore, the heating time and soaking time are relatively long, energy consumption is high, and the traditional continuous annealing production line also has problems such as long residence time of strip steel in the high-temperature furnace section and a large number of rolls passing through. According to the product outline and capacity requirements, the soaking time of the traditional continuous annealing unit is generally required to be 1~3 min. For the traditional production line with a unit speed of about 180 m/min, the number of rolls in the high-temperature furnace section generally varies from 20 to 40, which increases the difficulty of strip steel surface quality control.

SUMMARY

One object of the present disclosure is to provide a low carbon low alloy dual-phase steel with high formability and hot-galvanized dual-phase steel with high formability having a tensile strength of ≥590 MPa and a manufacturing method for the same by rapid heat treatment. The rapid heat treatment changes the recovery, recrystallization and austenite phase transition process of deformation structure, increases the nucleation rate (including recrystallization nucleation rate and austenitic phase deformation nucleation rate), shortens the grain growth time and refines the grain. The resultant dual-phase steel has a yield strength of ≥340 MPa, a tensile strength of ≥620 MPa, an elongation of ≥19%, a product of strength and elongation of ≥15.5 GPa % and a strain hardening index $n_{90}$ value greater than 0.20. The dual-phase steel has good plasticity and toughness while the strength of the material is improved. The rapid heat treatment process improves production efficiency, reduces production costs and energy consumption, significantly reduces the number of furnace rollers, and improves the surface quality of steel plates.

To achieve the above object, the technical solution of the present disclosure is as follows:

The low carbon low alloy dual-phase steel with high formability having a tensile strength of 590 MPa or the low carbon low alloy hot-galvanized dual-phase steel with high formability having a tensile strength of ≥590 MPa comprises the following chemical components in mass percentages: C: 0.04~0.12%, Si: 0.1~0.5%, Mn: 1.0~2.0%, P≤0.02%, S≤0.015%, Al: 0.02~0.06%, optionally one or more of Cr, Mo, Ti, Nb, V, and Cr+Mo+Ti+Nb+V≤0.5%, with a balance of Fe and other unavoidable impurities.

In some embodiments, in the dual-phase steel with high formability or the hot-galvanized dual-phase steel with high formability, the content of C is 0.045~0.105%, 0.04~0.10% or 0.05~1.2%. In some embodiments, in the dual-phase steel with high formability or the hot-galvanized dual-phase steel with high formability, the content of C is 0.06~0.08%. In some embodiments, in the dual-phase steel with high formability or the hot-galvanized dual-phase steel with high formability, the content of C is 0.065~0.085%. In some embodiments, in the dual-phase steel with high formability or the hot-galvanized dual-phase steel with high formability, the content of C is 0.07~0.1%.

In some embodiments, in the dual-phase steel with high formability or the hot-galvanized dual-phase steel with high formability, the content of Si is 0.1~0.4% or 0.1~0.3%. In some embodiments, in the dual-phase steel with high formability or the hot-galvanized dual-phase steel with high formability, the content of Si is 0.15~0.25%.

In some embodiments, in the dual-phase steel with high formability or the hot-galvanized dual-phase steel with high formability, the content of Mn is 1.0~1.6%, 1.0~1.5% or 1.2~2.0%. In some embodiments, in the dual-phase steel with high formability or the hot-galvanized dual-phase steel with high formability, the content of Mn is 1.2~1.4%. In some embodiments, in the dual-phase steel with high formability or the hot-galvanized dual-phase steel with high formability, the content of Mn is 1.2~1.35%. In some embodiments, in the dual-phase steel with high formability or the hot-galvanized dual-phase steel with high formability, the content of Mn is 1.5~1.8%.

In some embodiments, in the dual-phase steel with high formability or the hot-galvanized dual-phase steel with high formability, Cr+Mo+Ti+Nb+V≤0.3%.

In some embodiments, the low carbon low alloy dual-phase steel with high formability having a tensile strength of ≥590 MPa comprises the following chemical components in mass percentages: C: 0.04~0.105%, Si: 0.1~0.4%, Mn: 1.0~1.6%, P≤0.02%, S≤0.015%, Al: 0.02~0.06%, optionally one or two of Cr, Mo, Ti, Nb, V, and Cr+Mo+Ti+Nb+V≤0.5%, with a balance of Fe and other unavoidable impurities.

In some embodiments, the low carbon low alloy dual-phase steel with high formability having a tensile strength of ≥590 MPa is obtained by the following process:
1) Smelting, casting
    wherein the above components are subjected to smelting and casting to form a slab;
2) hot rolling, coiling
    wherein a hot rolling finishing temperature is ≥$A_{r3}$; and a coiling temperature is 550~680° C.;
3) cold rolling
    wherein a cold rolling reduction rate is 40~85%;
4) Rapid heat treatment
    wherein the steel plate after cold rolling is rapidly heated to 750~845° C., wherein the rapid heating is performed in one stage or two stages; when the rapid heating is performed in one stage, a heating rate is 50~500° C./s; when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s (such as 50~500° C./s); then soaked at a soaking temperature of 750~845° C. for a soaking time of 10~60 s;
    wherein after soaking, the steel plate is slowly cooled to 670~770° C. at a cooling rate of 5~15° C./s, then rapidly cooled from 670~770° C. to room temperature at a cooling rate of 50~200° C./s;
    or the steel plate is rapidly cooled from 670~770° C. to 230~280° C. at a cooling rate of 50~200° C./s, and over-aged in the temperature range, wherein an over-ageing treating time is less than or equal to 200 s; and finally cooled to room temperature at a cooling rate of 30~50° C./s.

Preferably, in step 4), a total time of the rapid heat treatment is 30~300 s. In some embodiments, in step 4), a total time of the rapid heat treatment is 41~300 s. In some embodiments, in step 4), a total time of the rapid heat treatment is 41~296 s.

Preferably, in step 2), the coiling temperature is 580~650° C.

Preferably, in step 3), the cold rolling reduction rate is 60~80%.

Preferably, in step 4), when the rapid heating is performed in one stage, the heating rate is 50~300° C./s.

Preferably, in step 4), the rapid heating is performed in two stages, wherein the steel plate is heated in the first stage from room temperature to 550~650° C. at a heating rate of 15~300° C./s, heated in the second stage from 550~650° C. to 750~845° C. at a heating rate of 50~300° C./s.

Preferably, in step 4), the rapid heating is performed in two stages, wherein the steel plate is heated in the first stage from room temperature to 550~650° C. at a heating rate of 50~300° C./s, heated in the second stage from 550~650° C. to 750-845° C. at a heating rate of 80~300° C./s.

Preferably, in step 4), the soaking time is 10~40 s.

Preferably, in step 4), the rapid cooling rate of the steel plate is 50~150° C./s.

Preferably, the over ageing time is 20~200 s.

The microstructure of the dual-phase steel or hot-galvanized dual-phase steel according to the present disclosure is a dual-phase structure of ferrite and martensite having an average grain size of 2~10 μm. In some embodiments, the microstructure of the dual-phase steel or hot-galvanized dual-phase steel according to the present disclosure is a dual-phase structure of ferrite and martensite having an average grain size of 2~8 μm or 4~10 μm.

In some embodiments, the dual-phase steel or hot-galvanized dual-phase steel according to the present disclosure has a yield strength of 340~560 MPa, a tensile strength of 620~880 MPa, an elongation of 19~30.5%, a product of strength and elongation of 15.5~20.5 GPa % and a strain hardening index $n_{90}$ value greater than 0.20.

In some embodiments, the dual-phase steel according to the present disclosure has a yield strength of 340~410 MPa, a tensile strength of 640~710 MPa, an elongation of 22~30.5%, a product of strength and elongation of 15.5~20.5 GPa % and a strain hardening index $n_{90}$ value greater than 0.20.

In some embodiments, the low carbon low alloy dual-phase steel with high formability having a tensile strength of ≥590 MPa comprises the following chemical components in mass percentages: C: 0.04~0.10%, Si: 0.1~0.3%, Mn: 1.0~1.6%, P≤0.02%, S≤0.015%, Al: 0.02~0.06%, optionally one or two of Cr, Mo, Ti, Nb, V, and Cr+Mo+Ti+Nb+V≤0.5%, with a balance of Fe and other unavoidable impurities. Preferably, the dual-phase steel has a C content of 0.06~0.08%; preferably, the dual-phase steel has a Si content of 0.15~0.25%; preferably, the dual-phase steel has a Mn content of 1.2%~1.4%. Preferably, the microstructure of the dual-phase steel is a dual phase structure of ferrite and martensite having an average grain size of 4~10 μm. Preferably, the dual-phase steel has a yield strength of 350~410 MPa, a tensile strength of 620~710 MPa, an elongation of 24.0~30.5%, a product of strength and elongation of 17~20.5 GPa % and a strain hardening index $n_{90}$ value greater than 0.20. Preferably, the dual-phase steel has a yield strength of 350~405 MPa, a tensile strength of 624~706 MPa, an elongation of 24.4~30.4%, a product of strength and elongation of 17~20.1 GPa % and a strain hardening index $n_{90}$ value greater than 0.20. Preferably, the dual-phase steel is prepared by the process according to any embodiment described herein. Preferably, in the manufacturing process of the dual-phase steel, a total time of the rapid heat treatment in step 4) is 41~300 s.

In some embodiments, the low carbon low alloy dual-phase steel with high formability having a tensile strength of ≥590 MPa comprises the following chemical components in mass percentages: C: 0.05~0.12%, Si: 0.01~0.5%, Mn: 1.2~2.0%, P≤0.015%, S≤0.003%, Al: 0.02~0.055%, optionally one or two of Cr, Mo, Ti, Nb, V, and Cr+Mo+Ti+Nb+V≤0.5%, with a balance of Fe and other unavoidable impurities. Preferably, the dual-phase steel has a tensile strength of ≥780 MPa. Preferably, the dual-phase steel has a C content of 0.07~0.1%; preferably, the dual-phase steel has a Si content of 0.1~0.4%; preferably, the dual-phase steel has a Mn content of 1.5~1.8%. Preferably, the microstructure of the dual-phase steel is a dual phase structure of ferrite and martensite having an average grain size of 2-8 μm. Preferably, the dual-phase steel has a yield strength of 400~540 MPa, a tensile strength of 780~880 MPa, an elongation of 19~24.5%, a product of strength and elongation of 16.0~19.5 GPa % and a strain hardening index $n_{90}$ value greater than 0.20. Preferably, the dual-phase steel has a yield strength of 400~533 MPa, a tensile strength of 781~878 MPa, an elongation of 19.5~24.1%, a product of strength and elongation of 16.3~19.3 GPa % and a strain hardening index $n_{90}$ value greater than 0.20. Preferably, the dual-phase steel is prepared by the process according to any embodiment described herein. Preferably, in the manufacturing process of the dual-phase steel, a total time of the rapid heat treatment in step 4) is 41~296 s.

In some embodiments, the low carbon low alloy dual-phase steel with high formability having a tensile strength of ≥590 MPa comprises the following chemical components in mass percentages: C: 0.045~0.12%, Si: 0.1~0.5%, Mn: 1.0~2.0%, P≤0.02%, S≤0.006%, Al: 0.02~0.055%, optionally one or two of Cr, Mo, Ti, Nb, V, and Cr+Mo+Ti+Nb+V≤0.5%, with a balance of Fe and other unavoidable impurities.

In some embodiments, the dual-phase steel is hot-galvanized dual-phase steel according to any embodiment of the present disclosure. After the end of soaking step and the steel is slowly cooled to 670~770° C., it is rapidly cooled to 460~470° C. at a cooling rate of 50~200° C./s, and then immersed in a zinc pot for hot-dip galvanizing to obtain the hot-dip galvanized dual-phase steel. In some embodiments, after hot-dip galvanizing, it is rapidly cooled to room temperature at a cooling rate of 30~150° C./s to obtain a hot dip galvanized GI product. In some embodiments, after hot-dip galvanizing, it is heated to 480~550° C. at a heating rate of 30~200° C./s for alloying treatment for 10~20 s; after alloying treatment, it is rapidly cooled to room temperature at a cooling rate of 30~250° C./s to obtain an alloy galvannealed GA product.

Preferably, in some embodiments, the hot-galvanized dual-phase steel comprises the following chemical components in mass percentages: C: 0.045~0.105%, Si: 0.1~0.4%, Mn: 1.0~1.5%, P≤0.02%, S≤0.006%, Al: 0.02~0.055%, optionally one or two of Cr, Mo, Ti, Nb, V, and Cr+Mo+Ti+Nb+V≤0.3%, with a balance of Fe and other unavoidable impurities. Preferably, the hot-galvanized dual-phase steel has a C content of 0.065~0.085%; preferably, the hot-galvanized dual-phase steel has a Si content of 0.15~0.25%; preferably, the hot-galvanized dual-phase steel has a Mn content of 1.2%~1.35%. Preferably, in the hot-galvanized dual-phase steel, Cr+Mo+Ti+Nb+V≤0.2%. Preferably, the hot-galvanized dual-phase steel has a yield strength of 340~410 MPa, a tensile strength of 620~710 MPa, an elongation of 22~30.5%, a product of strength and elongation of 15.5~20.0 GPa % and a strain hardening index $n_{90}$ value greater than 0.21, more preferably, the hot-galvanized dual-phase steel has a yield strength of 347~405 MPa, a tensile strength of 624~709 MPa, an elongation of 22.2~30.3%, a product of strength and elongation of 15.7~19.6 GPa % and a strain hardening index $n_{90}$ value greater than 0.21.

Preferably, in some embodiments, the hot-galvanized dual-phase steel comprises the following chemical components in mass percentages: C: 0.05~0.12%, Si: 0.01~0.5%, Mn: 1.2~2.0%, P≤0.015%, S≤0.003%, Al: 0.02~0.055%, optionally one or two of Cr, Mo, Ti, Nb, V, and Cr+Mo+Ti+Nb+V≤0.5%, with a balance of Fe and other unavoidable impurities. Preferably, the hot-galvanized dual-phase steel has a yield strength of ≥780 MPa. Preferably, the hot-galvanized dual-phase steel has a C content of 0.07~0.1%; preferably, the hot-galvanized dual-phase steel has a Si content of 0.1~0.4%; preferably, the hot-galvanized dual-phase steel has a Mn content of 1.5%~1.8%. Preferably, the hot-galvanized dual-phase steel has a yield strength of 400~560 MPa, a tensile strength of 790~870 MPa, an elongation of 19.0~25.0%, a product of strength and elongation of 16.0~20.0 GPa % and a strain hardening index $n_{90}$ value greater than 0.20; more preferably, the hot-galvanized dual-phase steel has a yield strength of 400~552 MPa, a tensile strength of 798~862 MPa, an elongation of 19.5~24.6%, a product of strength and elongation of 16.3~19.9 GPa % and a strain hardening index $n_{90}$ value greater than 0.20.

In some embodiments, the hot-galvanized dual-phase steel with high formability according to the present disclosure is obtained by the following process:
a) Smelting, casting
wherein the above components are subjected to smelting and casting to form a slab;
b) Hot rolling, coiling
wherein a hot rolling finishing temperature is ≥$A_{r3}$; and a coiling temperature is 550~680° C.;
c) Cold rolling
wherein a cold rolling reduction rate is 40~85%;
d) Rapid heat treatment, hot-galvanizing
wherein the steel plate after cold rolling is rapidly heated to 750~845° C., wherein the rapid heating is performed in one stage or two stages;
when the rapid heating is performed in one stage, a heating rate is 50~500° C./s;
when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s (such as 50~500° C./s); then soaked at a soaking temperature of 750~845° C. for a soaking time of 10~60 s;
wherein after soaking, the steel plate is slowly cooled to 670~770° C. at a cooling rate of 5~15° C./s, then rapidly cooled to 460~470° C. at a cooling rate of 50~200° C./s (such as 50~150° C./s), and immersed in a zinc pot for hot galvanizing;
wherein after hot galvanizing, the steel plate is rapidly cooled to room temperature at a cooling rate of 30~150° C./s to obtain a hot dip galvanized GI product; or
after hot galvanizing, the steel plate is heated to 480~550° C. at a heating rate of 30~200° C./s and alloyed for 10~20 s; after alloying, the steel plate is rapidly cooled to room temperature at a cooling rate of 30~250° C./s to obtain an alloy galvannealed GA product.

Preferably, a total time of the rapid heat treatment and hot-galvanizing of step d) is 30~142 s.

Preferably, in step b), the coiling temperature is 580~650° C.

Preferably, in step d), the cold rolling reduction rate is 60~80%.

Preferably, in step d), when the rapid heating is performed in one stage, the heating rate is 50~300° C./s.

Preferably, in step d), the rapid heating is performed in two stages, wherein the steel plate is heated in the first stage from room temperature to 550~650° C. at a heating rate of 15~300° C./s, heated in the second stage from 550~650° C. to 750~845° C. at a heating rate of 50~300° C./s.

Preferably, in step d), the rapid heating is performed in two stages, wherein the steel plate is heated in the first stage from room temperature to 550~650° C. at a heating rate of 30~300° C./s, heated in the second stage from 550~650° C. to 750~845° C. at a heating rate of 80~300° C./s.

The metallographic structure of hot-dip galvanized dual-phase steel of the present disclosure is uniformly distributed ferritic and martensitic dual-phase structure having an average grain size of 1-3 μm.

In the composition and process design of the steel according to the present disclosure:

C: Carbon is the most common strengthening element in steel. Carbon increases the strength of steel and decreases its plasticity. However, forming steels require low yield strength, high uniform elongation and high total elongation. Therefore, the content of C should not be too high. The carbon content has a great influence on the mechanical properties of steel. With the increase of carbon content, the number of pearlite will increase, so that the strength and hardness of steel will be greatly improved, but its plasticity and toughness will be significantly reduced. If the carbon content is too high, obvious network carbides will appear in steel, and the presence of network carbides will significantly reduce its strength, plasticity and toughness. The strengthening effect produced by the increase of carbon content in steel will also be significantly weakened, and the process performance of steel will be deteriorated. Therefore, the carbon content should be reduced as much as possible on the premise of ensuring strength.

For dual-phase steels, carbon mainly affects the volume fraction of austenite formed during annealing. The diffusion process of carbon in austenite or ferrite actually plays a role in controlling the growth of austenite grains during the formation of austenite. With the increase of carbon content or the heating temperature in the critical zone, the volume fraction of austenite increases, thus the martensitic phase structure formed after cooling increases and the strength of the material increases. Comprehensively considering the matching of material strength and toughness, the increase of the strength during the rapid heat treatment, the carbon content of the present disclosure is controlled in the range of 0.04~0.12%.

Mn: Manganese can form a solid solution with iron, thereby improving the strength and hardness of ferrite and austenite in carbon steel, and providing finer pearlite with higher strength in the steel during the cooling process after hot rolling, and the content of pearlite will also increase with the increase of Mn content. Manganese is also a carbide-forming element, and the carbide of manganese can dissolve into the cementite, thereby indirectly enhancing the strength of pearlite. Manganese can also strongly enhance the hardenability of steel, thereby further improving its strength.

For dual-phase steels, manganese is one of the elements that obviously affects the dynamics of austenite formation during annealing in the critical zone. Manganese mainly affects the transition and growth to ferrite after formation of austenite and the final equilibrium process of austenite and ferrite. Since the diffusion rate of manganese in austenite is much slower than its diffusion rate in ferrite, austenite grains controlled by manganese diffusion takes long time to grow and manganese element takes longer time to achieve uniform distribution in austenite. When heated in the critical zone, if the holding time is short, the manganese element cannot achieve uniform distribution in austenite, and then when the cooling rate is insufficient, a uniform martensitic island structure cannot be obtained. In dual-phase steel produced by rapid heating process (such as continuous annealing production line with water quenching), the manganese content is generally high. As a result, austenite has a high manganese content after formation, which ensures the hardenability of the austenitic island, and that a uniform martensitic island structure and relatively uniform performance is obtained after cooling. In addition, manganese expands the γ phase region and reduces the temperature of $A_{C1}$ and $A_{C3}$, so that manganese-containing steel will get a higher martensitic volume fraction than low carbon steel under the same heat treatment conditions. However, when the manganese content is relatively high, there is a tendency to coarsen the grains in the steel and the overheating sensitivity of the steel is increased, and when the cooling is improper after smelting pouring and forging, it is easy to produce white spots in the carbon steel. Considering the above factors, the manganese content is designed in the range of 1.0~2.0% in the present disclosure.

Si: Silicon forms a solid solution in ferrite or austenite, thereby enhancing the yield strength and tensile strength of steel. Silicon can increase the cold working deformation hardening rate of steel and is a beneficial element in alloy steel. In addition, silicon has obvious enrichment phenomenon on the surface of silicon-manganese steel along the crystal fracture, and the segregation of silicon at the grain boundary can alleviate the distribution of carbon and phosphorus along the grain boundary, thereby improving the embrittlement state of the grain boundary. Silicon can improve the strength, hardness and wear resistance of steel and will not significantly reduce the plasticity of steel. Silicon has a strong deoxidation capacity and is a commonly used deoxidation agent in steelmaking. Silicon can also increase the fluidity of molten steel, so generally the steel contains silicon. But when the content of silicon in steel is too high, its plasticity and toughness will be significantly reduced.

For dual-phase steels, the main effect of silicon is to reduce the annealing time and affect the austenite volume fraction at final equilibrium. Silicon has no obvious effect on the growing rate of austenite, but has a significant effect on the morphology and distribution of austenite. Therefore, the silicon content is determined in the range of 0.1~0.5% in the present disclosure.

Cr: The main function of chromium in steel is to improve the hardenability, so that the steel has good comprehensive mechanical properties after quenching and tempering. Chromium and iron form a continuous solid solution and the austenitic phase area is reduced. Chromium and carbon form a variety of carbides and its affinity with carbon is greater than that of iron and manganese. Chromium and iron can form an intermetallic σ phase (FeCr), which reduces the concentration of carbon in pearlite and the solubility limit of carbon in austenite. Chromium slows down the decomposition rate of austenite and significantly improves the hardenability of steel. However, it also has a tendency of increasing temper brittleness of steel. Chromium can improve the strength and hardness of steel when used with other alloying elements together, the effect is more significant. Since Cr improves the quenching ability of steel during air cooling, it has an adverse effect on the welding performance of steel. However, when the chromium content is less than 0.3%, the adverse effect on weldability can be ignored. When it is greater than 0.3%, it is easy to produce defects such as cracks and slag inclusions during welding. When Cr and other alloying elements exist at the same time (such as coexisting with V), the adverse effect of Cr on weldability is greatly reduced. For example, when Cr, Mo, V and other elements exist in steel at the same time, even if the Cr content reaches 1.7%, there is no significant adverse effect on the welding performance of steel. In the present disclosure, the Cr element is a beneficial and inessential element. Considering the cost and other factors, the added amount of Cr should not be too much. In some embodiments, the Cr content is ≤0.30%.

Mo: Molybdenum inhibits the self-diffusion of iron and the diffusion rate of other elements. The radius of Mo atom is larger than that of u-Fe atom. When Mo is dissolved in a solid solution, the solid solution has strong lattice distortion. Meanwhile, Mo can increase the lattice atomic bond attraction and increase the recrystallization temperature of a ferrite. Mo has a significant strengthening effect in pearlitic, ferritic, martensitic and other steel grades, and even in high-alloy austenitic steel. The beneficial role of Mo in steel also depends on the interaction with other alloying elements in steel. When strong carbide-forming elements V, Nb and Ti are added to the steel, the solid-solution strengthening effect of Mo is more significant. This is because when the strong carbide-forming element combines with C to form a stable carbide, it can promote Mo to dissolve into the solid solution more efficiently, which is more conducive to the improvement of the hot strength of steel. The addition of Mo can also increase the hardenability of steel. Mo can inhibit the transition of pearlite region and accelerate the transition in the medium temperature zone, so that a certain amount of bainite can be formed in Mo-containing steel in the case of a large cooling rate and the formation of ferrite and pearlite is eliminated. That is one of the reasons why Mo has a favorable effect on the hot strength of low alloy heat-resistant steel. Mo can also significantly reduce the hot embrittlement tendency of steel and reduce the spheroidization rate of pearlite. When the Mo content is no more than 0.15%, there is no adverse effect on the welding performance of steel. In the present disclosure, the Mo element is a beneficial and inessential element. Considering the cost and other factors, the added amount of Mo should not be too much. In some embodiments, the Mo content is ≤0.20%.

Microalloying elements Ti, Nb, V: Adding a trace amount of microalloying elements Nb, V, Ti to steel can ensure that the steel has good weldability and other properties by dispersing and precipitating their carbide and nitride particles (particle size less than 5 nm) and solid solution of Nb, V, Ti to refine grains, greatly improve the strength and toughness (especially low temperature toughness) of steel under the condition of low carbon equivalent. Nb, V, Ti are forming elements of carbide and nitride and can meet the requirement at relatively low concentrations. Nb, V, Ti are strong carbide-forming elements. At room temperature, most of these elements in the steel exists in the form of carbide, nitride and carbonitride, and a small part is dissolved in ferrite. The addition of Nb, V, Ti can prevent the growth of austenite grains and increase the coarsening temperature of steel grains. This is because their carbide, nitride are dispersed small particles and play a fixation role on austenite grain boundaries, hinder the migration of austenite grain boundaries, increase austenite recrystallization temperature and expand the uncrystallized region, i.e., preventing the growth of austenite grains. Adding trace amounts of Nb, V, Ti to steel, on one hand, can improve the strength and welding performance of steel while reducing the carbon equivalent content. On the other hand, impure substances such as oxygen, nitrogen, sulfur, etc. are fixed, so as to improve the weldability of steel. Due to the action of its microparticles, such as the unsolubility of TiN at high temperature, it can prevent the coarsening of grains in the heat-affected zone, improve the toughness of the heat-affected zone, and thus improve the welding performance of steel. In the present disclosure, the microalloying elements are beneficial and inessential elements. Considering the cost and other factors, the added amount should not be too much. In some embodiments, the Ti content is ≤0.035%. In some embodiments, the Nb content is ≤0.025%. In some embodiments, the V content is ≤0.030%.

In the present disclosure, the recovery of deformed structure, recrystallization and phase change process in continuous heat treatment process are controlled by rapid heat treatment process including rapid heating, short-term heat preservation and rapid cooling process. Finally, fine ferrite structure and reinforced phase structure with multi-morphology are obtained, so that the material can have better matching of strength and toughness, reducing the alloy cost and manufacturing difficulty of each process, and improving the use performance such as the welding performance of the same strength steel grade.

The specific principle is that different heating rates are used at different temperature stages of the heating process. The recovery of deformed structure mainly occurs in the low temperature section, and a relatively low heating rate can be used to reduce energy consumption. The recrystallization and grain growth of different phase structures mainly occur in the high temperature section and it is necessary to use relatively high heating rate and short soaking time to shorten the residence time of the material in the high temperature zone to ensure little or no growth of grains. By controlling the heating rate in the heating process, the recovery of deformed structure and the ferrite recrystallization process during heating are suppressed, so that the recrystallization process overlaps with the austenite phase transition process. The nucleation points of recrystallized grains and austenite grains are increased and finally the grains are refined. By short-term heat preservation and rapid cooling, the grain growth time in the soaking process is shortened to ensure that the grain structure is small and evenly distributed.

Chinese patent application CN106811698B discloses a heat treatment process and it does not distinguish the entire heating process. The heating rate adopted in the heating process is 20~60° C./s, which belongs to the medium heating rate and is achieved based on the heating technology of the existing traditional continuous annealing unit. It is impossible to be regulated on a large scale according to the needs of microstructure transformation of the material.

In the heat treatment process disclosed in the Chinese patent application CN107794357B and the US patent application US2019/0153558A1, the heating process is also in stages: the steel is heated to 300-500° C. at a heating rate of 1-10° C./s, and then heated to 850-950° C. in single-phase austenitic region at a heating rate of 100-500° C./s, held for no more than 5 s and then water quenched to room temperature. The treatment process requires that the steel plate must be heated to the high-temperature zone of single-phase austenite, which improves the high temperature resistance requirements of the equipment, increases the manufacturing difficulty. At the same time, it adopts a cooling manner of water-cooling. Although the cooling rate is extremely high and it can greatly reduce the growth time of the grain structure in the high temperature zone, it will inevitably bring about uneven distribution of alloying elements in the final product, resulting in uneven and unstable microstructures and properties of the product. Too high cooling rate will also lead to a series of problems such as poor steel plate shape and surface oxidation and the like.

A product having an optimal matching of strength and toughness only can be obtained by integratedly controlling the whole heat treatment, including rapid heating (controlling heating rate in stages), short-term soaking and rapid cooling process to provide finely controlled optimal grain size and evenly distributed alloying elements and phase structures.

The average grain size of the dual-phase structure of ferrite and martensite obtained by the rapid heat treatment process of the present disclosure is 4~10 μm, which is 50~60% smaller than the grain size of the product produced by the existing traditional technology (generally 10-20 μm). The strength of the material is improved by grain refinement, while good plasticity and toughness are obtained, and the use performance of the material is improved. Moreover, the ferritic and martensitic structures obtained by the present disclosure have various forms such as blocks, strips, granules, etc., and the distribution of ferrite and martensite is more uniform, so as to obtain better strength and plasticity.

The manufacturing process by rapid heat treatment of the low carbon low alloy dual phase steel with high formability having a tensile strength of ≥590 MPa according to the present disclosure comprises the following steps:

1) Smelting, casting
wherein the above components are subjected to smelting and casting to form a slab;
2) hot rolling, coiling
wherein a hot rolling finishing temperature is ≥$A_{r3}$; and a coiling temperature is 550~680° C.;
3) cold rolling
wherein a cold rolling reduction rate is 40~85%, thereby obtaining a rolled hard strip steel or steel plate;
4) Rapid heat treatment
a) Rapid heating
wherein the strip steel or steel plate after cold rolling is rapidly heated to 750~845° C., wherein the rapid heating is performed in one stage or two stages; when the rapid heating is performed in one stage, a heating rate is 50~500° C./s; when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s (such as 50~500° C./s);
b) Soaking
wherein the strip steel or steel plate is soaked at a temperature of 750~845° C., which is the target temperature of the dual phase region of austenite and ferrite, for a soaking time of 10~60 s;
c) Cooling
wherein after soaking, the strip steel or steel plate is slowly cooled to 670~770° C. at a cooling rate of 5~15° C./s, then rapidly cooled from 670~770° C. to room temperature at a cooling rate of 50~200° C./s;
or the strip steel or steel plate is rapidly cooled from 670~770° C. to 230~280° C. at a cooling rate of 50~200° C./s for over-ageing treatment, wherein an over-ageing treating time is less than or equal to 200 s; after over-ageing treatment, it is finally cooled to room temperature at a cooling rate of 30~50° C./s.

Preferably, a total time of the rapid heat treatment is 41~300 s, such as 41~296 s.

Preferably, in step 2), the coiling temperature is 580~650° C.

Preferably, in step 3), the cold rolling reduction rate is 60~80%.

Preferably, in step 4), when the rapid heating is performed in one stage, the heating rate is 50~300° C./s.

Preferably, in step 4), the rapid heating is performed in two stages, wherein the strip steel or steel plate is heated in the first stage from room temperature to 550~650° C. at a heating rate of 15~300° C./s, heated in the second stage from 550~650° C. to 750~845° C. at a heating rate of 50~300° C./s.

Preferably, in step 4), the rapid heating is performed in two stages, wherein the strip steel or steel plate is heated in the first stage from room temperature to 550~650° C. at a heating rate of 50~300° C./s, heated in the second stage from 550~650° C. to 750-845° C. at a heating rate of 80~300° C./s.

Preferably, in step 4), the final temperature after rapid heating is 790~830° C.

Preferably, in step 4), the rapid cooling rate of the strip steel or steel plate is 50~150° C./s.

Preferably, in the soaking process of step 4), after the strip steel or steel plate is heated to the target temperature of dual phase region of austenite and ferrite, the temperature is kept unchanged for soaking;

Preferably, in the soaking process of step 4), the strip steel or steel plate is slightly heated up or cooled down in the soaking time, wherein the temperature after heating is no more than 845° C. and the temperature after cooling is no less than 750° C.

Preferably, the soaking time is 10~40 s.

Preferably, the over ageing time is 20~200 s.

Preferably, the dual phase steel is the hot-galvanized dual phase steel according to any embodiment of the present disclosure, wherein after the end of soaking step and the steel is slowly cooled to 670~770° C., it is rapidly cooled to 460~470° C. at a cooling rate of 50~200° C./s and immersed in a zinc pot for hot galvanizing to obtain the hot-galvanized dual phase steel. In some embodiments, after hot galvanizing, the steel is rapidly cooled to room temperature at a cooling rate of 30~150° C./s to obtain a hot dip galvanized GI product. In some embodiments, after hot galvanizing, the steel is heated to 480~550° C. at a heating rate of 30~200° C./s and alloyed for 10~20 s; after alloying, the steel is rapidly cooled to room temperature at a cooling rate of 30~250° C./s to obtain an alloy galvannealed GA product.

In some embodiments, the manufacturing process by rapid heat treatment of the low carbon low alloy hot-galvanized dual phase steel with high formability having a tensile strength of ≥590 MPa according to the present disclosure comprises the following steps:

A) Smelting, casting
wherein the above components are subjected to smelting and casting to form a slab;

B) Hot rolling, coiling
wherein a hot rolling finishing temperature is ≥$A_{r3}$; and a coiling temperature is 550~680° C.;

C) Cold rolling
wherein a cold rolling reduction rate is 40~85%, thereby obtaining a rolled hard strip steel or steel plate;

D) Rapid heat treatment, hot-galvanizing
a) rapid heating
wherein the strip steel or steel plate after cold rolling is rapidly heated from room temperature to 750~845° C., which is the target temperature of dual phase region of austenite and ferrite, wherein the rapid heating is performed in one stage or two stages;
when the rapid heating is performed in one stage, a heating rate is 50~500° C./s;
when the rapid heating is performed in two stages, the strip steel or steel plate is heated in the first stage from room temperature to 550~650° C. at a heating rate of 15~500° C./s, heated in the second stage from 550~650° C. to 750~845° C. at a heating rate of 30~500° C./s (such as 50~500° C./s);

b) Soaking
wherein the strip steel or steel plate is soaked at a temperature of 750~845° C., which is the target temperature of the dual phase region of austenite and ferrite, for a soaking time of 10~60 s;

c) Cooling, hot-galvanizing
wherein after soaking, the strip steel or steel plate is slowly cooled to 670~770° C. at a cooling rate of 5~15° C./s, then rapidly cooled to 460~470° C. at a cooling rate of 50~150° C./s and immersed in a zinc pot for hot galvanizing;

d) after hot galvanizing, the strip steel or steel plate is rapidly cooled to room temperature at a cooling rate of 50~150° C./s to obtain a hot dip galvanized GI product; or
after hot galvanizing, the strip steel or steel plate is heated to 480~550° C. at a heating rate of 30~200° C./s and alloyed for 10~20 s; after alloying, the strip steel or steel plate is rapidly cooled to room temperature at a cooling rate of 30~250° C./s to obtain an alloy galvannealed GA product.

Preferably, a total time of the rapid heat treatment and hot-galvanizing of step D) is 30~142 s.

Preferably, in step B), the coiling temperature is 580~650° C.

Preferably, in step C), the cold rolling reduction rate is 60~80%.

Preferably, in step D), when the rapid heating is performed in one stage, the heating rate is 50~300° C./s.

Preferably, in step D), the rapid heating is performed in two stages, wherein the strip steel or steel plate is heated in the first stage from room temperature to 550~650° C. at a heating rate of 15~300° C./s, heated in the second stage from 550~650° C. to 750~845° C. at a heating rate of 50~300° C./s.

Preferably, in step D), the rapid heating is performed in two stages, wherein the strip steel or steel plate is heated in the first stage from room temperature to 550~650° C. at a heating rate of 30~300° C./s, heated in the second stage from 550~650° C. to 750~845° C. at a heating rate of 80~300° C./s.

Preferably, in step D), the final temperature after rapid heating is 770~830° C. or 790~830° C.

Preferably, in the soaking process of step D), after the strip steel or steel plate is heated to the target temperature of dual phase region of austenite and ferrite, the temperature is kept unchanged for soaking.

Preferably, in the soaking process of step D), the strip steel or steel plate is slightly heated up or cooled down in the soaking time, wherein the temperature after heating is no more than 845° C. and the temperature after cooling is no less than 750° C.

Preferably, the soaking time is 10~40 s.

Preferably, in step D), the strip steel or steel plate after alloying is rapidly cooled to room temperature at a cooling rate of 30~200100° C./s to obtain the alloy galvannealed GA product.

In the manufacturing process by rapid heat treatment of the 590 Mpa grade low carbon low alloy dual-phase steel with high formability and hot-galvanized dual-phase steel with high formability according to the present disclosure:

1. Heating Rate Control

The recrystallization kinetics of the continuous heating process can be quantitatively described by the relationship affected by the heating rate. The function of the volume fraction of ferrite recrystallization and the temperature T during continuous heating process is:

$$X(T) = 1 - \exp\left[-n/\beta^n \int_{T_{star}}^{T} b(T)(T - T_{star})^{n-1} dT\right]$$

where X(t) is the volume fraction of ferrite recrystallization; n is the Avrami index, which is related to the phase transition mechanism, depending on the decay period of the recrystallization nucleation rate, generally 1~4; T is the heat treatment temperature; $T_{star}$ is the recrystallization starting temperature; β is the heating rate; b(T) is obtained by:

$$b = b_0 \exp(-Q/RT)$$

From the above formula and relevant experimental data, it can be concluded that with the increase of heating rate, the recrystallization starting temperature ($T_{star}$) and finishing temperature ($T_{fin}$) increase. When the heating rate is equal to or more than 50° C./s, the austenite phase transition overlaps the recrystallization process, and the recrystallization temperature increases to the dual-phase zone temperature. The faster the heating rate, the higher the ferrite recrystallization temperature.

Slow heating is adopted in the traditional heat treatment process due to limitation of the heating technology. In this case, the deformed matrix recovers, recrystallizes and the grain grows sequentially. Then the phase transition from ferrite to austenite occurs. The phase nucleus point is mainly at the grain boundary of the ferrite that has grown up and the nucleation rate is low. The grain structure of the final resultant dual-phase steel is relatively coarse.

Under the condition of ultra-rapid heating, the phase transformation of ferrite to austenite begins to occur as soon as the deformed matrix has completed recrystallization or has not yet completed recrystallization (or even not fully recovered). Because the grain is fine and the grain boundary area is large at this time, the phase deformation nucleation rate is significantly increased and the austenite grain is significantly refined. At this time, the ferrite recrystallization process overlaps with the austenite phase transition process, because a large number of crystal defects such as dislocations and the like are retained in the ferrite crystal, a large number of nucleation points are provided for austenite, so that the austenite nucleation is explosive and the austenite grains are further refined. The high-density dislocational line defects retained at the same time also become channels for the high-rate diffusion of carbon atoms to shorten diffusion time of carbon atoms and allow each austenite grain to be quickly generated and grow up, so the austenite grain is fine and the volume fraction increases.

The fine control of microstructure evolution, alloying elements and phase component distribution during rapid heating process provides a good basis for the subsequent austenite microstructure growth in soaking process, the distribution of alloy components and the phase transition from austenite to martensite in the rapid cooling process. The final product structure with refined grains, reasonable elements and phase distribution can be obtained finally. Comprehensively considering the effect of rapid heating and grain refinement, manufacturing cost and manufacturability, the heating rate is set at 50~500° C./s for one-stage rapid heating, and 15~500° C./s when two-stage rapid heating is adopted in the present disclosure.

Due to the different effects of rapid heating on the microstructure evolution process of material recovery, recrystallization and grain growth in different temperature zones, in order to obtain optimal microstructure control, the preferred heating rate is different in different heating temperature zones: the heating rate has the greatest impact on the recovery process from 20° C. to 550~650° C. and the heating rate is controlled at 15~300° C./s, and further preferably 50~300° C./s. When the heating temperature is from 550~650° C. to austenitizing temperature 750~845° C., the heating rate has the greatest effect on the nucleation rate and grain growth process and the heating rate is controlled at 50~300° C./s, further preferably 80~300° C./s.

2. Soaking Temperature Control

The selection of soaking temperature should be combined with the control of material microstructure evolution at each temperature stage of the heating process, and the evolution and control of the subsequent rapid cooling process should be considered, so as to finally obtain the preferred structure and distribution.

The soaking temperature usually depends on the C content. The C content of the dual-phase steel in the present disclosure is 0.04~0.12%, and the $A_{C1}$ and $A_{C3}$ of the steel in the present disclosure are about 730° C. and 870° C., respectively. The rapid heat treatment process of the present disclosure controls the soaking temperature of strip steel in the dual-phase zone between $A_{C1}$ and $A_{C3}$ and the material is rapidly heated from room temperature to the temperature between $A_{C1}$ and $A_{C3}$ by rapid heat treatment process. The use of rapid heating technology allows the material to retain a large number of dislocations in the ferrite that is not fully recrystallized, providing a greater nucleation driving force for austenite transformation from ferrite. Therefore, compared with the traditional continuous annealing process, the rapid heat treatment process of the present disclosure can provide more and finer austenite structure.

With respect to the control of soaking temperature, the present disclosure first proposes rising and decreasing the soaking temperature within a certain range: that is, the soaking temperature rises slantwise and decreases slantwise in the soaking process, but the soaking temperature must be kept within a certain range. The advantage of this is that the rapid heating and cooling process in the temperature range of the two-phase region is actually to further increase the degree of superheat and the degree of supercooling to facilitate the rapid phase transition process. When the amplitude and rate of temperature ramp and temperature drop are large enough, the grains can be further refined by repeated ferrite to austenite phase transformation and austenite to ferrite phase transformation. At the same time, it has a certain influence on carbide formation and uniform distribution of alloying elements, finally forming a finer structure and alloying elements with uniform distribution.

After cold rolling, there are a large number of undissolved fine uniformly distributed carbides in dual-phase steel, which can not only become the nucleation point of austenite, but also mechanically impede the growth of austenite grains during heating and soaking process, and is conducive to refining the grain size of alloy steel. However, if the heating temperature is too high, the number of undissolved carbides will be greatly reduced, which weakens this impedance, increase the growth tendency of grains, and thereby reduce the strength of steel. When the number of undissolved carbides is too large, it may cause aggregation, resulting in uneven local distribution of chemical components, and when the carbon content at the aggregation is too high, it will also cause local overheating. Therefore, ideally, a small quantity of fine granular undissolved carbides should be evenly distributed in the steel, which can not only prevent the abnormal growth of austenite grains, but also increase the content of each alloying element in the matrix accordingly, so as to improve the mechanical properties such as strength and toughness of alloy steel.

The selection of soaking temperature should also be aimed at obtaining fine and uniform austenite grains and avoiding coarse austenite grains, so that the purpose of obtaining fine martensitic structure after cooling can be achieved. Too high soaking temperature will make the austenite grains coarse, and the martensitic structure obtained after rapid cooling will also be coarse, resulting in poor mechanical properties of steel. It will also increase the amount of residual austenite, reduce the amount of martensite and reduce the hardness and wear resistance of steel. Too low soaking temperature not only reduces the amount of austenite, but also makes the content of alloying elements in austenite insufficient, so that the concentration of alloying elements in austenite is unevenly distributed, which greatly reduces the hardenability of steel and adversely affects the mechanical properties of steel. The soaking temperature of hypoeutectoid steel should be $A_{C_3}+30\sim50°$ C. For ultra-high-strength steels, the presence of carbide-forming elements will impede the transformation of carbides, so the soaking temperature can be appropriately increased. Based on the above factors, the soaking temperature is selected to be 750~845° C. in the present disclosure and it is expected to obtain a more ideal and reasonable final structure.

3. Soaking Time Control

The factors that influence the soaking time also depend on the content of carbon and alloying elements in steel. When the content of carbon and alloying elements in steel increases, it will not only lead to a decrease in thermal conductivity of steel, but also because the diffusion rate of alloying elements is slower than that of carbon element, the alloying elements will significantly delay microstructure transformation of steel, then it is necessary to appropriately extend the holding time. Since rapid heating is adopted in the present disclosure, the material in the dual-phase region contains a large number of dislocations, which provide a large number of nucleation points for austenite formation, and provide a rapid diffusion channel for carbon atoms, so that austenite can be formed extremely quickly. Moreover, the shorter the soaking time, the shorter the diffusion distance of carbon atoms, the greater the carbon concentration gradient in austenite, and the more residual austenite carbon content is retained at the end. However, if the holding time is too short, the distribution of alloying elements in the steel will be uneven, resulting in insufficient austenitization. If the holding time is too long, it is easy to lead to coarse austenite grains. Therefore, the control of soaking time needs to be determined by strictly combining with soaking temperature and comprehensively considering rapid cooling and rapid heating process, in order to finally obtain the ideal structure and element distribution. In summary, the soaking time is set to be 10~60 s in the present disclosure.

4. Rapid Cooling Rate Control

The control of rapid cooling process needs to be comprehensively considered by combining the factors such as structure evolution and the alloy diffusion distribution results in the early heating and soaking processes to ensure that ideal material structure of each phase and reasonable distribution of elements is finally obtained.

In order to obtain the martensitic strengthening phase, the cooling rate of the material upon rapid cooling must be greater than the critical cooling rate to obtain martensite structure. The critical cooling rate mainly depends on the material composition. The optimized Si content in the present disclosure is 0.1~0.5%. The Mn content is 1.0~2.0%. The content is relatively high. Thus, Si and Mn greatly strengthen the hardenability of dual-phase steel and reduce the critical cooling rate.

The selection of cooling rate also needs to comprehensively consider the microstructure evolution of heating process and soaking process and alloy diffusion distribution results, so as to finally obtain a reasonable distribution of each phase and alloying elements. Too low cooling rate cannot provide martensitic structure. It will lead to a decrease in strength and thus the mechanical properties cannot meet the requirements. Too high cooling rate will produce large quenching stress (i.e. structure stress and thermal stress), resulting in very poor plate shape, especially when cooling is uneven, and it is even easy to lead to serious deformation and cracking of the sample. Therefore, the rapid cooling rate is set at 50~200° C./s, preferably 50~150° C./s, in the present disclosure.

5. Over Ageing Control

After traditional heat treatment, the over ageing is mainly to temper the hardened martensite to improve the comprehensive properties of dual-phase steel. Improper setting of the over ageing temperature and time will cause decomposition of martensite, which directly deteriorates the mechanical properties of dual-phase steel. The setting of over ageing temperature and time should comprehensively consider martensitic morphology and distribution, element content and distribution, and the size and distribution of other structures. Therefore, the control of over ageing needs to be determined by integrating the parameters of the previous heating process, soaking process and cooling process. Considering the microstructure evolution and element distribution of rapid heating, short-term heat preservation and rapid cooling process, the over ageing temperature is set to be 230~280° C. in the present disclosure. The over ageing time is controlled to be less than or equal to 200 s.

6. Hot-Dip Galvanizing and Alloying Control

In the present disclosure, by adjusting and controlling the heat treatment process parameters of steel strip, the steel strip can be kept at a better temperature and surface state for hot-dip galvanizing and alloying treatment to obtain excellent hot-dip galvanizing and alloying products. By improving the strip surface quality control ability, strip products with high surface quality can be obtained.

In the present disclosure, by modifying traditional continuous annealing unit by rapid heating and rapid cooling process, the rapid heat treatment process can be realized, which can greatly shorten the length of the heating and soaking section of traditional continuous annealing furnace, improve the production efficiency of traditional continuous annealing unit, reduce the production cost and energy consumption, reduce the number of rollers of the continuous annealing furnace and improve the control ability of strip surface quality, thereby obtaining strip products with high surface quality. At the same time, by establishing a new continuous annealing unit with rapid heat treatment process technology, the continuous rapid heating unit is short and compact and has advantages of flexible material transition and strong control ability. For product materials, strip grains can be refined to further improve material strength, reduce alloy cost and manufacturing difficulty in the process before heat treatment process, and improve the use performance of materials such as welding.

In summary, the present disclosure has greatly promoted the technological progress of continuous annealing process of cold-rolled strip steel by adopting the rapid heat treatment process. The austenitization of cold-rolled strip steel from room temperature to the final completion can be expected to be completed in tens of seconds, more than ten seconds or even a few seconds, which greatly shortens the length of the heating section of the continuous annealing furnace. It is convenient to improve the speed and production efficiency of the continuous annealing unit, and significantly reduces the number of rolls in the furnace of the continuous annealing unit. For the rapid heat treatment production line with a unit speed of about 180 m/min, the number of rollers in the high-temperature furnace section does not exceed 10, which can significantly improve the quality of the strip steel surface. At the same time, the rapid heat treatment process that can complete the recrystallization and austenitization in a very short time will also provide a more flexible microstructure design method of high-strength steel, so as to improve the material structure and the material properties without changing the alloy composition and pre-process conditions such as rolling process.

Advanced high-strength steel represented by dual-phase steel has broad application prospects. The rapid heat treatment technology has great development value. Their combination will surely provide more space for the development and production of dual-phase steel.

Advantages of the present disclosure over traditional techniques are as follows:

(1) In the present disclosure, the recovery of deformed structure and ferrite recrystallization during heat treatment process is inhibited by rapid heat treatment, so that the recrystallization overlaps with the austenite phase transition. It increases the nucleation points of the recrystallized grain and austenite grain and shortens the grain growth time. The resultant microstructure of the dual-phase steel is the dual-phase structure of ferrite and martensite with the average grain size of 2~10 μm, which is significantly reduced compared with the grain size of the product produced by the existing traditional technology (usually 10~20 μm). The strength of the material can be improved by grain refinement, and good plasticity and toughness can be obtained at the same time, thereby improving the performance of the material. Moreover, the ferritic and martensitic structures obtained by the present disclosure have a variety of forms such as block, strip, granular, etc., and the distribution of ferrite and martensite is more uniform, so that better strength and plasticity can be obtained.

(2) Compared with the dual-phase steel obtained by traditional heat treatment, the grain size of the dual-phase steel obtained by the present disclosure is fine, each phase is evenly distributed, and the strength and toughness of the material are significantly improved. The resultant dual-phase steel has a yield strength of ≥350 MPa, a tensile strength of ≥620 MPa, which can be controlled within a small range, an elongation of ≥19%, a product of strength and elongation of ≥15 GPa % and a strain hardening index $n_{90}$ value greater than 0.20 and has superior formability.

(3) According to the present disclosure, the total time of heat treatment in the rapid heat treatment process of low carbon low alloy dual-phase steel with high formability can be shortened to 41~300 s, and the total time of heat treatment in the rapid heat treatment process of low carbon low alloy hot galvanized dual-phase steel with high formability can be shortened to 30~142 s, which greatly reduces the time of the entire heat treatment process (the time of traditional continuous annealing process is usually 5~8 min), improves production efficiency and reduces energy consumption and production costs.

(4) Compared with the traditional dual-phase steel and its heat treatment process, the heating section time and soaking section time of the rapid heat treatment process of the present disclosure are shortened by 60~80%. The processing time of strip steel at high temperature is shortened. It can conserve energy, reduce emission and reduce energy consumption, significantly reduce the one-time investment of furnace equipment, and significantly reduce the cost of production operation and equipment maintenance. In addition, the production of products with the same strength grade through rapid heat treatment can reduce the alloy content, the production cost of heat treatment and the process before heat treatment, and the manufacturing difficulty of each process before heat treatment.

(5) Compared with the dual-phase steel obtained by the traditional continuous annealing treatment, the rapid heat treatment process technology reduces the time of heating process and soaking process, shortens the length of the furnace, and reduces the number of furnace rolls, so that the probability of surface defects generated in the furnace and surface defects generated in the product is reduced and thus the surface quality of the product is significantly improved. In addition, due to the refinement of the product grain and the reduction of alloy content in the material, the formability of the dual-phase steel obtained by the technology of the present disclosure and the use performance such as welding performance have also been improved.

The low carbon low alloy dual-phase steel and hot-dip galvanized dual-phase steel with high formability obtained by the present disclosure are of great value to the development of a new generation of lightweight automobiles, trains, ships, aircrafts and other vehicles and the healthy development of corresponding industries and advanced manufacturing industries.

DETAILED DESCRIPTION

The present disclosure is further explained below in reference to the Examples and the accompanying drawings. The Examples are implemented in accordance with the technical solution of the present disclosure. Detailed embodiments and specific operation process are provided, but the protection scope of the present disclosure is not limited to the Examples described below.

In the Examples, yield strength, tensile strength and elongation were tested on P7 specimen transversely according to GB/T228.1-2010 Metallic materials—Tensile testing—Part 1: Method of test at room temperature. n90 was tested on the P7 specimen transversely according to GB/T228.1-2010 Metallic materials—Tensile testing—Part 1: Method of test at room temperature and n90 value was obtained according to GBT 5028-2008 Metallic materials—Sheet and strip—Determination of tensile strain hardening exponent.

Example I

The composition of the test steel of the present disclosure is shown in Table 1. The specific parameters of the present example and the traditional processes are shown in Table 2 and Table 3. The main performances of the steel prepared from the test steel composition of this example according to the examples and the traditional processes are listed in Table 4 and Table 5.

It can be seen from Table 1-Table 5 that the rapid heat treatment process of the present disclosure can reduce the alloy content in the same grade of steel, refine grains, and obtain a matching of material structure and composition with strength and toughness. The dual-phase steel obtained by the process of the present disclosure has a yield strength of 350~405 MPa, a tensile strength of 624~706 MPa, an elongation of 24.4~30.4%, a product of strength and elongation of 17~20.1 GPa %, and a strain hardening index $n_{90}$ value of greater than 0.20, which is higher than that of the dual-phase steel produced by the traditional process.

Figure 1:
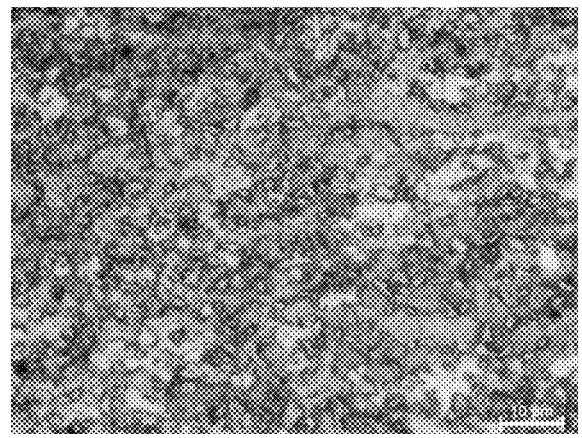
FIG. 1 is a microstructure photo of a dual-phase steel produced from test steel A of Example I according to Example 1 of the present disclosure.
Figure 2:
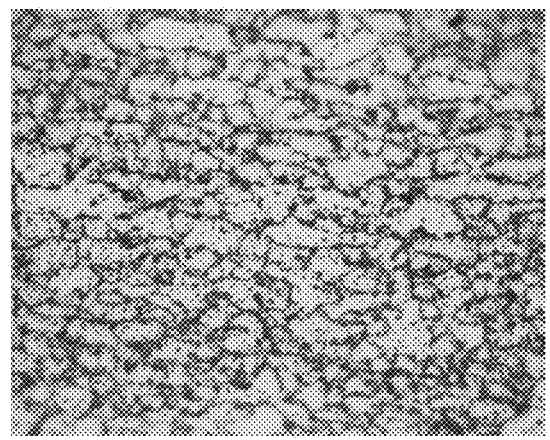
FIG. 2 is a microstructure photo of a dual-phase steel produced from test steel A of Example I according to Traditional process 1 of the present disclosure.

FIG. 1 is a structure photo of A steel having a typical composition obtained by Example 1, and FIG. 2 is a structure photo of A steel having a typical composition obtained by traditional process 1. It can be seen from the figures that there are very large differences in the structures treated by different heat treatment methods. The microstructure of the A steel after the rapid heat treatment process of this example has fine grains and is mainly composed of a fine martensitic structure and a small amount of carbide dispersed in ferrite matrix (FIG. 1). In the structure after treated by the process of the present disclosure, the grain structure of ferrite and martensite and carbide are very fine and evenly distributed in the matrix, which is very beneficial to the improvement of the strength and plasticity of the material. The A steel obtained by the traditional process treatment has a typical dual-phase steel microstructure (FIG. 2), that is, there is a small amount of black martensite structure on the grain boundary of white ferrite. Due to element segregation and other reasons, the material structure after traditional process treatment shows a certain directionality, and its ferrite structure is distributed in long strips along the rolling direction. The microstructure treated by the traditional process is characterized in that the grain size is relatively coarse, there is a certain banded structure with martensite and carbide distributed in a network along ferrite grain boundary, the ferrite grain is relatively coarse, and the distribution of dual-phase structure of ferrite and martensite is uneven.

Figure 3:
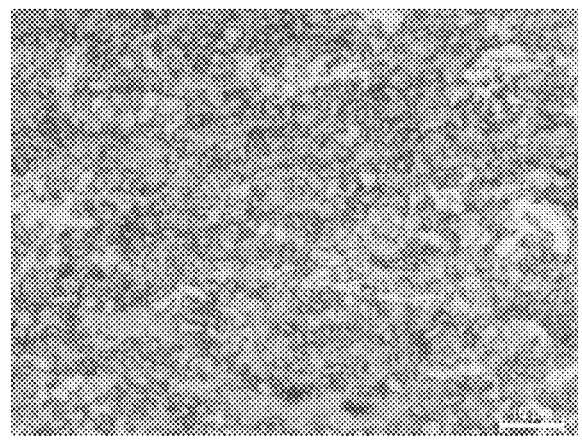
FIG. 3 is a microstructure photo of a dual-phase steel produced from test steel F of Example I according to Example 6 of the present disclosure.
Figure 4:
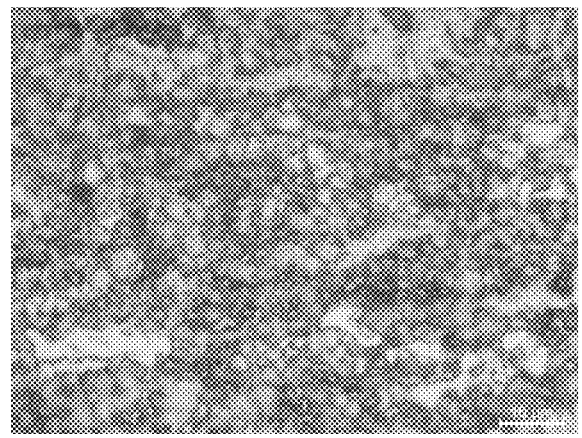
FIG. 4 is a microstructure photo of a dual-phase steel produced from test steel M of Example I according to Example 12 of the present disclosure.
Figure 5:
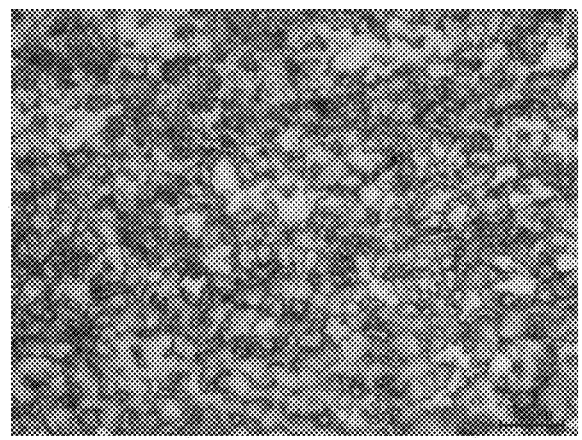
FIG. 5 is a microstructure photo of a dual-phase steel produced from test steel S of Example I according to Example 23 of the present disclosure.
Figure 6:
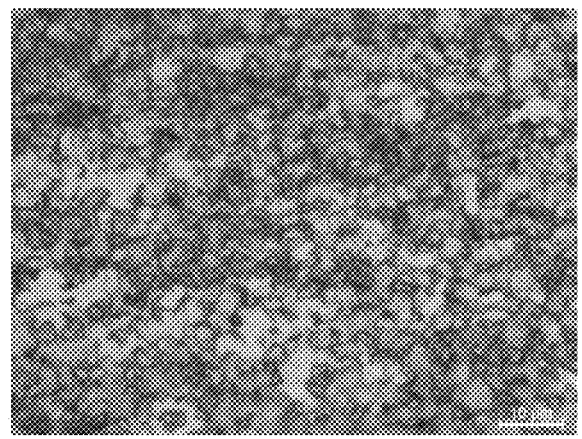
FIG. 6 is a microstructure photo of a dual-phase steel produced from test steel M of Example I according to Example 24 of the present disclosure.

FIG. 3 is a structure photo of F steel having a typical composition obtained by Example 6 (over ageing treatment), and FIG. 4 is a structure photo of M steel having a typical composition obtained by Example 12 (without over ageing treatment). FIG. 5 is a structure photo of S steel having a typical composition obtained by Example 23, and FIG. 6 is a structure photo of M steel having a typical composition obtained by Example 24. Examples 6, 12, 23, 24 all adopt processes with short heat treatment cycles. It can be seen from the figures that the removal of ageing treatment segment in the process of the present disclosure can also provide very uniform, fine, dispersed distribution of each phase structure. Therefore, the manufacturing process of the dual-phase steel of the present disclosure can refine grains, and make the structure of each phase of the material evenly distributed in the matrix, thereby improving the material structure and the material properties.

TABLE 1 unit: mass percentage

| test steel | C | Si | Mn | Cr | Mo | Ti | Nb | V | P | S | Al |
|---|---|---|---|---|---|---|---|---|---|---|---|
| A | 0.04 | 0.1 | 1.60 | / | / | / | / | / | 0.010 | 0.015 | 0.020 |
| B | 0.055 | 0.21 | 1.56 | / | / | / | / | / | 0.012 | 0.011 | 0.032 |
| C | 0.08 | 0.23 | 1.35 | / | / | / | / | / | 0.018 | 0.008 | 0.043 |
| D | 0.10 | 0.30 | 1.00 | / | / | / | / | / | 0.015 | 0.0038 | 0.025 |
| E | 0.05 | 0.17 | 1.27 | 0.26 | / | / | / | / | 0.011 | 0.013 | 0.030 |
| F | 0.06 | 0.25 | 1.60 | / | 0.16 | / | / | / | 0.013 | 0.005 | 0.027 |
| G | 0.08 | 0.18 | 1.35 | / | / | 0.020 | / | / | 0.019 | 0.012 | 0.046 |
| H | 0.10 | 0.28 | 1.10 | / | / | / | 0.023 | / | 0.020 | 0.014 | 0.055 |
| I | 0.09 | 0.19 | 1.20 | / | / | / | / | 0.026 | 0.012 | 0.009 | 0.033 |
| J | 0.04 | 0.27 | 1.60 | 0.22 | 0.20 | / | / | / | 0.013 | 0.006 | 0.028 |
| K | 0.06 | 0.15 | 1.55 | 0.20 | / | 0.015 | / | / | 0.014 | 0.005 | 0.025 |
| L | 0.10 | 0.18 | 1.40 | 0.23 | / | / | 0.020 | / | 0.015 | 0.012 | 0.033 |
| M | 0.09 | 0.25 | 1.26 | 0.24 | / | / | / | 0.021 | 0.017 | 0.015 | 0.035 |
| N | 0.07 | 0.30 | 1.37 | / | 0.16 | 0.018 | / | / | 0.019 | 0.011 | 0.044 |
| O | 0.08 | 0.13 | 1.60 | / | 0.13 | / | 0.015 | / | 0.02 | 0.0085 | 0.055 |
| P | 0.10 | 0.21 | 1.38 | / | 0.15 | / | / | 0.020 | 0.015 | 0.0092 | 0.047 |
| Q | 0.08 | 0.12 | 1.57 | / | / | 0.015 | 0.020 | / | 0.016 | 0.0075 | 0.060 |
| R | 0.10 | 0.20 | 1.59 | / | 0.020 | / | / | 0.021 | 0.016 | 0.0022 | 0.053 |
| S | 0.09 | 0.23 | 1.44 | / | / | / | 0.015 | 0.020 | 0.013 | 0.0018 | 0.045 |

TABLE 2

| | Hot rolling | Cold rolling | Rapid heat treatment (one stage) | | | Slow cooling | | Rapid cooling | | Over ageing treatment | | | Total time of rapid heat treatment |
|---|---|---|---|---|---|---|---|---|---|---|---|---|---|
| | | | Rapid heating rate (one stage) | Soaking | | | | | | | | | |
| | Coiling temperature °C. | rolling reduction rate % | °C./s | Soaking temperature °C. | Soaking time s | Cooling rate °C./s | Temperature after cooling °C. | Cooling rate °C./s | Temperature after cooling °C. | Over ageing temperature °C. | Over ageing time s | Final Cooling rate °C./s | |
| Ex. 1 | 680 | 45 | 50 | 810 | 60 | 15 | 695 | 50 | 240 | 240 | 180 | 30 | 279.90 |
| Ex. 2 | 650 | 85 | 80 | 790 | 50 | 13 | 670 | 60 | 230 | 230 | 200 | 40 | 281.44 |
| Ex. 3 | 610 | 75 | 150 | 770 | 40 | 11 | 680 | 80 | 235 | 235 | 150 | 50 | 213.04 |
| Ex. 4 | 580 | 65 | 300 | 750 | 30 | 9 | 680 | 100 | 260 | 260 | 120 | 35 | 171.27 |
| Ex. 5 | 550 | 70 | 500 | 815 | 10 | 6 | 700 | 120 | 280 | 280 | 110 | 38 | 151.10 |
| Ex. 6 | 590 | 40 | 250 | 820 | 20 | 5 | 750 | 150 | 250 | 250 | 100 | 45 | 145.64 |
| Ex. 7 | 640 | 50 | 350 | 845 | 55 | 12 | 770 | 140 | 238 | 238 | 80 | 43 | 152.48 |
| Ex. 8 | 600 | 68 | 400 | 830 | 45 | 8 | 710 | 130 | 252 | 252 | 60 | 48 | 130.38 |
| Ex. 9 | 570 | 60 | 230 | 825 | 35 | 10 | 730 | 110 | 270 | 270 | 40 | 33 | 99.76 |
| Ex. 10 | 630 | 80 | 100 | 815 | 25 | 14 | 680 | 200 | 245 | 245 | 20 | 30 | 72.27 |
| Ex. 11 | 660 | 77 | 180 | 800 | 30 | 7 | 690 | 170 | 20 | | | 30 | 53.99 |
| Ex. 12 | 550 | 55 | 200 | 790 | 20 | 9 | 680 | 160 | 20 | | | 30 | 40.20 |
| Traditional process 1 | 680 | 85 | 11 | 750 | 160 | 10 | 675 | 100 | 230 | 230 | 290 | 30 | 535.31 |
| Traditional process 2 | 650 | 75 | 10 | 770 | 130 | 9 | 675 | 80 | 250 | 250 | 260 | 30 | 488.53 |
| Traditional process 3 | 610 | 65 | 11 | 800 | 110 | 10 | 675 | 75 | 240 | 240 | 230 | 30 | 436.54 |
| Traditional process 4 | 580 | 55 | 13 | 830 | 90 | 8 | 675 | 60 | 260 | 260 | 160 | 30 | 346.60 |
| Traditional process 5 | 550 | 40 | 15 | 845 | 70 | 12 | 675 | 50 | 280 | 280 | 180 | 30 | 332.40 |

TABLE 3

| | Hot rolling Coiling temperature ° C. | Cold rolling reduction rate % | Rapid heat treatment (two-stage) |||||||
|---|---|---|---|---|---|---|---|---|---|
| | | | Rapid heating (two-stage) ||||| Slow cooling ||
| | | | Heating rate in the first stage ° C/s. | Temperature after heating in the first stage ° C. | Heating rate in the second stage ° C/s. | Soaking |||Temperature after cooling ° C. |
| | | | | | | Soaking temperature | Soaking time s | Cooling rate ° C/s. | |
| Ex. 13 | 680 | 45 | 15 | 550 | 500 | 810 | 60 | 50 | 240 |
| Ex. 14 | 650 | 85 | 30 | 570 | 300 | 790 | 50 | 60 | 230 |
| Ex. 15 | 610 | 75 | 80 | 600 | 150 | 770 | 40 | 80 | 235 |
| Ex. 16 | 580 | 65 | 150 | 630 | 80 | 750 | 30 | 100 | 260 |
| Ex. 17 | 550 | 70 | 300 | 640 | 50 | 815 | 10 | 120 | 280 |
| Ex. 18 | 590 | 40 | 500 | 650 | 30 | 820 | 20 | 150 | 250 |
| Ex. 19 | 640 | 50 | 150 | 647 | 400 | 845 | 55 | 140 | 238 |
| Ex. 20 | 600 | 68 | 250 | 635 | 250 | 830 | 45 | 130 | 252 |
| Ex. 21 | 570 | 60 | 300 | 640 | 350 | 825 | 35 | 110 | 270 |
| Ex. 22 | 630 | 80 | 250 | 620 | 250 | 815 | 25 | 200 | 245 |
| Ex. 23 | 660 | 77 | 100 | 580 | 150 | 800 | 30 | 170 | 20 |
| Ex. 24 | 550 | 55 | 200 | 610 | 200 | 790 | 20 | 160 | 20 |
| Traditional process 6 | 680 | 85 | 11 | 150 | 8 | 750 | 160 | 100 | 230 |
| Traditional process 7 | 650 | 75 | 10 | 150 | 7 | 770 | 130 | 80 | 250 |
| Traditional process 8 | 610 | 65 | 11 | 180 | 6 | 800 | 110 | 75 | 240 |
| Traditional process 9 | 580 | 55 | 13 | 210 | 5 | 830 | 90 | 60 | 260 |
| Traditional process 10 | 550 | 40 | 15 | 250 | 5 | 845 | 70 | 50 | 280 |

| | Rapid heat treatment (two-stage) |||||Total time of rapid heat treatment s |
|---|---|---|---|---|---|---|
| | Rapid cooling || Over ageing treatment || Final Cooling rate ° C/s. | |
| | Cooling rate ° C/s. | Temperature after cooling ° C. | Over ageing temperature ° C. | Over ageing time s | | |
| Ex. 13 | 50 | 240 | 240 | 180 | 30 | 299.95 |
| Ex. 14 | 60 | 230 | 230 | 200 | 40 | 290.88 |
| Ex. 15 | 80 | 235 | 235 | 150 | 50 | 216.43 |
| Ex. 16 | 100 | 260 | 260 | 120 | 35 | 174.40 |
| Ex. 17 | 120 | 280 | 280 | 110 | 38 | 155.08 |
| Ex. 18 | 150 | 250 | 250 | 100 | 45 | 149.37 |
| Ex. 19 | 140 | 238 | 238 | 80 | 43 | 152.01 |
| Ex. 20 | 130 | 252 | 252 | 60 | 48 | 130.89 |
| Ex. 21 | 110 | 270 | 270 | 40 | 33 | 98.34 |
| Ex. 22 | 200 | 245 | 245 | 20 | 30 | 67.50 |
| Ex. 23 | 170 | 20 | | | / | 56.72 |
| Ex. 24 | 160 | 20 | | | / | 40.20 |
| Traditional process 6 | 100 | 230 | 230 | 290 | 30 | 555.77 |
| Traditional process 7 | 80 | 250 | 250 | 260 | 30 | 515.11 |
| Traditional process 8 | 75 | 240 | 240 | 230 | 30 | 483.51 |
| Traditional process 9 | 60 | 260 | 260 | 160 | 30 | 422.91 |
| Traditional process 10 | 50 | 280 | 280 | 180 | 30 | 415.07 |

TABLE 4

| No. | test steel | Main process parameters (Rapid heating-one stage) | Yield strength MPa | Tensile strength MPa | Elongation % | Product of strength and elongation MPa % | n90 value |
|---|---|---|---|---|---|---|---|
| 1 | A | Traditional process 1 | 268 | 516 | 36 | 18576 | 0.191 |
| 2 | A | Ex. 1 | 354 | 658 | 28.8 | 18950.4 | 0.214 |
| 3 | B | Traditional process 2 | 268 | 491 | 36.5 | 17921.5 | 0.197 |
| 4 | B | Ex. 2 | 350 | 645 | 28.3 | 18253.5 | 0.211 |
| 5 | C | Traditional process 3 | 270 | 509 | 36.1 | 18374.9 | 0.189 |
| 6 | C | Ex. 3 | 365 | 663 | 28.4 | 18829.2 | 0.221 |
| 7 | D | Traditional process 4 | 285 | 539 | 35.4 | 19080.6 | 0.919 |
| 8 | D | Ex. 4 | 360 | 659 | 29 | 19111 | 0.212 |
| 9 | E | Traditional process 5 | 279 | 510 | 35.7 | 18207 | 0.181 |
| 10 | E | Ex. 5 | 364 | 673 | 28.5 | 19180.5 | 0.213 |
| 11 | O | Ex. 6 | 370 | 672 | 29 | 19488 | 0.216 |
| 12 | O | Traditional process 4 | 281 | 547 | 32.6 | 17832.2 | 0.198 |
| 13 | L | Ex. 7 | 379 | 684 | 29.4 | 20109.6 | 0.213 |
| 14 | L | Traditional process 3 | 276 | 524 | 36.2 | 18968.8 | 0.187 |
| 15 | H | Ex. 4 | 392 | 660 | 27.8 | 18348 | 0.207 |
| 16 | H | Traditional process 4 | 279 | 510 | 35.5 | 18105 | 0.192 |
| 17 | Q | Ex. 2 | 352 | 631 | 30.4 | 19182.4 | 0.221 |
| 18 | Q | Traditional process 2 | 271 | 490 | 37.6 | 18424 | 0.195 |
| 19 | I | Ex. 3 | 379 | 698 | 25.7 | 17938.6 | 0.222 |
| 20 | J | Ex. 4 | 392 | 699 | 24.9 | 17405.1 | 0.224 |
| 21 | N | Ex. 5 | 376 | 691 | 25.5 | 17620.5 | 0.226 |
| 22 | F | Ex. 6 | 385 | 706 | 24.4 | 17226.4 | 0.22 |
| 23 | K | Ex. 7 | 390 | 640 | 28.1 | 17984 | 0.234 |
| 24 | R | Ex. 8 | 380 | 683 | 26 | 17758 | 0.21 |
| 25 | G | Ex. 9 | 403 | 697 | 26.3 | 18331.1 | 0.222 |
| 26 | P | Ex. 10 | 370 | 675 | 27 | 18225 | 0.201 |
| 27 | S | Ex. 11 | 368 | 680 | 26.6 | 18088 | 0.208 |
| 28 | M | Ex. 12 | 363 | 650 | 27.8 | 18070 | 0.212 |

TABLE 5

| No. | test steel | Main process parameters (Rapid heating-twostage) | Yield strength MPa | Tensile strength MPa | Elongation % | Product of strength and elongation MPa % | n90 value |
|---|---|---|---|---|---|---|---|
| 1 | A | Traditional process 6 | 264 | 527 | 33.8 | 17812.6 | 0.199 |
| 2 | A | Ex. 13 | 387 | 677 | 27.7 | 18752.9 | 0.214 |
| 3 | B | Traditional process 7 | 285 | 517 | 36.1 | 18663.7 | 0.196 |
| 4 | B | Ex. 14 | 371 | 666 | 27.7 | 18448.2 | 0.226 |
| 5 | C | Traditional process 8 | 297 | 522 | 34.4 | 17956.8 | 0.202 |
| 6 | C | Ex. 15 | 369 | 651 | 27.2 | 17707.2 | 0.211 |
| 7 | D | Traditional process 9 | 268 | 517 | 36.5 | 18870.5 | 0.199 |
| 8 | D | Ex. 16 | 352 | 631 | 29.4 | 18551.4 | 0.223 |
| 9 | E | Traditional process 10 | 265 | 516 | 36 | 18576 | 0.198 |
| 10 | E | Ex. 17 | 347 | 624 | 30.3 | 18907.2 | 0.213 |
| 11 | O | Ex. 18 | 354 | 687 | 27.8 | 19098.6 | 0.232 |
| 12 | O | Traditional process 9 | 270 | 569 | 31.1 | 17695.9 | 0.189 |
| 13 | L | Ex. 19 | 405 | 658 | 25.8 | 16976.4 | 0.226 |
| 14 | L | Traditional process 8 | 276 | 522 | 33.3 | 17382.6 | 0.197 |
| 15 | H | Ex. 16 | 364 | 650 | 28.3 | 18395 | 0.22 |
| 16 | H | Traditional process 9 | 265 | 547 | 33 | 18051 | 0.191 |
| 17 | Q | Ex. 14 | 389 | 660 | 27.6 | 18216 | 0.232 |
| 18 | Q | Traditional process 7 | 304 | 523 | 33.4 | 17468.2 | 0.191 |
| 19 | I | Ex. 15 | 390 | 641 | 27.9 | 17883.9 | 0.225 |
| 20 | J | Ex. 16 | 388 | 679 | 27.9 | 18944.1 | 0.232 |
| 21 | N | Ex. 17 | 360 | 648 | 29.1 | 18856.8 | 0.213 |
| 22 | F | Ex. 18 | 365 | 647 | 30.3 | 19604.1 | 0.226 |
| 23 | K | Ex. 19 | 392 | 649 | 27.2 | 17652.8 | 0.226 |
| 24 | R | Ex. 20 | 353 | 669 | 29 | 19401 | 0.226 |
| 25 | G | Ex. 21 | 349 | 638 | 28 | 17864 | 0.225 |
| 26 | P | Ex. 22 | 377 | 642 | 28.6 | 18361.2 | 0.216 |

TABLE 5-continued

| No. | test steel | Main process parameters (Rapid heating-twostage) | Yield strength MPa | Tensile strength MPa | Elongation % | Product of strength and elongation MPa % | n90 value |
|---|---|---|---|---|---|---|---|
| 27 | S | Ex. 23 | 397 | 692 | 28 | 19376 | 0.233 |
| 28 | M | Ex. 24 | 395 | 689 | 27 | 18603 | 0.223 |

Example II

The composition of the test steel of the present disclosure is shown in Table 6. The specific parameters of the present example and the traditional processes are shown in Table 7 and Table 8. The main performances of the steel prepared from the test steel composition of this example according to the examples and the traditional processes are listed in Table 9 and Table 10.

It can be seen from Table 6-Table 10 that the process of the present disclosure can reduce the alloy content in the same grade of steel, refine grains, and obtain a matching of material structure and composition with strength and toughness. The dual-phase steel obtained by the process of the present disclosure has a yield strength of 400~533 MPa, a tensile strength of 781~878 MPa, an elongation of 19.5~24.1%, a product of strength and elongation of 16.3~19.3 GPa %, and a strain hardening index $n_{90}$ value of greater than 0.20, which is higher than that of the dual-phase steel produced by the traditional process.

Figure 7:
FIG. 7 is a microstructure photo of a dual-phase steel produced from test steel A of Example II according to Example 1 of the present disclosure.
Figure 8:
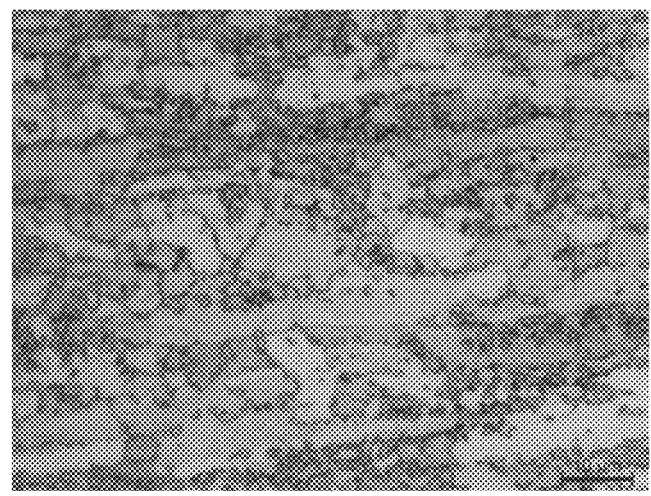
FIG. 8 is a microstructure photo of a dual-phase steel produced from test steel A of Example II according to Traditional process 1 of the present disclosure.

FIG. 7 is a structure photo of A steel having a typical composition obtained by Example 1, and FIG. 8 is a structure photo of A steel having a typical composition obtained by traditional process 1. It can be seen from the figures that there are very large differences in the structures treated by different heat treatment methods. The microstructure of the A steel after the rapid heat treatment process of this example is mainly composed of a fine, uniform martensitic structure and a small amount of carbide dispersed in ferrite matrix (FIG. 7). In the structure after treated by the process of the present disclosure, the grain structure of ferrite and martensite and carbide are very fine and evenly distributed in the matrix, which is very beneficial to the improvement of the strength and plasticity of the material. The A steel obtained by the traditional process treatment has a typical dual-phase steel microstructure (FIG. 8). That is, there is a small amount of black martensite structure on the grain boundary of white ferrite. Due to element segregation and other reasons, the material structure after traditional process treatment shows a certain directionality, and its ferrite structure is distributed in long strips along the rolling direction. The microstructure treated by the traditional process is characterized in that the grain size is relatively coarse, there is a certain banded structure with martensite and carbide distributed in a network along ferrite grain boundary, the ferrite grain is relatively coarse, and the distribution of dual-phase structure of ferrite and martensite is uneven.

Figure 9:
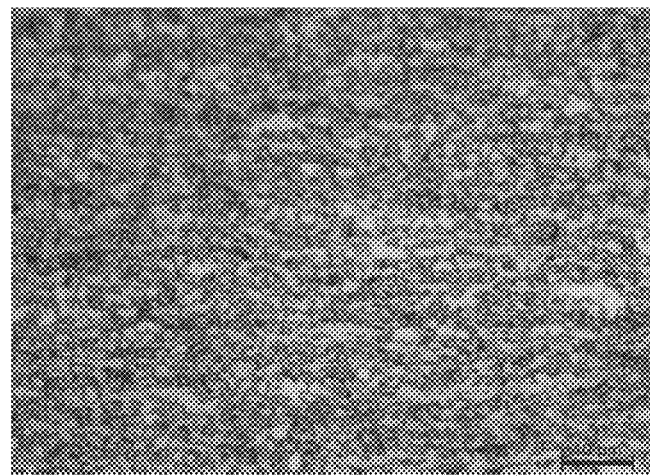
FIG. 9 is a microstructure photo of a dual-phase steel produced from test steel F of Example II according to Example 6 of the present disclosure.
Figure 10:
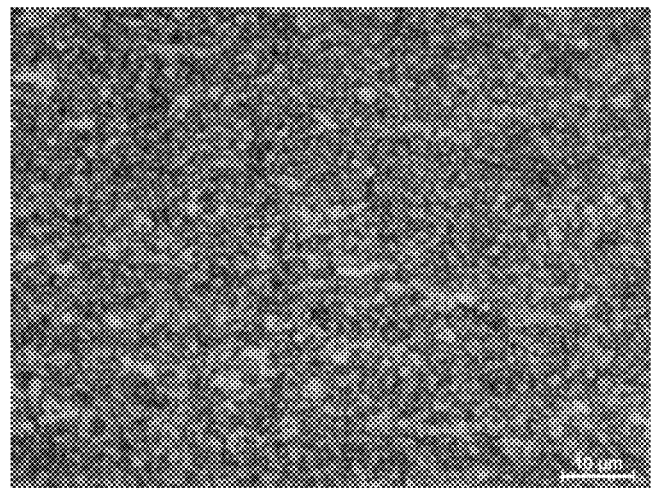
FIG. 10 is a microstructure photo of a dual-phase steel produced from test steel M of Example II according to Example 12 of the present disclosure.
Figure 11:
FIG. 11 is a microstructure photo of a dual-phase steel produced from test steel S of Example II according to Example 23 of the present disclosure.
Figure 12:
FIG. 12 is a microstructure photo of a dual-phase steel produced from test steel M of Example II according to Example 24 of the present disclosure.

FIG. 9 is a structure photo of F steel having a typical composition obtained by Example 6 (over ageing treatment), and FIG. 10 is a structure photo of M steel having a typical composition obtained by Example 12 (without over ageing treatment). FIG. 11 is a structure photo of S steel having a typical composition obtained by Example 23, and FIG. 12 is a structure photo of M steel having a typical composition obtained by Example 24. Examples 6, 12, 23, 24 all adopt processes with short heat treatment cycles. It can be seen from the figures that the removal of ageing treatment segment in the process of the present disclosure can also provide very uniform, fine, dispersed distribution of each phase structure. Therefore, the manufacturing process of the dual-phase steel of the present disclosure can refine grains, and make the structure of each phase of the material evenly distributed in the matrix, thereby improving the material structure and the material properties.

TABLE 6

| | (unit: mass percentage) | | | | | | | | | | |
|---|---|---|---|---|---|---|---|---|---|---|---|
| test steel | C | Si | Mn | Cr | Mo | Ti | Nb | V | P | S | Al |
| A | 0.05 | 0.50 | 2.00 | / | / | / | / | / | 0.010 | 0.0026 | 0.020 |
| B | 0.07 | 0.24 | 1.81 | / | / | / | / | / | 0.015 | 0.0025 | 0.035 |
| C | 0.10 | 0.33 | 1.52 | / | / | / | / | / | 0.015 | 0.0022 | 0.043 |
| D | 0.12 | 0.42 | 1.20 | / | / | / | / | / | 0.012 | 0.0018 | 0.055 |
| E | 0.05 | 0.44 | 1.41 | 0.25 | / | / | / | / | 0.010 | 0.0025 | 0.022 |
| F | 0.06 | 0.35 | 1.63 | / | 0.18 | / | / | / | 0.014 | 0.0025 | 0.034 |
| G | 0.09 | 0.1 | 1.52 | / | / | 0.040 | / | / | 0.015 | 0.0021 | 0.042 |
| H | 0.11 | 0.42 | 1.44 | / | / | / | 0.033 | / | 0.012 | 0.0020 | 0.053 |
| I | 0.09 | 0.26 | 1.61 | / | / | / | / | 0.035 | 0.012 | 0.0022 | 0.043 |
| J | 0.05 | 0.43 | 1.23 | 0.22 | 0.20 | / | / | / | 0.010 | 0.0023 | 0.020 |
| K | 0.06 | 0.27 | 1.40 | 0.20 | / | 0.025 | / | / | 0.015 | 0.0025 | 0.035 |
| L | 0.08 | 0.10 | 1.52 | 0.18 | / | / | 0.05 | / | 0.015 | 0.0022 | 0.043 |
| M | 0.10 | 0.46 | 1.41 | 0.21 | / | / | / | 0.025 | 0.013 | 0.0019 | 0.055 |
| N | 0.07 | 0.50 | 1.52 | / | 0.15 | 0.028 | / | / | 0.012 | 0.0023 | 0.043 |
| O | 0.08 | 0.18 | 1.71 | / | 0.18 | / | 0.025 | / | 0.010 | 0.0026 | 0.035 |
| P | 0.10 | 0.23 | 1.82 | / | 0.14 | / | / | 0.050 | 0.015 | 0.0023 | 0.043 |
| Q | 0.08 | 0.19 | 1.72 | / | / | 0.025 | 0.030 | / | 0.013 | 0.0025 | 0.035 |
| R | 0.10 | 0.22 | 1.83 | / | / | 0.020 | / | 0.041 | 0.015 | 0.0021 | 0.043 |
| S | 0.09 | 0.31 | 1.65 | / | / | / | 0.025 | 0.030 | 0.012 | 0.0018 | 0.055 |

TABLE 7

| | Hot rolling Coiling temperature °C. | Cold rolling reduction rate % | Rapid heating rate (one stage) °C./s | Soaking Soaking temperature °C. | Soaking time s | Slow cooling Cooling rate °C./s | Slow cooling Temperature after Cooling °C. | Rapid cooling Cooling rate °C./s | Rapid cooling Temperature after cooling °C. | Over ageing treatment Over ageing temperature °C. | Over ageing time s | Final Cooling rate °C./s | Total time of rapid heat treatment s |
|---|---|---|---|---|---|---|---|---|---|---|---|---|---|
| Ex. 1 | 680 | 45 | 50 | 750 | 60 | 15 | 670 | 60 | 240 | 240 | 180 | 30 | 274.43 |
| Ex. 2 | 650 | 85 | 80 | 770 | 50 | 13 | 690 | 50 | 230 | 230 | 200 | 40 | 279.98 |
| Ex. 3 | 610 | 75 | 150 | 800 | 40 | 11 | 700 | 80 | 235 | 235 | 150 | 50 | 214.40 |
| Ex. 4 | 580 | 65 | 300 | 830 | 30 | 9 | 730 | 160 | 260 | 260 | 120 | 35 | 173.61 |
| Ex. 5 | 550 | 70 | 500 | 845 | 10 | 6 | 770 | 200 | 280 | 280 | 110 | 38 | 143.44 |
| Ex. 6 | 590 | 40 | 250 | 835 | 20 | 5 | 750 | 180 | 250 | 250 | 100 | 45 | 148.15 |
| Ex. 7 | 640 | 50 | 350 | 795 | 55 | 12 | 695 | 140 | 238 | 238 | 80 | 43 | 153.88 |
| Ex. 8 | 600 | 68 | 400 | 780 | 45 | 8 | 740 | 130 | 252 | 252 | 60 | 48 | 120.49 |
| Ex. 9 | 570 | 60 | 230 | 815 | 35 | 10 | 710 | 110 | 270 | 270 | 40 | 33 | 100.53 |
| Ex. 10 | 630 | 80 | 100 | 830 | 25 | 14 | 680 | 145 | 245 | 245 | 20 | 30 | 74.31 |
| Ex. 11 | 660 | 77 | 180 | 820 | 30 | 7 | 720 | 135 | 20 | / | / | 30 | 53.92 |
| Ex. 12 | 550 | 55 | 200 | 835 | 20 | 9 | 760 | 90 | 20 | / | / | 30 | 40.63 |
| Traditional process 1 | 680 | 85 | 11 | 750 | 160 | 10 | 675 | 100 | 230 | 230 | 290 | 30 | 535.31 |
| Traditional process 2 | 650 | 75 | 10 | 770 | 130 | 9 | 675 | 80 | 250 | 250 | 260 | 30 | 488.53 |
| Traditional process 3 | 610 | 65 | 11 | 800 | 110 | 10 | 675 | 75 | 240 | 240 | 230 | 30 | 436.54 |
| Traditional process 4 | 580 | 55 | 13 | 830 | 90 | 8 | 675 | 60 | 260 | 260 | 160 | 30 | 346.60 |
| Traditional process 5 | 550 | 40 | 15 | 845 | 70 | 12 | 675 | 50 | 280 | 280 | 180 | 30 | 332.40 |

TABLE 8

| | Hot rolling Coiling temperature °C. | Cold rolling reduction rate % | Rapid heating (two-stage) Heating rate in the first stage °C./s | Rapid heating (two-stage) Temperature after heating in the first stage °C. | Rapid heating (two-stage) Heating rate in the second stage °C./s | Soaking Soaking temperature °C. | Soaking Soaking time s | Slow cooling Cooling rate °C./s | Slow cooling Temperature after cooling °C. | Rapid cooling Cooling rate °C./s | Rapid cooling Temperature after cooling °C. | Over ageing treatment Over ageing temperature °C. | Over ageing time s | Final Cooling rate °C./s | Total time of rapid heat treatment s |
|---|---|---|---|---|---|---|---|---|---|---|---|---|---|---|---|
| Ex. 13 | 680 | 45 | 15 | 550 | 500 | 750 | 60 | 15 | 670 | 60 | 240 | 240 | 180 | 30 | 295.57 |
| Ex. 14 | 650 | 85 | 30 | 570 | 300 | 770 | 50 | 13 | 690 | 50 | 230 | 230 | 200 | 40 | 289.60 |
| Ex. 15 | 610 | 75 | 80 | 600 | 150 | 800 | 40 | 11 | 700 | 80 | 235 | 235 | 150 | 50 | 217.79 |
| Ex. 16 | 580 | 65 | 150 | 630 | 80 | 830 | 30 | 9 | 730 | 160 | 260 | 260 | 120 | 35 | 177.47 |
| Ex. 17 | 550 | 70 | 300 | 640 | 50 | 845 | 10 | 6 | 770 | 200 | 280 | 280 | 110 | 38 | 147.96 |
| Ex. 18 | 590 | 40 | 500 | 650 | 30 | 835 | 20 | 5 | 750 | 180 | 250 | 250 | 100 | 45 | 152.32 |
| Ex. 19 | 640 | 50 | 450 | 647 | 400 | 795 | 55 | 12 | 695 | 140 | 238 | 238 | 80 | 43 | 153.43 |
| Ex. 20 | 600 | 68 | 350 | 635 | 450 | 780 | 45 | 8 | 740 | 130 | 252 | 252 | 60 | 48 | 120.67 |
| Ex. 21 | 570 | 60 | 400 | 640 | 350 | 815 | 35 | 10 | 710 | 110 | 270 | 270 | 40 | 33 | 99.13 |
| Ex. 22 | 630 | 80 | 250 | 620 | 250 | 830 | 25 | 14 | 680 | 145 | 245 | 245 | 20 | 30 | 69.45 |
| Ex. 23 | 660 | 77 | 100 | 580 | 150 | 820 | 30 | 7 | 720 | 135 | 20 | / | / | / | 56.67 |
| Ex. 24 | 550 | 55 | 200 | 610 | 200 | 835 | 20 | 9 | 760 | 90 | 20 | / | / | / | 40.63 |
| Traditional process 6 | 680 | 85 | 11 | 150 | 8 | 750 | 160 | 10 | 675 | 100 | 230 | 230 | 290 | 30 | 555.77 |
| Traditional process 7 | 650 | 75 | 10 | 150 | 7 | 770 | 130 | 9 | 675 | 80 | 250 | 250 | 260 | 30 | 515.11 |
| Traditional process 8 | 610 | 65 | 11 | 180 | 6 | 800 | 110 | 10 | 675 | 75 | 240 | 240 | 230 | 30 | 483.51 |
| Traditional process 9 | 580 | 55 | 13 | 210 | 5 | 830 | 90 | 8 | 675 | 60 | 260 | 260 | 160 | 30 | 422.91 |
| Traditional process 10 | 550 | 40 | 15 | 250 | 5 | 845 | 70 | 12 | 675 | 50 | 280 | 280 | 180 | 30 | 415.07 |

TABLE 9

| No | test steel | Main process parameters (Rapid heating-one stage) | Yield strength MPa | Tensile strength MPa | Elongation % | Product of strength and elongation MPa % | n90 value |
|---|---|---|---|---|---|---|---|
| 1 | A | Traditional process 1 | 357 | 655 | 28.4 | 18602 | 0.165 |
| 2 | A | Ex. 1 | 487 | 807 | 22.1 | 17834.7 | 0.202 |
| 3 | B | Traditional process 2 | 361 | 665 | 27 | 17955 | 0.159 |
| 4 | B | Ex. 2 | 490 | 814 | 22.4 | 18233.6 | 0.221 |
| 5 | C | Traditional process 3 | 367 | 678 | 27.5 | 18645 | 0.174 |
| 6 | C | Ex. 3 | 495 | 798 | 22.5 | 17955 | 0.212 |
| 7 | D | Traditional process 4 | 339 | 670 | 26.6 | 17822 | 0.174 |
| 8 | D | Ex. 4 | 473 | 781 | 23.5 | 18353.5 | 0.213 |
| 9 | E | Traditional process 5 | 362 | 692 | 25.7 | 17784.4 | 0.16 |
| 10 | E | Ex. 5 | 509 | 807 | 22.6 | 18238.2 | 0.22 |
| 11 | O | Ex. 6 | 475 | 815 | 21.6 | 17604 | 0.205 |
| 12 | O | Traditional process 4 | 365 | 678 | 27.4 | 18577.2 | 0.161 |
| 13 | L | Ex. 7 | 508 | 797 | 23.6 | 18809.2 | 0.225 |
| 14 | L | Traditional process 3 | 357 | 617 | 27.3 | 16844.1 | 0.164 |
| 15 | H | Ex. 4 | 490 | 800 | 24.1 | 19280 | 0.231 |
| 16 | H | Traditional process 4 | 363 | 650 | 27.8 | 18070 | 0.171 |
| 17 | Q | Ex. 2 | 498 | 814 | 23.2 | 18884.8 | 0.215 |
| 18 | Q | Traditional process 2 | 368 | 680 | 26.6 | 18088 | 0.175 |
| 19 | I | Ex. 3 | 491 | 804 | 22.4 | 18009.6 | 0.223 |
| 20 | J | Ex. 4 | 513 | 802 | 21.1 | 16922.2 | 0.216 |
| 21 | N | Ex. 5 | 499 | 802 | 23.4 | 18766.8 | 0.224 |
| 22 | F | Ex. 6 | 502 | 813 | 21.6 | 17560.8 | 0.221 |
| 23 | K | Ex. 7 | 509 | 809 | 20.7 | 16746.3 | 0.223 |
| 24 | R | Ex. 8 | 511 | 820 | 20.3 | 16646 | 0.217 |
| 25 | G | Ex. 9 | 533 | 817 | 22 | 17974 | 0.213 |
| 26 | P | Ex. 10 | 530 | 814 | 23 | 18722 | 0.221 |
| 27 | S | Ex. 11 | 524 | 822 | 22.5 | 18495 | 0.231 |
| 28 | M | Ex. 12 | 518 | 829 | 21.7 | 17989.3 | 0.203 |

TABLE 10

| No. | test steel | Main process parameters (Rapid heating-two stage) | Yield strength MPa | Tensile strength MPa | Elongation % | Product of strength and elongation MPa % | n90 value |
|---|---|---|---|---|---|---|---|
| 1 | A | Traditional process 6 | 343 | 716 | 20.6 | 14749.6 | 0.165 |
| 2 | A | Ex. 13 | 417 | 812 | 20.07 | 16296.84 | 0.224 |
| 3 | B | Traditional process 7 | 330 | 661 | 24.7 | 16326.7 | 0.173 |
| 4 | B | Ex. 14 | 419 | 816 | 22.7 | 18523.2 | 0.266 |
| 5 | C | Traditional process 8 | 343 | 693 | 25.7 | 17810.1 | 0.163 |
| 6 | C | Ex. 15 | 416 | 808 | 23.1 | 18664.8 | 0.271 |
| 7 | D | Traditional process 9 | 350 | 683 | 24 | 16392 | 0.175 |
| 8 | D | Ex. 16 | 400 | 798 | 22 | 17556 | 0.226 |
| 9 | E | Traditional process 10 | 401 | 688 | 24.3 | 16718.4 | 0.174 |
| 10 | E | Ex. 17 | 438 | 847 | 19.5 | 16516.5 | 0.233 |
| 11 | O | Ex. 18 | 434 | 827 | 21.7 | 17945.9 | 0.222 |
| 12 | O | Traditional process 9 | 422 | 716 | 23.7 | 16969.2 | 0.166 |
| 13 | L | Ex. 19 | 458 | 834 | 22.1 | 18431.4 | 0.246 |
| 14 | L | Traditional process 8 | 474 | 746 | 22.1 | 16486.6 | 0.173 |
| 15 | H | Ex. 16 | 487 | 858 | 21.2 | 18189.6 | 0.22 |
| 16 | H | Traditional process 9 | 421 | 723 | 23.8 | 17207.4 | 0.176 |
| 17 | Q | Ex. 14 | 457 | 862 | 21.5 | 18533 | 0.224 |
| 18 | Q | Traditional process 7 | 405 | 695 | 24.4 | 16958 | 0.174 |
| 19 | I | Ex. 15 | 479 | 841 | 21.3 | 17913.3 | 0.224 |
| 20 | J | Ex. 16 | 462 | 843 | 20.1 | 16944.3 | 0.222 |
| 21 | N | Ex. 17 | 440 | 812 | 22.1 | 17945.2 | 0.223 |
| 22 | F | Ex. 18 | 462 | 846 | 21.9 | 18527.4 | 0.236 |
| 23 | K | Ex. 19 | 465 | 856 | 20.4 | 17462.4 | 0.224 |
| 24 | R | Ex. 20 | 443 | 845 | 20.1 | 16984.5 | 0.214 |
| 25 | G | Ex. 21 | 476 | 853 | 21.5 | 18339.5 | 0.236 |
| 26 | P | Ex. 22 | 460 | 858 | 21.6 | 18532.8 | 0.216 |
| 27 | S | Ex. 23 | 483 | 878 | 20.4 | 17911.2 | 0.223 |
| 28 | M | Ex. 24 | 482 | 874 | 20.5 | 17917 | 0.223 |

Example III

The composition of the test steel of the present disclosure is shown in Table 11. The specific parameters of the present example and the traditional processes are shown in Table 12 (heating in one stage) and Table 13 (heating in two stages). The main performances of the hot-dip galvanized dual phase steel GI and GA prepared from the test steel composition of this example according to the examples and the traditional processes in Table 2 and Table 3 are listed in Table 14 and Table 15.

It can be seen from Table 11-Table 15 that the process of the present disclosure can reduce the alloy content in the same grade of steel and obtain a matching of material structure and composition with strength and toughness. The dual-phase steel obtained by the process of the present disclosure has a yield strength of 347~405 MPa, a tensile strength of 624~709 MPa, an elongation of 22.2~30.3%, a product of strength and elongation of 15.7~19.6 GPa %, and a strain hardening index $n_{90}$ value of greater than 0.21.

Figure 13:
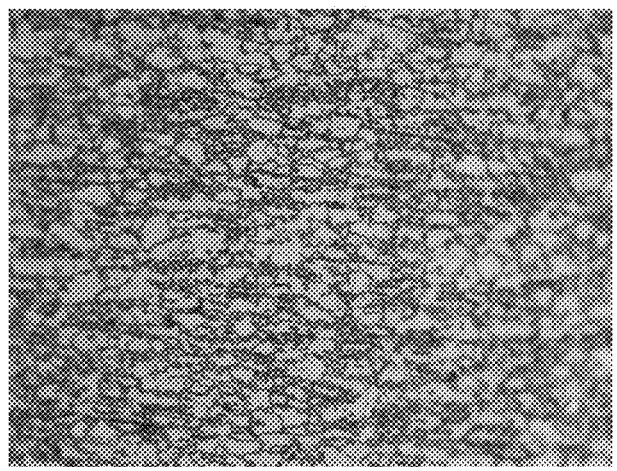
FIG. 13 is a microstructure photo of a hot dip galvanized dual-phase steel (GI) produced from test steel A of Example III according to Example 1 of the present disclosure.
Figure 14:
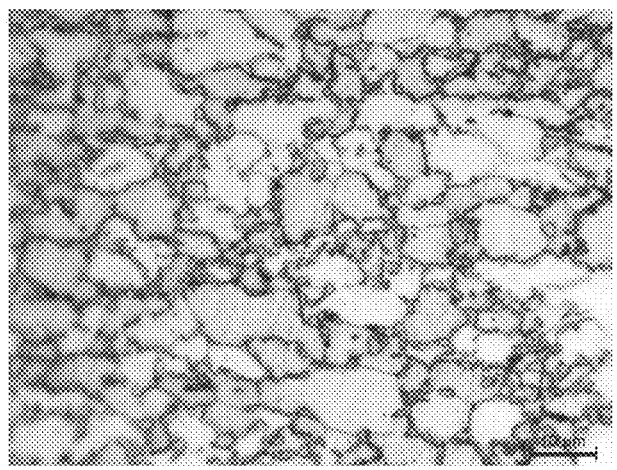
FIG. 14 is a microstructure photo of a hot dip galvanized dual-phase steel (GI) produced from test steel A of Example III according to the present disclosure at a heating rate of Traditional process 1.

FIG. 13 and FIG. 14 are structure photos of A steel having a typical composition obtained by Example 1 and Comparative Traditional process 1. It can be seen from the figures that there are very big differences in the structure after hot-dip galvanizing. The A steel after rapid heat treatment of the present disclosure has a microstructure composed of fine, uniform martensitic structure and carbides dispersed on a fine ferritic matrix. In the microstructure of the steel after the process treatment of the present disclosure, ferritic, martensitic grain structure and carbide are very fine and evenly dispersed, which is very beneficial to the improvement of the strength and plasticity of the material. The A steel obtained by the traditional process treatment has a typical dual-phase steel microstructure (FIG. 2). That is, there is a small amount of black martensite structure on the grain boundary of large pieces of white ferrite. The microstructure treated by the traditional process is characterized in that the grain size is relatively coarse, martensite and carbide are distributed in a network along ferrite grain boundary, and the content of martensite is not high.

Figure 15:
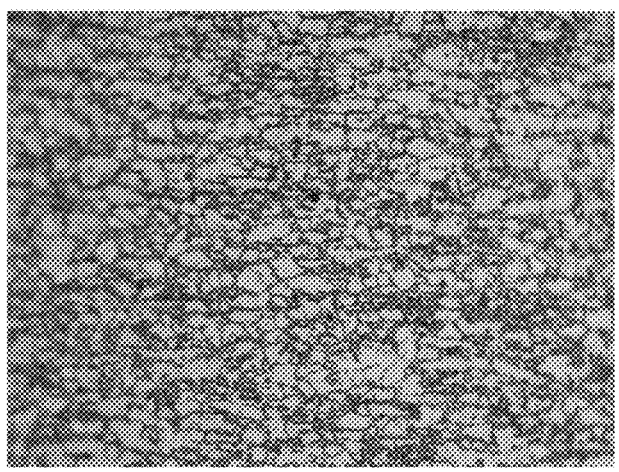
FIG. 15 is a microstructure photo of an alloy galvannealed dual-phase steel (GA) produced from test steel I of Example III according to Example 17 of the present disclosure.
Figure 16:
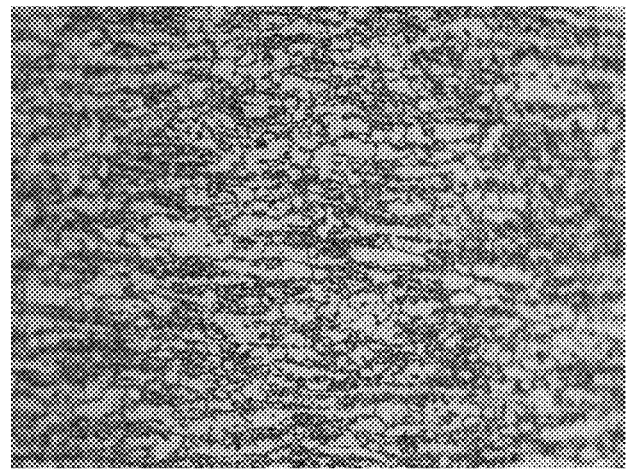
FIG. 16 is a microstructure photo of a hot dip galvanized dual-phase steel (GI) produced from test steel D of Example III according to Example 22 of the present disclosure.
Figure 17:
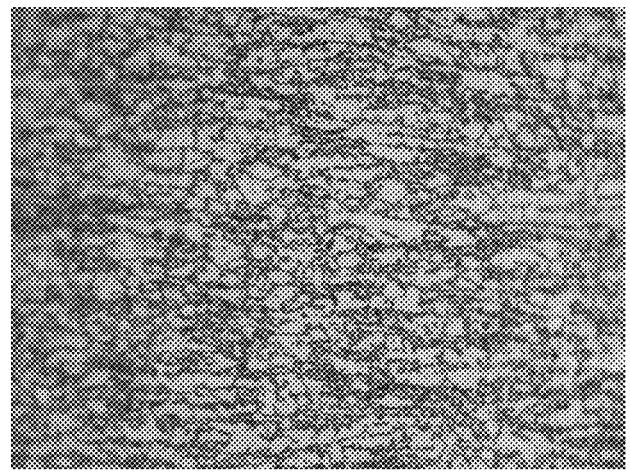
FIG. 17 is a microstructure photo of an alloy galvannealed dual-phase steel (GA) produced from test steel I of Example III according to Example 34 of the present disclosure.

FIG. 15 is a structure photo of I steel having a typical composition obtained by Example 17 (GA), and FIG. 16 is a structure photo of D steel having a typical composition obtained by Example 22 (GI). FIG. 17 is a structure photo of I steel having a typical composition obtained by Example 34 (GA). Examples 17, 22, 34 all adopt processes with short heat treatment cycles. It can be seen from the figures that the hot-dip galvanizing process by rapid heat treatment of the present disclosure can also provide a very uniform, fine, dispersed distribution of each phase structure after alloying (FIG. 15 and FIG. 17). The manufacturing process of the hot-galvanized dual-phase steel of the present disclosure can refine grains and make the structure of each phase of the material evenly distributed in the matrix, thereby improving the material structure and the material properties.

TABLE 11

(unit: mass percentage)

| test steel | C | Si | Mn | Cr | Mo | Ti | Nb | V | P | S | Al |
|---|---|---|---|---|---|---|---|---|---|---|---|
| A | 0.045 | 0.10 | 1.50 | / | / | / | / | / | 0.0105 | 0.0045 | 0.0272 |
| B | 0.055 | 0.21 | 1.46 | / | / | / | / | / | 0.0136 | 0.0059 | 0.0304 |
| C | 0.084 | 0.33 | 1.35 | / | / | / | / | / | 0.0124 | 0.0052 | 0.0402 |
| D | 0.105 | 0.40 | 1.00 | / | / | / | / | / | 0.0149 | 0.0056 | 0.0200 |
| E | 0.051 | 0.17 | 1.27 | 0.24 | / | / | / | / | 0.0200 | 0.0059 | 0.0496 |
| F | 0.062 | 0.25 | 1.56 | / | 0.15 | / | / | / | 0.0136 | 0.0041 | 0.0550 |
| G | 0.082 | 0.18 | 1.35 | / | / | 0.021 | / | / | 0.0160 | 0.0044 | 0.0491 |
| H | 0.103 | 0.28 | 1.20 | / | / | / | 0.023 | / | 0.0150 | 0.0057 | 0.0377 |
| I | 0.098 | 0.19 | 1.16 | / | / | / | / | 0.026 | 0.0156 | 0.0043 | 0.0508 |
| J | 0.046 | 0.27 | 1.48 | 0.23 | 0.07 | / | / | / | 0.0177 | 0.0051 | 0.0403 |
| K | 0.065 | 0.15 | 1.49 | 0.25 | / | 0.017 | / | / | 0.0119 | 0.0024 | 0.0289 |
| L | 0.101 | 0.18 | 1.44 | 0.21 | / | / | 0.020 | / | 0.0098 | 0.0035 | 0.0390 |
| M | 0.095 | 0.25 | 1.26 | 0.24 | / | / | / | 0.021 | 0.0095 | 0.0060 | 0.0251 |
| N | 0.076 | 0.36 | 1.37 | / | 0.17 | 0.022 | / | / | 0.0103 | 0.0026 | 0.0378 |
| O | 0.088 | 0.13 | 1.50 | / | 0.14 | / | 0.015 | / | 0.0119 | 0.0059 | 0.0338 |
| P | 0.102 | 0.21 | 1.38 | / | 0.15 | / | / | 0.020 | 0.0195 | 0.0060 | 0.0241 |
| Q | 0.085 | 0.32 | 1.47 | / | / | 0.016 | 0.020 | / | 0.0137 | 0.0053 | 0.0425 |
| R | 0.102 | 0.28 | 1.49 | / | / | 0.020 | / | 0.021 | 0.02 | 0.0048 | 0.0377 |
| S | 0.097 | 0.23 | 1.44 | / | / | / | 0.015 | 0.020 | 0.0141 | 0.0034 | 0.0365 |

TABLE 12

| | Hot rolling Coiling temperature ° C. | Cold rolling reduction rate % | Rapid heating rate (one stage) ° C./s | Soaking Soaking temperature ° C. | Soaking time s | Slow cooling Cooling rate ° C./s | Temperature after cooling ° C. | Rapid cooling Cooling rate ° C./s | Temperature after cooling ° C. | Hot-dip galvanizing temperature ° C. | Alloying Heating rate ° C./s | Alloying temperature ° C. | times | Final Cooling rate ° C./s | Total time of rapid heat treatment and hot-dip galvanizing s |
|---|---|---|---|---|---|---|---|---|---|---|---|---|---|---|---|
| Ex. 1 | 680 | 40 | 50 | 750 | 60 | 15 | 670 | 50 | 460 | 460 | / | / | / | 100 | 88.53 |
| Ex. 2 | 650 | 85 | 80 | 770 | 50 | 13 | 690 | 60 | 465 | 465 | / | / | / | 80 | 74.84 |

TABLE 12-continued

|  | Hot rolling Coiling temperature ° C. | Cold rolling reduction rate % | Rapid heat treatment (one stage) | | | | | | | | | | | Total time of rapid heat treatment and hot-dip galvanizing s |
|---|---|---|---|---|---|---|---|---|---|---|---|---|---|---|
|  |  |  | Rapid heating rate (one stage) ° C./s | Soaking | | Slow cooling | | Rapid cooling | | Hot-dip galva- nizing tem- perature ° C. | Alloying | | | Final Cool- ing rate ° C./s |  |
|  |  |  |  | Soak- ing tem- perature ° C. | Soak- ing time s | Cool- ing rate ° C./s | Tem- perature after cooling ° C. | Cool- ing rate ° C./s | Tem- perature after cooling ° C. |  | Heat- ing rate ° C./s | tem- pera- ture ° C. | times |  |  |
| Ex. 3 | 610 | 70 | 150 | 790 | 40 | 11 | 700 | 80 | 470 | 470 | / | / | / | 75 | 62.19 |
| Ex. 4 | 580 | 60 | 300 | 800 | 30 | 9 | 730 | 100 | 466 | 466 | / | / | / | 60 | 50.45 |
| Ex. 5 | 550 | 65 | 500 | 840 | 10 | 15 | 770 | 120 | 467 | 467 | / | / | / | 50 | 29.58 |
| Ex. 6 | 590 | 45 | 250 | 845 | 20 | 5 | 750 | 150 | 461 | 461 | / | / | / | 30 | 58.93 |
| Ex. 7 | 640 | 55 | 350 | 795 | 55 | 12 | 695 | 140 | 468 | 468 | / | / | / | 140 | 70.37 |
| Ex. 8 | 590 | 63 | 400 | 790 | 45 | 8 | 670 | 130 | 469 | 469 | / | / | / | 150 | 66.46 |
| Ex. 9 | 570 | 55 | 230 | 815 | 35 | 10 | 675 | 100 | 460 | 460 | / | / | / | 120 | 58.27 |
| Ex. 10 | 560 | 75 | 100 | 830 | 25 | 14 | 710 | 200 | 470 | 470 | / | / | / | 100 | 48.39 |
| Ex. 11 | 600 | 72 | 180 | 820 | 30 | 7 | 675 | 170 | 465 | 465 | / | / | / | 130 | 61.36 |
| Ex. 12 | 550 | 50 | 200 | 835 | 20 | 6 | 720 | 180 | 470 | 470 | / | / | / | 150 | 49.11 |
| Ex. 13 | 680 | 40 | 50 | 750 | 60 | 15 | 670 | 50 | 460 | 460 | 30 | 480 | 20 | 30 | 122.93 |
| Ex. 14 | 650 | 85 | 80 | 770 | 50 | 13 | 690 | 60 | 465 | 465 | 50 | 490 | 17 | 60 | 95.36 |
| Ex. 15 | 610 | 70 | 150 | 790 | 40 | 11 | 710 | 80 | 470 | 470 | 100 | 510 | 15 | 90 | 76.25 |
| Ex. 16 | 580 | 60 | 300 | 820 | 30 | 9 | 730 | 100 | 466 | 466 | 150 | 530 | 12 | 150 | 61.13 |
| Ex. 17 | 550 | 65 | 500 | 845 | 10 | 6 | 770 | 120 | 467 | 467 | 200 | 550 | 10 | 250 | 39.21 |
| Traditional process 1 | 680 | 80 | 11 | 770 | 160 | 10 | 675 | 100 | 470 | 470 | / | / | / | 30 | 254.05 |
| Traditional process 2 | 650 | 76 | 10 | 790 | 130 | 9 | 675 | 80 | 465 | 465 | / | / | / | 60 | 229.82 |
| Traditional process 3 | 610 | 70 | 11 | 810 | 110 | 10 | 675 | 75 | 460 | 460 | / | / | / | 90 | 203.07 |
| Traditional process 4 | 580 | 65 | 13 | 830 | 90 | 8 | 675 | 60 | 470 | 470 | / | / | / | 120 | 178.85 |
| Traditional process 5 | 550 | 60 | 15 | 845 | 70 | 12 | 675 | 50 | 470 | 470 | / | / | / | 150 | 146.27 |
| Traditional process 6 | 680 | 80 | 12 | 770 | 160 | 10 | 675 | 100 | 470 | 470 | 12 | 480 | 20 | 30 | 270.22 |
| Traditional process 7 | 650 | 76 | 14 | 790 | 130 | 9 | 675 | 80 | 465 | 465 | 16 | 490 | 17 | 60 | 226.80 |
| Traditional process 8 | 610 | 70 | 10 | 810 | 110 | 10 | 675 | 75 | 460 | 460 | 10 | 510 | 15 | 90 | 230.81 |
| Traditional process 9 | 580 | 65 | 11 | 830 | 90 | 8 | 675 | 60 | 470 | 470 | 20 | 530 | 12 | 120 | 205.68 |
| Traditional process 10 | 550 | 60 | 15 | 845 | 70 | 12 | 675 | 50 | 470 | 470 | 25 | 550 | 10 | 150 | 160.00 |

TABLE 13

|  | Hot rolling Coiling tem- pera- ture ° C. | Cold rolling re- duction rate % | Rapid heat treatment (two-stage) | | | | | | | | | | | | | Total time of rapid heat treat- ment and hot-dip gal- va- nizing s |
|---|---|---|---|---|---|---|---|---|---|---|---|---|---|---|---|---|
|  |  |  | Rapid heating (two-stage) | | | | Soaking | | Slow cooling | | Rapid cooling | | Hot- dip galva- nizing tem- pera- ture ° C. | Alloying | | | Final Cool- ing rate ° C./s |
|  |  |  | Heat- ing rate in the first stage ° C./s | Tem- pera- ture after heating in the first stage ° C. | Heat- ing rate in the second stage ° C./s | Soak- ing tem- pera- ture ° C. | Soak- ing time s | Cool- ing rate ° C./s | Tem- pera- ture after cool- ing ° C. | Cool- ing rate ° C./s | Tem- pera- ture after cool- ing ° C. |  | heat- ing rate ° C./s | tem- pera- ture ° C. | time s |  |
| Ex. 18 | 680 | 40 | 15 | 550 | 500 | 750 | 60 | 15 | 670 | 50 | 460 | 460 | / | / | / | 100 | 109.67 |
| Ex. 19 | 650 | 85 | 30 | 570 | 300 | 770 | 50 | 13 | 690 | 60 | 465 | 465 | / | / | / | 80 | 84.47 |
| Ex. 20 | 610 | 70 | 80 | 600 | 150 | 790 | 40 | 11 | 700 | 80 | 470 | 470 | / | / | / | 75 | 65.57 |
| Ex. 21 | 580 | 60 | 150 | 630 | 80 | 800 | 30 | 9 | 730 | 100 | 466 | 466 | / | / | / | 60 | 54.04 |
| Ex. 22 | 550 | 65 | 300 | 640 | 50 | 840 | 10 | 15 | 770 | 120 | 467 | 467 | / | / | / | 50 | 32.20 |
| Ex. 23 | 590 | 45 | 500 | 650 | 30 | 845 | 20 | 5 | 750 | 150 | 461 | 461 | / | / | / | 30 | 63.39 |
| Ex. 24 | 640 | 55 | 250 | 647 | 200 | 795 | 55 | 12 | 695 | 140 | 468 | 468 | / | / | / | 140 | 71.40 |
| Ex. 25 | 590 | 63 | 350 | 635 | 450 | 790 | 45 | 8 | 670 | 130 | 469 | 469 | / | / | / | 150 | 66.64 |

TABLE 13-continued

| | | | Rapid heat treatment (two-stage) | | | | | | | | | | | | | Total |
|---|---|---|---|---|---|---|---|---|---|---|---|---|---|---|---|---|
| | | | Rapid heating (two-stage) | | | | | | | | | | | | | time of rapid |
| | | | | | | | Soaking | | Slow cooling | | Rapid cooling | | Hot-dip galva-nizing | Alloying | | | heat treat-ment and hot-dip gal-va-nizing |
| | Hot rolling Coiling tem-pera-ture ° C. | Cold rolling re-duction rate % | Heat-ing rate in the first stage ° C./s | Tem-pera-ture after heating in the first stage ° C. | Heat-ing rate in the second stage ° C./s | Soak-ing tem-pera-ture ° C. | Soak-ing time s | Cool-ing rate ° C./s | after cool-ing ° C. | Cool-ing rate ° C./s | after cool-ing ° C. | tem-pera-ture ° C. | heat-ing rate ° C./s | tem-pera-ture ° C. | time s | Final Cool-ing rate ° C./s | s |
| Ex. 26 | 570 | 55 | 400 | 640 | 350 | 815 | 35 | 10 | 675 | 100 | 460 | 460 | / | / | / | 120 | 56.87 |
| Ex. 27 | 560 | 75 | 250 | 620 | 250 | 830 | 25 | 14 | 710 | 200 | 470 | 470 | / | / | / | 100 | 43.01 |
| Ex. 28 | 600 | 72 | 100 | 580 | 150 | 820 | 30 | 7 | 675 | 170 | 465 | 465 | / | / | / | 130 | 63.60 |
| Ex. 29 | 550 | 50 | 200 | 610 | 200 | 835 | 20 | 6 | 720 | 180 | 470 | 470 | / | / | / | 150 | 48.23 |
| Ex. 30 | 680 | 40 | 15 | 550 | 500 | 750 | 60 | 15 | 670 | 50 | 460 | 460 | 30 | 480 | 20 | 30 | 141.27 |
| Ex. 31 | 650 | 85 | 30 | 570 | 300 | 770 | 50 | 13 | 690 | 60 | 465 | 465 | 50 | 490 | 17 | 60 | 104.24 |
| Ex. 32 | 610 | 70 | 80 | 600 | 150 | 790 | 40 | 11 | 710 | 80 | 470 | 470 | 100 | 510 | 15 | 90 | 79.63 |
| Ex. 33 | 580 | 60 | 150 | 630 | 80 | 820 | 30 | 9 | 730 | 100 | 466 | 466 | 150 | 530 | 12 | 150 | 64.91 |
| Ex. 34 | 550 | 65 | 300 | 640 | 50 | 845 | 10 | 6 | 770 | 120 | 467 | 467 | 200 | 550 | 10 | 250 | 43.73 |
| Traditional process 11 | 680 | 80 | 11 | 150 | 8 | 770 | 160 | 10 | 675 | 100 | 470 | 470 | / | / | / | 30 | 275.87 |
| Traditional process 12 | 650 | 76 | 10 | 150 | 7 | 790 | 130 | 9 | 675 | 80 | 465 | 465 | / | / | / | 60 | 257.25 |
| Traditional process 13 | 610 | 70 | 11 | 180 | 6 | 810 | 110 | 10 | 675 | 75 | 460 | 460 | / | / | / | 90 | 250.80 |
| Traditional process 14 | 580 | 65 | 13 | 210 | 5 | 830 | 90 | 8 | 675 | 60 | 470 | 470 | / | / | / | 120 | 255.16 |
| Traditional process 15 | 550 | 60 | 15 | 250 | 5 | 845 | 70 | 12 | 675 | 50 | 470 | 470 | / | / | / | 150 | 225.60 |
| Traditional process 16 | 680 | 80 | 11 | 150 | 8 | 770 | 160 | 10 | 675 | 100 | 470 | 470 | 12 | 480 | 20 | 30 | 297.03 |
| Traditional process 17 | 650 | 76 | 10 | 150 | 7 | 790 | 130 | 9 | 675 | 80 | 465 | 465 | 16 | 490 | 17 | 60 | 276.23 |
| Traditional process 18 | 610 | 70 | 11 | 180 | 6 | 810 | 110 | 10 | 675 | 75 | 460 | 460 | 10 | 510 | 15 | 90 | 271.36 |
| Traditional process 19 | 580 | 65 | 13 | 210 | 5 | 830 | 90 | 8 | 675 | 60 | 470 | 470 | 20 | 530 | 12 | 120 | 270.66 |
| Traditional process 20 | 550 | 60 | 15 | 250 | 5 | 845 | 70 | 12 | 675 | 50 | 470 | 470 | 25 | 550 | 10 | 150 | 239.33 |

TABLE 14

| No. | test steel | Type of the Product | Main process parameters (Rapid heating-one stage) | Yield strength MPa | Tensile strength MPa | Elongation % | Product of strength and elongation MPa % | n90 value |
|---|---|---|---|---|---|---|---|---|
| 1 | A | Hot dip galvanized | Traditional process 1 | 271 | 490 | 33.6 | 16464 | 0.165 |
| 2 | A | | Ex. 1 | 376 | 691 | 23.5 | 16238.5 | 0.249 |
| 3 | B | | Traditional process 2 | 271 | 497 | 34.5 | 17146.5 | 0.181 |
| 4 | B | | Ex. 2 | 379 | 698 | 25.7 | 17938.6 | 0.254 |
| 5 | C | | Traditional process 3 | 265 | 517 | 36.5 | 18870.5 | 0.179 |
| 6 | C | | Ex. 3 | 356 | 674 | 28.2 | 19006.8 | 0.26 |
| 7 | D | | Traditional process 4 | 293 | 521 | 32.6 | 16984.6 | 0.18 |
| 8 | D | | Ex. 4 | 350 | 652 | 27.5 | 17930 | 0.249 |
| 9 | E | | Traditional process 5 | 297 | 560 | 34.3 | 19208 | 0.173 |
| 10 | E | | Ex. 5 | 360 | 659 | 27 | 17793 | 0.251 |
| 11 | N | | Ex. 6 | 373 | 692 | 23.3 | 16123.6 | 0.248 |
| 12 | F | | Ex. 7 | 381 | 705 | 23 | 16215 | 0.243 |
| 13 | K | | Ex. 8 | 392 | 709 | 22.2 | 15739.8 | 0.242 |
| 14 | R | | Ex. 9 | 385 | 706 | 22.4 | 15814.4 | 0.25 |
| 15 | G | | Ex. 10 | 370 | 672 | 28 | 18816 | 0.252 |

TABLE 14-continued

| No. | test steel | Type of the Product | Main process parameters (Rapid heating-one stage) | Yield strength MPa | Tensile strength MPa | Elongation % | Product of strength and elongation MPa % | n90 value |
|---|---|---|---|---|---|---|---|---|
| 16 | P | | Ex. 11 | 362 | 671 | 27.9 | 18720.9 | 0.253 |
| 17 | S | | Ex. 12 | 360 | 674 | 24.7 | 16647.8 | 0.254 |
| 18 | O | Alloy galvannealed | Ex. 13 | 377 | 642 | 28.6 | 18361.2 | 0.232 |
| 19 | O | | Traditional process 6 | 304 | 523 | 32.4 | 16945.2 | 0.189 |
| 20 | L | | Ex. 14 | 392 | 699 | 25.9 | 18104.1 | 0.255 |
| 21 | L | | Traditional process 7 | 276 | 522 | 34.1 | 17800.2 | 0.177 |
| 22 | H | | Ex. 15 | 349 | 638 | 28 | 17864 | 0.234 |
| 23 | H | | Traditional process 8 | 302 | 518 | 35.5 | 18389 | 0.174 |
| 24 | Q | | Ex. 16 | 373 | 695 | 25 | 17375 | 0.248 |
| 25 | Q | | Traditional process 9 | 268 | 491 | 36.5 | 17921.5 | 0.171 |
| 26 | I | | Ex. 17 | 356 | 659 | 28.4 | 18715.6 | 0.253 |
| 27 | J | | Traditional process 10 | 304 | 526 | 29.2 | 15359.2 | 0.181 |

TABLE 15

| No. | test steel | Type of the product | Main process parameters (Rapid heating-two stage) | Yield strength MPa | Tensile strength MPa | Elongation % | Product of strength and elongation MPa % | n90 value |
|---|---|---|---|---|---|---|---|---|
| 1 | A | Hot dip galvanized | Traditional process 11 | 264 | 527 | 33.8 | 17812.6 | 0.199 |
| 2 | A | | Ex. 19 | 387 | 677 | 27.7 | 18752.9 | 0.214 |
| 3 | B | | Traditional process 12 | 285 | 517 | 36.1 | 18663.7 | 0.196 |
| 4 | B | | Ex. 20 | 371 | 666 | 27.7 | 18448.2 | 0.226 |
| 5 | C | | Traditional process 13 | 297 | 522 | 34.4 | 17956.8 | 0.202 |
| 6 | C | | Ex. 21 | 369 | 651 | 27.2 | 17707.2 | 0.211 |
| 7 | D | | Traditional process 14 | 268 | 517 | 36.5 | 18870.5 | 0.199 |
| 8 | D | | Ex. 22 | 352 | 631 | 29.4 | 18551.4 | 0.223 |
| 9 | E | | Traditional process 15 | 265 | 516 | 36 | 18576 | 0.198 |
| 10 | E | | Ex. 23 | 347 | 624 | 30.3 | 18907.2 | 0.213 |
| 11 | N | | Ex. 18 | 360 | 648 | 29.1 | 18856.8 | 0.213 |
| 12 | F | | Ex. 24 | 365 | 647 | 30.3 | 19604.1 | 0.226 |
| 13 | K | | Ex. 25 | 392 | 649 | 27.2 | 17652.8 | 0.226 |
| 14 | R | | Ex. 26 | 353 | 669 | 29 | 19401 | 0.226 |
| 15 | G | | Ex. 27 | 349 | 638 | 28 | 17864 | 0.225 |
| 16 | P | | Ex. 28 | 377 | 642 | 28.6 | 18361.2 | 0.216 |
| 17 | S | | Ex. 29 | 397 | 692 | 28 | 19376 | 0.233 |
| 18 | O | Alloy galvannealed | Ex. 30 | 354 | 687 | 27.8 | 19098.6 | 0.232 |
| 19 | O | | Traditional process 16 | 270 | 569 | 31.1 | 17695.9 | 0.189 |
| 20 | L | | Ex. 31 | 405 | 658 | 25.8 | 16976.4 | 0.226 |
| 21 | L | | Traditional process 17 | 276 | 522 | 33.3 | 17382.6 | 0.197 |
| 22 | H | | Ex. 32 | 364 | 650 | 28.3 | 18395 | 0.22 |
| 23 | H | | Traditional process 18 | 265 | 547 | 33 | 18051 | 0.191 |
| 24 | Q | | Ex. 33 | 389 | 660 | 27.6 | 18216 | 0.232 |
| 25 | Q | | Traditional process 19 | 304 | 523 | 33.4 | 17468.2 | 0.191 |
| 26 | I | | Ex. 34 | 390 | 641 | 27.9 | 17883.9 | 0.225 |
| 27 | J | | Traditional process 20 | 308 | 529 | 32.9 | 17404.1 | 0.182 |

Example IV

The composition of the test steel of Example IV is shown in Table 16. The specific parameters of the present example and the traditional processes are shown in Table 17 (heating in one stage) and Table 18 (heating in two stages). The main performances of the hot-dip galvanized dual phase steel GI and GA prepared from the test steel composition of the present disclosure according to the examples and the traditional processes in Table 17 and Table 18 are listed in Table 19 and Table 20.

It can be seen from Table 16-Table 20 that the process of the present disclosure can reduce the alloy content in the same grade of steel, refine grains, and obtain a matching of material structure and composition with strength and toughness. The dual-phase steel obtained by the process of the present disclosure has a yield strength of 400~552 MPa, a tensile strength of 798~862 MPa, an elongation of 19.5~24.6%, a product of strength and elongation of 16.3~19.9 GPa % and a strain hardening index $n_{90}$ value of greater than 0.20.

Figure 18:
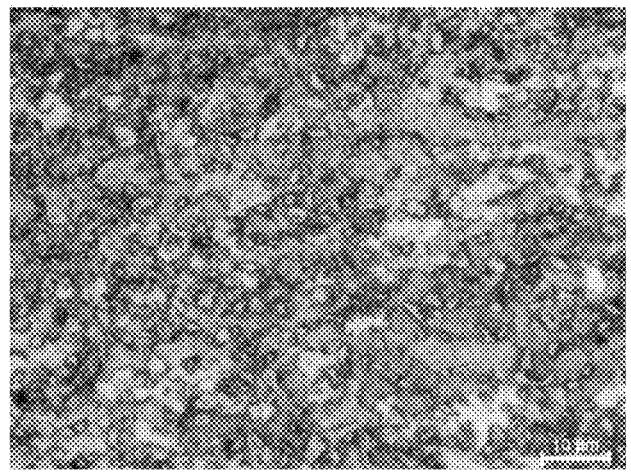
FIG. 18 is a microstructure photo of a hot dip galvanized dual-phase steel (GI) produced from test steel A of Example IV according to Example 1 of the present disclosure.
Figure 19:
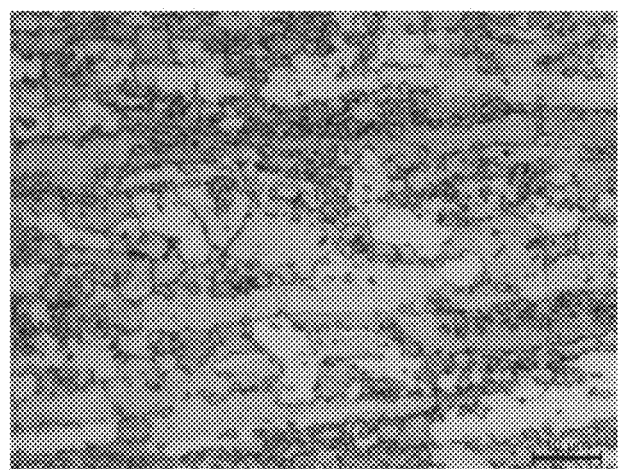
FIG. 19 is a microstructure photo of a hot dip galvanized dual-phase steel (GI) produced from test steel A of Example IV according to Traditional process 1 of the present disclosure.

FIG. 18 and FIG. 19 are structure photos of A steel having a typical composition obtained by Example 1 and Comparative Traditional process 1. It can be seen from the figures that there are very big differences in the structure after hot-dip galvanizing. The A steel after rapid heat treatment of the present disclosure has a microstructure composed of fine, uniform martensitic structure and carbides dispersed on a fine ferritic matrix (FIG. 18). The steel after the process treatment of the present disclosure has a microstructure that is characterized in that ferritic, martensitic grain structure and carbide are very fine and evenly dispersed, which is very beneficial to the improvement of the strength and plasticity of the material. The A steel after traditional process treatment (FIG. 19) has a typical dual-phase steel structure. That is, there is a small amount of black martensite structure on the grain boundary of large pieces of white ferrite. Due to element segregation and other reasons, the material structure after traditional process treatment shows a certain directionality, and its ferrite structure is distributed in long strips along the rolling direction. The microstructure treated by the traditional process is characterized in that the grain size is relatively coarse, there is a certain banded structure with martensite and carbide distributed in a network along ferrite grain boundary, the ferrite grain is relatively coarse, and the distribution of dual-phase structure of ferrite and martensite is uneven.

Figure 20:
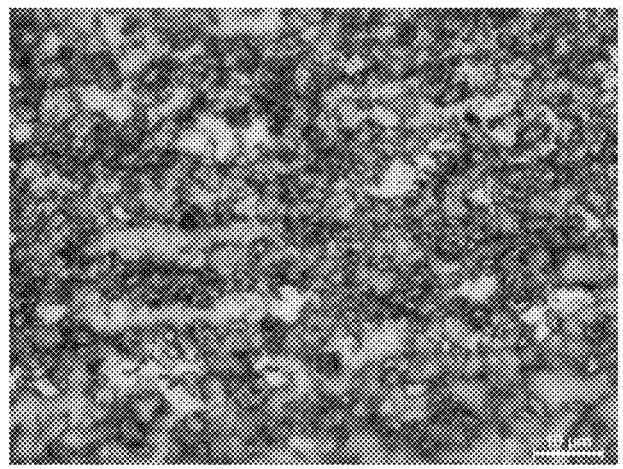
FIG. 20 is a microstructure photo of an alloy galvannealed dual-phase steel (GA) produced from test steel I of Example IV according to Example 17 of the present disclosure.
Figure 21:
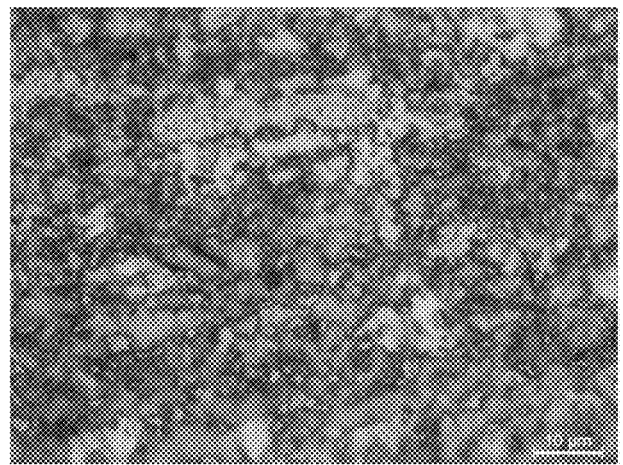
FIG. 21 is a microstructure photo of a hot dip galvanized dual-phase steel (GI) produced from test steel D of Example IV according to Example 22 of the present disclosure.
Figure 22:
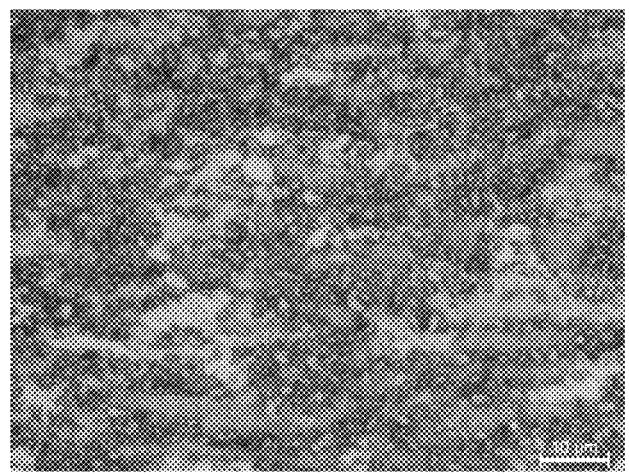
FIG. 22 is a microstructure photo of an alloy galvannealed dual-phase steel (GA) produced from test steel I of Example IV according to Example 34 of the present disclosure.

FIG. 20 is a structure photo of I steel having a typical composition obtained by Example 17 (GA), and FIG. 21 is a structure photo of D steel having a typical composition obtained by Example 22 (GI). FIG. 5 is a structure photo of I steel having a typical composition obtained by Example 34 (GA). Examples 17, 22, 34 all adopt processes with short heat treatment cycles. It can be seen from the figures that the hot-dip galvanizing process by rapid heat treatment of the present disclosure can also provide a very uniform, fine, dispersed distribution of each phase structure after alloying (FIG. 22), while Traditional process 9 provides coarse ferritic structure with a small amount of martensitic structure distributed on the ferrite grain boundary, which is a typical hot-dip galvanized dual-phase steel structure. The manufacturing process of the hot-galvanized dual-phase steel of the present disclosure can refine grains, and make the structure of each phase of the material evenly distributed in the matrix, thereby improving the material structure and the material properties.

TABLE 16

| test steel | C | Si | Mn | Cr | Mo | Ti | Nb | V | P | S | Al |
|---|---|---|---|---|---|---|---|---|---|---|---|
| | | | | | (unit: mass percentage) | | | | | | |
| A | 0.050 | 0.45 | 2.00 | / | / | / | / | / | 0.0135 | 0.0015 | 0.0314 |
| B | 0.070 | 0.20 | 1.91 | / | / | / | / | / | 0.0079 | 0.0020 | 0.0316 |
| C | 0.103 | 0.33 | 1.62 | / | / | / | / | / | 0.0144 | 0.0009 | 0.0269 |
| D | 0.120 | 0.42 | 1.41 | / | / | / | / | / | 0.0148 | 0.0012 | 0.0314 |
| E | 0.055 | 0.44 | 1.41 | / | / | 0.0253 | 0.022 | / | 0.0118 | 0.0011 | 0.0340 |
| F | 0.068 | 0.35 | 1.63 | / | / | / | 0.023 | 0.031 | 0.0118 | 0.0015 | 0.0366 |
| G | 0.092 | 0.25 | 1.50 | 0.040 | / | / | 0.022 | / | 0.0115 | 0.0006 | 0.0297 |
| H | 0.099 | 0.42 | 1.44 | / | 0.033 | / | / | / | 0.0064 | 0.0028 | 0.0294 |
| I | 0.110 | 0.26 | 1.61 | / | / | 0.0305 | / | 0.035 | 0.0143 | 0.0003 | 0.0358 |
| J | 0.103 | 0.43 | 1.23 | / | / | / | 0.02 | / | 0.0136 | 0.0018 | 0.0286 |
| K | 0.083 | 0.27 | 1.40 | 0.025 | / | / | / | / | 0.0097 | 0.0030 | 0.0276 |
| L | 0.095 | 0.35 | 1.52 | / | 0.05 | / | / | / | 0.0095 | 0.0028 | 0.0303 |
| M | 0.078 | 0.45 | 1.41 | / | / | 0.0276 | / | 0.025 | 0.0099 | 0.0003 | 0.0290 |
| N | 0.069 | 0.50 | 2.00 | 0.028 | / | / | 0.022 | / | 0.0134 | 0.0008 | 0.0367 |
| O | 0.105 | 0.10 | 1.7 | / | 0.025 | / | / | / | 0.0099 | 0.0017 | 0.0290 |
| P | 0.094 | 0.23 | 1.82 | / | / | / | / | 0.05 | 0.0124 | 0.0012 | 0.0259 |
| Q | 0.089 | 0.15 | 1.72 | 0.025 | 0.030 | / | / | / | 0.0096 | 0.0011 | 0.0319 |
| R | 0.095 | 0.18 | 1.83 | 0.020 | / | / | / | 0.032 | 0.0075 | 0.0015 | 0.0285 |
| S | 0.096 | 0.31 | 1.65 | / | 0.025 | / | / | 0.03 | 0.0066 | 0.0007 | 0.0495 |

TABLE 17

| | Hot rolling | Cold rolling | Rapid heating | Soaking | | Slow cooling | | Rapid cooling | | Hot-dip gal- vanizing | Alloying | | | Final | Total time of rapid heat treatment and hot-dip galvanizing s |
|---|---|---|---|---|---|---|---|---|---|---|---|---|---|---|---|
| | Coiling tem- perature ° C. | re- duction rate % | rate (one stage) ° C./s | Soaking tem- perature ° C. | Soak- ing time s | Cool- ing rate ° C./s | perature after cooling ° C. | Cool- ing rate ° C./s | perature after cooling ° C. | tem- perature ° C. | heat- ing rate ° C./s | tem- pera- ture ° C. | time s | Cool- ing rate ° C./s | |
| Ex. 1 | 680 | 40 | 50 | 750 | 60 | 15 | 670 | 50 | 460 | 460 | / | / | / | 100 | 88.53 |
| Ex. 2 | 650 | 85 | 80 | 770 | 50 | 13 | 690 | 60 | 465 | 465 | / | / | / | 80 | 74.84 |

TABLE 17-continued

| | Hot rolling Coiling temperature °C | Cold rolling reduction rate % | Rapid heating rate (one stage) °C/s | Soaking temperature °C | Soaking time s | Slow cooling Cooling rate °C/s | Temperature after cooling °C | Rapid cooling Cooling rate °C/s | Temperature after cooling °C | Hot-dip galvanizing temperature °C | Alloying heating rate °C/s | Alloying temperature °C | Alloying time s | Final Cooling rate °C/s | Total time of rapid heat treatment and hot-dip galvanizing s |
|---|---|---|---|---|---|---|---|---|---|---|---|---|---|---|---|
| Ex. 3 | 610 | 70 | 150 | 790 | 40 | 11 | 700 | 80 | 470 | 470 | / | / | / | 75 | 62.19 |
| Ex. 4 | 580 | 60 | 300 | 800 | 30 | 9 | 730 | 100 | 466 | 466 | / | / | / | 60 | 50.45 |
| Ex. 5 | 550 | 65 | 500 | 840 | 10 | 15 | 770 | 120 | 467 | 467 | / | / | / | 50 | 29.58 |
| Ex. 6 | 590 | 45 | 250 | 845 | 20 | 5 | 750 | 150 | 461 | 461 | / | / | / | 30 | 58.93 |
| Ex. 7 | 640 | 55 | 350 | 795 | 55 | 12 | 695 | 140 | 468 | 468 | / | / | / | 140 | 70.37 |
| Ex. 8 | 590 | 63 | 400 | 790 | 45 | 8 | 670 | 130 | 469 | 469 | / | / | / | 150 | 66.46 |
| Ex. 9 | 570 | 55 | 230 | 815 | 35 | 10 | 675 | 100 | 460 | 460 | / | / | / | 120 | 58.27 |
| Ex. 10 | 560 | 75 | 100 | 830 | 25 | 14 | 710 | 200 | 470 | 470 | / | / | / | 100 | 48.39 |
| Ex. 11 | 600 | 72 | 180 | 820 | 30 | 7 | 675 | 170 | 465 | 465 | / | / | / | 130 | 61.36 |
| Ex. 12 | 550 | 50 | 200 | 835 | 20 | 6 | 720 | 180 | 470 | 470 | / | / | / | 150 | 49.11 |
| Ex. 13 | 680 | 40 | 50 | 750 | 60 | 15 | 670 | 50 | 460 | 460 | 30 | 480 | 20 | 30 | 122.93 |
| Ex. 14 | 650 | 85 | 80 | 770 | 50 | 13 | 690 | 60 | 465 | 465 | 50 | 490 | 17 | 60 | 95.36 |
| Ex. 15 | 610 | 70 | 150 | 790 | 40 | 11 | 710 | 80 | 470 | 470 | 100 | 510 | 15 | 90 | 76.25 |
| Ex. 16 | 580 | 60 | 300 | 820 | 30 | 9 | 730 | 100 | 466 | 466 | 150 | 530 | 12 | 150 | 61.13 |
| Ex. 17 | 550 | 65 | 500 | 845 | 10 | 6 | 770 | 120 | 467 | 467 | 200 | 550 | 10 | 250 | 39.21 |
| Traditional process 1 | 680 | 80 | 11 | 770 | 160 | 10 | 675 | 100 | 470 | 470 | / | / | / | 30 | 254.05 |
| Traditional process 2 | 650 | 76 | 10 | 790 | 130 | 9 | 675 | 80 | 465 | 465 | / | / | / | 60 | 229.82 |
| Traditional process 3 | 610 | 70 | 11 | 810 | 110 | 10 | 675 | 75 | 460 | 460 | / | / | / | 90 | 203.07 |
| Traditional process 4 | 580 | 65 | 13 | 830 | 90 | 8 | 675 | 60 | 470 | 470 | / | / | / | 120 | 178.85 |
| Traditional process 5 | 550 | 60 | 15 | 845 | 70 | 12 | 675 | 50 | 470 | 470 | / | / | / | 150 | 146.27 |
| Traditional process 6 | 680 | 80 | 12 | 770 | 160 | 10 | 675 | 100 | 470 | 470 | 12 | 480 | 20 | 30 | 270.22 |
| Traditional process 7 | 650 | 76 | 14 | 790 | 130 | 9 | 675 | 80 | 465 | 465 | 16 | 490 | 17 | 60 | 226.80 |
| Traditional process 8 | 610 | 70 | 10 | 810 | 110 | 10 | 675 | 75 | 460 | 460 | 10 | 510 | 15 | 90 | 230.81 |
| Traditional process 9 | 580 | 65 | 11 | 830 | 90 | 8 | 675 | 60 | 470 | 470 | 20 | 530 | 12 | 120 | 205.68 |
| Traditional process 10 | 550 | 60 | 15 | 845 | 70 | 12 | 675 | 50 | 470 | 470 | 25 | 550 | 10 | 150 | 160.00 |

TABLE 18

| | Hot rolling Coiling temperature °C | Cold rolling reduction rate % | Rapid heating (two-stage) Heating rate in the first stage °C/s | Temperature after heating in the first stage °C | Heating rate in the second stage °C/s | Soaking temperature °C | Soaking time s | Slow cooling Cooling rate °C/s | Temperature after cooling °C | Rapid cooling Cooling rate °C/s | Temperature after cooling °C | Hot-dip galvanizing temperature °C | Alloying Heating rate °C/s | Alloying temperature °C | Alloying time s | Final Cooling rate °C/s | Total time of rapid heat treatment and hot-dip galvanizing s |
|---|---|---|---|---|---|---|---|---|---|---|---|---|---|---|---|---|---|
| Ex. 18 | 680 | 40 | 15 | 550 | 500 | 750 | 60 | 15 | 670 | 50 | 460 | 460 | / | / | / | 100 | 109.67 |
| Ex. 19 | 650 | 85 | 30 | 570 | 300 | 770 | 50 | 13 | 690 | 60 | 465 | 465 | / | / | / | 80 | 84.47 |
| Ex. 20 | 610 | 70 | 80 | 600 | 150 | 790 | 40 | 11 | 700 | 80 | 470 | 470 | / | / | / | 75 | 65.57 |
| Ex. 21 | 580 | 60 | 150 | 630 | 80 | 800 | 30 | 9 | 730 | 100 | 466 | 466 | / | / | / | 60 | 54.04 |
| Ex. 22 | 550 | 65 | 300 | 640 | 50 | 840 | 10 | 15 | 770 | 120 | 467 | 467 | / | / | / | 50 | 32.20 |
| Ex. 23 | 590 | 45 | 500 | 650 | 30 | 845 | 20 | 5 | 750 | 150 | 461 | 461 | / | / | / | 30 | 63.39 |
| Ex. 24 | 640 | 55 | 250 | 647 | 200 | 795 | 55 | 12 | 695 | 140 | 468 | 468 | / | / | / | 140 | 71.40 |
| Ex. 25 | 590 | 63 | 350 | 635 | 450 | 790 | 45 | 8 | 670 | 130 | 469 | 469 | / | / | / | 150 | 66.64 |
| Ex. 26 | 570 | 55 | 400 | 640 | 350 | 815 | 35 | 10 | 675 | 100 | 460 | 460 | / | / | / | 120 | 56.87 |
| Ex. 27 | 560 | 75 | 250 | 620 | 250 | 830 | 25 | 14 | 710 | 200 | 470 | 470 | / | / | / | 100 | 43.01 |
| Ex. 28 | 600 | 72 | 100 | 580 | 150 | 820 | 30 | 7 | 675 | 170 | 465 | 465 | / | / | / | 130 | 63.60 |

TABLE 18-continued

| | Rapid heat treatment (two-stage) | | | | | | | | | | | | | | Total |
|---|---|---|---|---|---|---|---|---|---|---|---|---|---|---|---|
| | Rapid heating (two-stage) | | | | | | | | | | | | | | time of rapid |
| | Hot rolling | Cold rolling | Heating rate in the first stage °C./s | Temperature after heating in the first stage °C. | Heating rate in the second stage °C./s | Soaking | | Slow cooling | | Rapid cooling | | Hot-dip galvanizing temperature °C. | Alloying | | | heat treatment and hot-dip galvanizing s |
| | Coiling temperature °C. | reduction rate % | | | | Soaking temperature °C. | Soaking time s | Cooling rate °C./s | Temperature after cooling °C. | Cooling rate °C./s | Temperature after cooling °C. | | Heating rate °C./s | Temperature °C. | time s | Final Cooling rate °C./s | |
| Ex. 29 | 550 | 50 | 200 | 610 | 200 | 835 | 20 | 6 | 720 | 180 | 470 | 470 | / | / | / | 150 | 48.23 |
| Ex. 30 | 680 | 40 | 15 | 550 | 500 | 750 | 60 | 15 | 670 | 50 | 460 | 460 | 30 | 480 | 20 | 30 | 141.27 |
| Ex. 31 | 650 | 85 | 30 | 570 | 300 | 770 | 50 | 13 | 690 | 60 | 465 | 465 | 50 | 490 | 17 | 60 | 104.24 |
| Ex. 32 | 610 | 70 | 80 | 600 | 150 | 790 | 40 | 11 | 710 | 80 | 470 | 470 | 100 | 510 | 15 | 90 | 79.63 |
| Ex. 33 | 580 | 60 | 150 | 630 | 80 | 820 | 30 | 9 | 730 | 100 | 466 | 466 | 150 | 530 | 12 | 150 | 64.91 |
| Ex. 34 | 550 | 65 | 300 | 640 | 50 | 845 | 10 | 6 | 770 | 120 | 467 | 467 | 200 | 550 | 10 | 250 | 43.73 |
| Traditional process 11 | 680 | 80 | 11 | 150 | 8 | 770 | 160 | 10 | 675 | 100 | 470 | 470 | / | / | / | 30 | 275.87 |
| Traditional process 12 | 650 | 76 | 10 | 150 | 7 | 790 | 130 | 9 | 675 | 80 | 465 | 465 | / | / | / | 60 | 257.25 |
| Traditional process 13 | 610 | 70 | 11 | 180 | 6 | 810 | 110 | 10 | 675 | 75 | 460 | 460 | / | / | / | 90 | 250.80 |
| Traditional process 14 | 580 | 65 | 13 | 210 | 5 | 830 | 90 | 8 | 675 | 60 | 470 | 470 | / | / | / | 120 | 255.16 |
| Traditional process 15 | 550 | 60 | 15 | 250 | 5 | 845 | 70 | 12 | 675 | 50 | 470 | 470 | / | / | / | 150 | 225.60 |
| Traditional process 16 | 680 | 80 | 11 | 150 | 8 | 770 | 160 | 10 | 675 | 100 | 470 | 470 | 12 | 480 | 20 | 30 | 297.03 |
| Traditional process 17 | 650 | 76 | 10 | 150 | 7 | 790 | 130 | 9 | 675 | 80 | 465 | 465 | 16 | 490 | 17 | 60 | 276.23 |
| Traditional process 18 | 610 | 70 | 11 | 180 | 6 | 810 | 110 | 10 | 675 | 75 | 460 | 460 | 10 | 510 | 15 | 90 | 271.36 |
| Traditional process 19 | 580 | 65 | 13 | 210 | 5 | 830 | 90 | 8 | 675 | 60 | 470 | 470 | 20 | 530 | 12 | 120 | 270.66 |
| Traditional process 20 | 550 | 60 | 15 | 250 | 5 | 845 | 70 | 12 | 675 | 50 | 470 | 470 | 25 | 550 | 10 | 150 | 239.33 |

TABLE 19

| No. | test steel | Type of the product | Main process parameters (Rapid heating-one stage) | Yield strength MPa | Tensile strength MPa | Elongation % | Product of strength and elongation MPa % | n90 value |
|---|---|---|---|---|---|---|---|---|
| 1 | A | Hot dip galvanized GI | Traditional process 1 | 380 | 683 | 23 | 15709 | 0.164 |
| 2 | A | | Ex. 1 | 498 | 814 | 23.2 | 18884.8 | 0.226 |
| 3 | B | | Traditional process 2 | 390 | 640 | 24.1 | 15424 | 0.155 |
| 4 | B | | Ex. 2 | 504 | 810 | 23.6 | 19116 | 0.217 |
| 5 | C | | Traditional process 3 | 389 | 660 | 23.6 | 15576 | 0.165 |
| 6 | C | | Ex. 3 | 500 | 813 | 23.2 | 18861.6 | 0.21 |
| 7 | D | | Traditional process 4 | 388 | 649 | 23.9 | 15511.1 | 0.161 |
| 8 | D | | Ex. 4 | 511 | 814 | 23.8 | 19373.2 | 0.211 |
| 9 | E | | Traditional process 5 | 390 | 641 | 24.9 | 15960.9 | 0.168 |
| 10 | E | | Ex. 5 | 514 | 808 | 23.4 | 18907.2 | 0.215 |
| 11 | N | | Ex. 6 | 547 | 848 | 22.7 | 19249.6 | 0.231 |
| 12 | F | | Ex. 7 | 552 | 824 | 23.2 | 19116.8 | 0.223 |
| 13 | K | | Ex. 8 | 535 | 852 | 22.4 | 19084.8 | 0.235 |
| 14 | R | | Ex. 9 | 513 | 816 | 23.2 | 18931.2 | 0.213 |
| 15 | G | | Ex. 10 | 538 | 848 | 21.2 | 17977.6 | 0.228 |
| 16 | P | | Ex. 11 | 520 | 820 | 22.3 | 18286 | 0.211 |
| 17 | S | | Ex. 12 | 501 | 823 | 23 | 18929 | 0.237 |
| 18 | O | Alloy galvannealed GA | Ex. 13 | 510 | 828 | 23.8 | 19706.4 | 0.212 |
| 19 | O | | Traditional process 6 | 392 | 699 | 21.9 | 15308.1 | 0.168 |
| 20 | L | | Ex. 14 | 526 | 833 | 22.4 | 18659.2 | 0.228 |
| 21 | L | | Traditional process 7 | 385 | 706 | 22.4 | 15814.4 | 0.169 |
| 22 | H | | Ex. 15 | 509 | 807 | 24.6 | 19852.2 | 0.214 |
| 23 | H | | Traditional process 8 | 376 | 691 | 21.5 | 14856.5 | 0.164 |
| 24 | Q | | Ex. 16 | 536 | 821 | 23 | 18883 | 0.213 |

TABLE 19-continued

| No. | test steel | Type of the product | Main process parameters (Rapid heating-one stage) | Yield strength MPa | Tensile strength MPa | Elongation % | Product of strength and elongation MPa % | n90 value |
|---|---|---|---|---|---|---|---|---|
| 25 | Q | | Traditional process 9 | 392 | 669 | 22.2 | 14851.8 | 0.169 |
| 26 | I | | Ex. 17 | 551 | 829 | 22.2 | 18403.8 | 0.216 |
| 27 | J | | Traditional process 10 | 402 | 721 | 23.4 | 16871.4 | 0.188 |

TABLE 20

| No. | test steel | Type of the product | Main process parameters (Rapid heating-two stage) | Yield strength MPa | Tensile strength MPa | Elongation % | Product of strength and elongation MPa % | n90 value |
|---|---|---|---|---|---|---|---|---|
| 1 | A | Hot dip galvanized GI | Traditional process 11 | 343 | 716 | 20.6 | 14749.6 | 0.165 |
| 2 | A | | Ex. 19 | 417 | 812 | 20.07 | 16296.84 | 0.224 |
| 3 | B | | Traditional process 12 | 330 | 661 | 24.7 | 16326.7 | 0.173 |
| 4 | B | | Ex. 20 | 419 | 816 | 22.7 | 18523.2 | 0.266 |
| 5 | C | | Traditional process 13 | 343 | 693 | 25.7 | 17810.1 | 0.163 |
| 6 | C | | Ex. 21 | 416 | 808 | 23.1 | 18664.8 | 0.271 |
| 7 | D | | Traditional process 14 | 350 | 683 | 24 | 16392 | 0.175 |
| 8 | D | | Ex. 22 | 400 | 798 | 22 | 17556 | 0.226 |
| 9 | E | | Traditional process 15 | 401 | 688 | 24.3 | 16718.4 | 0.174 |
| 10 | E | | Ex. 23 | 438 | 847 | 19.5 | 16516.5 | 0.233 |
| 11 | N | | Ex. 18 | 465 | 856 | 20.4 | 17462.4 | 0.224 |
| 12 | F | | Ex. 24 | 434 | 827 | 21.7 | 17945.9 | 0.222 |
| 13 | K | | Ex. 25 | 440 | 812 | 22.1 | 17945.2 | 0.223 |
| 14 | R | | Ex. 26 | 474 | 834 | 22.1 | 18431.4 | 0.246 |
| 15 | G | | Ex. 27 | 479 | 841 | 21.3 | 17913.3 | 0.224 |
| 16 | P | | Ex. 28 | 487 | 858 | 21.2 | 18189.6 | 0.22 |
| 17 | S | | Ex. 29 | 476 | 853 | 21.5 | 18339.5 | 0.236 |
| 18 | O | Alloy galvannealed GA | Ex. 30 | 457 | 862 | 21.5 | 18533 | 0.224 |
| 19 | O | | Traditional process 16 | 458 | 746 | 22.1 | 16486.6 | 0.173 |
| 20 | L | | Ex. 31 | 462 | 843 | 20.1 | 16944.3 | 0.222 |
| 21 | L | | Traditional process 17 | 453 | 734 | 23 | 16898.2 | 0.181 |
| 22 | H | | Ex. 32 | 462 | 846 | 21.9 | 18527.4 | 0.236 |
| 23 | H | | Traditional process 18 | 422 | 716 | 23.7 | 16969.2 | 0.166 |
| 24 | Q | | Ex. 33 | 443 | 845 | 20.1 | 16984.5 | 0.214 |
| 25 | Q | | Traditional process 19 | 421 | 723 | 23.8 | 17207.4 | 0.176 |
| 26 | I | | Ex. 34 | 460 | 858 | 21.6 | 18532.8 | 0.216 |
| 27 | J | | Traditional process 20 | 405 | 695 | 24.4 | 16958 | 0.174 |

What is claimed is:

1. A low carbon low alloy dual-phase steel with high formability or hot-galvanized dual-phase steel with high formability, which comprises the following chemical components in mass percentages: C: 0.04~0.12%, Si: 0.1~0.5%, Mn: 1.0~2.0%, P≤0.02%, S≤0.015%, Al: 0.02~0.06%, optionally one or two of Cr, Mo, Ti, Nb, V, and Cr+Mo+Ti+Nb+V≤0.5%, with a balance of Fe and other unavoidable impurities, wherein the dual-phase steel or hot-galvanized dual-phase steel has a yield strength of 340~560 MPa, a tensile strength of 620~880 MPa, an elongation of 19~30.5%, a product of strength and elongation of 15.5~20.5 GPa % and a strain hardening index $n_{90}$ value greater than 0.20; and wherein the microstructure of the dual-phase steel or hot-galvanized dual-phase steel is a dual-phase structure of ferrite and martensite having an average grain size of 2~10 μm.

2. The low carbon low alloy dual-phase steel with high formability or hot-galvanized dual-phase steel with high formability according to claim 1, wherein the low carbon low alloy dual-phase steel with high formability is obtained by the following process:

1) Smelting, casting wherein the above components are subjected to smelting and casting to form a slab;

2) hot rolling, coiling wherein a hot rolling finishing temperature is ≥$A_{r3}$; and a coiling temperature is 550~680° C.;

3) Cold rolling wherein a cold rolling reduction rate is 40~85%;

4) Rapid heat treatment wherein the steel plate after cold rolling is rapidly heated to 750~845° C., wherein the rapid heating is performed in one stage or two stages; when the rapid heating is performed in one stage, a heating rate is 50~500° C./s; when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s; then soaked at a soaking temperature of 750~845° C. for a soaking time of 10~60 s;

wherein after soaking, the steel plate is slowly cooled to 670~770° C. at a cooling rate of 5~15° C./s, then rapidly cooled from 670~770° C. to room temperature at a cooling rate of 50~200° C./s;

or the steel plate is rapidly cooled from 670~770° C. to 230~280° C. at a cooling rate of 50~200° C./s, and over-aged in this temperature range, wherein an over-ageing treating time is less than or equal to 200 s; and finally cooled to room temperature at a cooling rate of 30~50° C./s.

3. The low carbon low alloy dual-phase steel with high formability or hot-galvanized dual-phase steel with high formability according to claim 2, wherein the process has one or more of the following features:

in step 4), a total time of the rapid heat treatment is 41~300 s;

in step 2), the coiling temperature is 580~650° C.;

in step 3), the cold rolling reduction rate is 60~80%;

in step 4), when the rapid heating is performed in one stage, the heating rate is 50~300° C./s;

in step 4), the rapid heating is performed in two stages, wherein the steel plate is heated in the first stage from room temperature to 550~650° C. at a heating rate of 15~300° C./s, heated in the second stage from 550~650° C. to 750~845° C. at a heating rate of 50~300° C./s;

in step 4), the soaking time is 10~40 s;

in step 4), the rapid cooling rate of the steel plate is 50~150° C./s; and the over ageing time is 20~200 s.

4. The low carbon low alloy dual-phase steel with high formability or hot-galvanized dual-phase steel with high formability according to claim 1, wherein:

(1) the low carbon low alloy dual-phase steel with high formability comprises the following chemical components in mass percentages: C: 0.04~0.10%, Si: 0.1~0.3%, Mn: 1.0~1.6%, P≤0.02%, S≤0.015%, Al: 0.02~0.06%, optionally one or two of Cr, Mo, Ti, Nb, V, and Cr+Mo+Ti+Nb+V≤0.5%, with a balance of Fe and other unavoidable impurities; or (2) the low carbon low alloy dual-phase steel with high formability comprises the following chemical components in mass percentages: C: 0.05~0.12%, Si: 0.01~0.5%, Mn: 1.2~2.0%, P≤0.015%, S≤0.003%, Al: 0.02~0.055%, optionally one or two of Cr, Mo, Ti, Nb, V, and Cr+Mo+Ti+Nb+V≤0.5%, with a balance of Fe and other unavoidable impurities; or (3) the low carbon low alloy dual-phase steel with high formability comprises the following chemical components in mass percentages: C: 0.045~0.12%, Si: 0.1~0.5%, Mn: 1.0~2.0%, P≤0.02%, S≤0.006%, Al: 0.02~0.055%, optionally one or two of Cr, Mo, Ti, Nb, V, and Cr+Mo+Ti+Nb+V≤0.5%, with a balance of Fe and other unavoidable impurities.

5. The low carbon low alloy dual-phase steel with high formability or hot-galvanized dual-phase steel with high formability according to claim 4, wherein after the end of soaking step and the steel is slowly cooled to 670~770° C. at a cooling rate of 5~15° C./s, it is rapidly cooled to 460~470° C. at a cooling rate of 50~200° C./s and immersed in a zinc pot for hot galvanizing to obtain the hot-galvanized dual phase steel;

optionally, after hot galvanizing, the steel is rapidly cooled to room temperature at a cooling rate of 30~150° C./s to obtain a hot dip galvanized GI product; or after hot galvanizing, the steel is heated to 480~550° C. at a heating rate of 30~200° C./s and alloyed for 10~20 s;

optionally, after alloying, the steel is rapidly cooled to room temperature at a cooling rate of 30~250° C./s to obtain an alloy galvannealed GA product.

6. The low carbon low alloy dual-phase steel with high formability or hot-galvanized dual-phase steel with high formability according to claim 1, wherein:

(1) the hot-galvanized dual-phase steel comprises the following chemical components in mass percentages: C: 0.045~0.105%, Si: 0.1~0.4%, Mn: 1.0~1.5%, P≤0.02%, S≤0.006%, Al: 0.02~0.055%, optionally one or two of Cr, Mo, Ti, Nb, V, and Cr+Mo+Ti+Nb+V≤0.3%, with a balance of Fe and other unavoidable impurities; or (2) the hot-galvanized dual-phase steel comprises the following chemical components in mass percentages: C: 0.05~0.12%, Si: 0.01~0.5%, Mn: 1.2~2.0%, P≤0.015%, S≤0.003%, Al: 0.02~0.055%, optionally one or two of Cr, Mo, Ti, Nb, V, and Cr+Mo+Ti+Nb+V≤0.5%, with a balance of Fe and other unavoidable impurities.

7. The low carbon low alloy dual-phase steel with high formability or hot-galvanized dual-phase steel with high formability according to claim 6, wherein:

(i) the hot-galvanized dual-phase steel of (1) is obtained by the following process:

a) Smelting, casting wherein the above components are subjected to smelting and casting to form a slab;

b) Hot rolling, coiling wherein a hot rolling finishing temperature is ≥$A_{r3}$; and a coiling temperature is 550~680° C.;

c) Cold rolling wherein a cold rolling reduction rate is 40~85%;

d) Rapid heat treatment, hot-galvanizing wherein the steel plate after cold rolling is rapidly heated to 750~845° C., wherein the rapid heating is performed in one stage or two stages;

when the rapid heating is performed in one stage, a heating rate is 50~500° C./s;

when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s; then soaked at a soaking temperature of 750~845° C. for a soaking time of 10~60 s;

wherein after soaking, the steel plate is slowly cooled to 670~770° C. at a cooling rate of 5~15° C./s, then rapidly cooled to 460~470° C. at a cooling rate of 50~200° C./s, and immersed in a zinc pot for hot galvanizing;

wherein after hot galvanizing, the steel plate is rapidly cooled to room temperature at a cooling rate of 30~150° C./s to obtain a hot dip galvanized GI product; or after hot galvanizing, the steel plate is heated to 480~550° C. at a heating rate of 30~200° C./s and alloyed for 10~20 s; after alloying, the steel plate is rapidly cooled to room temperature at a cooling rate of 30~250° C./s to obtain an alloy galvannealed GA product; and (ii) the hot-galvanized dual-phase steel of (2) is obtained by the following process:

a) Smelting, casting
wherein the above components are subjected to smelting and casting to form a slab;

b) Hot rolling, coiling
wherein a hot rolling finishing temperature is $\geq A_{r3}$; and a coiling temperature is 550~680° C.;

c) Cold rolling
wherein a cold rolling reduction rate is 40~85%;

d) Rapid heat treatment, hot-galvanizing
wherein the steel plate after cold rolling is rapidly heated to 750~845° C.,
wherein the rapid heating is performed in one stage or two stages;
when the rapid heating is performed in one stage, a heating rate is 50~500° C./s;
when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s; then soaked at a soaking temperature of 750~845° C. for a soaking time of 10~60 s;
wherein after soaking, the steel plate is slowly cooled to 670~770° C. at a cooling rate of 5~15° C./s, then rapidly cooled to 460~470° C. at a cooling rate of 50~200° C./s, and immersed in a zinc pot for hot galvanizing;
wherein after hot galvanizing, the steel plate is rapidly cooled to room temperature at a cooling rate of 30~150° C./s to obtain a hot dip galvanized GI product;
or after hot galvanizing, the steel plate is heated to 480~550° C. at a heating rate of 30~200° C./s and alloyed for 10~20 s; after alloying, the steel plate is rapidly cooled to room temperature at a cooling rate of 30~250° C./s to obtain an alloy galvannealed GA product.

8. The low carbon low alloy dual-phase steel with high formability or hot-galvanized dual-phase steel with high formability according to claim 7, wherein the process has one or more of the following features:
a total time of the rapid heat treatment and hot-galvanizing of each step d) is 30~142s;
in each step b), the coiling temperature is 580~650° C.;
in each step c), the cold rolling reduction rate is 60~80%;
in each step d), when the rapid heating is performed in one stage, the heating rate is 50~300° C./s;
in each step d), the rapid heating is performed in two stages, wherein the steel plate is heated in the first stage from room temperature to 550~650° C. at a heating rate of 15~300° C./s, heated in the second stage from 550~650° C. to 750~845° C. at a heating rate of 50~300° C./s.

9. The low carbon low alloy dual-phase steel with high formability or hot-galvanized dual-phase steel with high formability according to claim 8, wherein in each step d), the rapid heating is performed in two stages, wherein the steel plate is heated in the first stage from room temperature to 550~650° C. at a heating rate of 30~300° C./s, heated in the second stage from 550~650° C. to 750~845° C. at a heating rate of 80~300° C./s.

10. The low carbon low alloy dual-phase steel with high formability or hot-galvanized dual-phase steel with high formability according to claim 1, wherein in the dual-phase steel with high formability or the hot-galvanized dual-phase steel with high formability:
the content of C is 0.045~0.105%; and/or
the content of Si is 0.1~0.4%; and/or
the content of Mn is 1.0~1.6%; and/or
Cr+Mo+Ti+Nb+V≤0.3%.

11. The low carbon low alloy dual-phase steel with high formability or hot-galvanized dual-phase steel with high formability according to claim 10, wherein the low carbon low alloy dual-phase steel with high formability comprises the following chemical components in mass percentages: C: 0.04~0.105%, Si: 0.1~0.4%, Mn: 1.0~1.6%, P≤0.02%, S≤0.015%, Al: 0.02~0.06%, optionally one or two of Cr, Mo, Ti, Nb, V, and Cr+Mo+Ti+Nb+V≤0.5%, with a balance of Fe and other unavoidable impurities.

12. The low carbon low alloy dual-phase steel with high formability or hot-galvanized dual-phase steel with high formability according to claim 4, wherein in (1):
the dual-phase steel has a C content of 0.06~0.08%; and/or
the dual-phase steel has a Si content of 0.15~0.25%; and/or
the dual-phase steel has a Mn content of 1.2%~1.4%; and/or
the microstructure of the dual-phase steel is a dual-phase structure of ferrite and martensite having an average grain size of 4~10 μm; and/or
the dual-phase steel has a yield strength of 350~410 MPa, a tensile strength of 620~710 MPa, an elongation of 24.0~30.5%, a product of strength and elongation of 17~20.5 GPa % and a strain hardening index $n_{90}$ value greater than 0.20; or the dual-phase steel has a yield strength of 350~405 MPa, a tensile strength of 624~706 MPa, an elongation of 24.4~30.4%, a product of strength and elongation of 17~20.1 GPa % and a strain hardening index $n_{90}$ value greater than 0.20; and/or
in the manufacturing process of the dual-phase steel, a total time of the rapid heat treatment in step 4) is 41~300 s; and in (2):
the dual-phase steel has a tensile strength of ≥780 MPa; and/or
the dual-phase steel has a C content of 0.07~0.1%; and/or
the dual-phase steel has a Si content of 0.1~0.4%; and/or
the dual-phase steel has a Mn content of 1.5%~1.8%; and/or
the microstructure of the dual-phase steel is a dual-phase structure of ferrite and martensite having an average grain size of 2~8 μm; and/or
the dual-phase steel has a yield strength of 400~540 MPa, a tensile strength of 780~880 MPa, an elongation of 19~24.5%, a product of strength and elongation of 19~24.5 GPa % and a strain hardening index $n_{90}$ value greater than 0.20; or the dual-phase steel has a yield strength of 400~533 MPa, a tensile strength of 781~878 MPa, an elongation of 19.5~24.1%, a product of strength and elongation of 16.3~19.3 GPa % and a strain hardening index $n_{90}$ value greater than 0.20; and/or in the manufacturing process of the dual-phase steel, a total time of the rapid heat treatment in step 4) is 41~296s.

13. The low carbon low alloy dual-phase steel with high formability or hot-galvanized dual-phase steel with high formability according to claim 6, wherein:
   in the hot-galvanized dual-phase steel of (1):
   the C content is 0.065~0.085%; and/or
   the Si content is 0.15~0.25%; and/or
   the Mn content is 1.2%~1.35%; and/or
   Cr+Mo+Ti+Nb+V≤0.2%; and/or
   it has a yield strength of 340~410 MPa, a tensile strength of 620~710 MPa, an elongation of 22~30.5%, a product of strength and elongation of 15.5~20.0 GPa % and a strain hardening index $n_{90}$ value greater than 0.21; or the hot-galvanized dual-phase steel has a yield strength of 347~405 MPa, a tensile strength of 624~709 MPa, an elongation of 22.2~30.3%, a product of strength and elongation of 15.7~19.6 GPa % and a strain hardening index $n_{90}$ value greater than 0.21; and
   in the hot-galvanized dual-phase steel of (2):
   it has a yield strength of ≥780 MPa; and/or
   it has a C content of 0.07~0.1%; and/or
   it has a Si content of 0.1~0.4%; and/or
   it has a Mn content of 1.5%~1.8%; and/or
   it has a yield strength of 400~560 MPa, a tensile strength of 790~870 MPa, an elongation of 19.0~25.0%, a product of strength and elongation of 16.0~20.0 GPa % and a strain hardening index n90 value greater than 0.20; or the hot-galvanized dual-phase steel has a yield strength of 400~552 MPa, a tensile strength of 798~862 MPa, an elongation of 19.5~24.6%, a product of strength and elongation of 16.3~19.9 GPa % and a strain hardening index n90 value greater than 0.20.

14. A manufacturing process of low carbon low alloy dual-phase steel with high formability according to claim 1, which comprises the following steps:
   1) Smelting, casting
   wherein the above components are subjected to smelting and casting to form a slab;
   2) hot rolling, coiling
   wherein a hot rolling finishing temperature is ≥$A_{r3}$; and a coiling temperature is 550~680° C.;
   3) Cold rolling
   wherein a cold rolling reduction rate is 40~85%, thereby obtaining a rolled hard strip steel or steel plate;
   4) Rapid heat treatment
   a) Rapid heating
   wherein the strip steel or steel plate after cold rolling is rapidly heated to 750~845° C., wherein the rapid heating is performed in one stage or two stages; when the rapid heating is performed in one stage, a heating rate is 50~500° C./s; when the rapid heating is performed in two stages, the steel plate is heated in the first stage from room temperature to 550~650° C. at a heating rate of 15~500° C./s, heated in the second stage from 550~650° C. to 750~845° C. at a heating rate of 30~500° C./s;
   b) Soaking
   wherein the strip steel or steel plate is soaked at a temperature of 750~845° C., which is the target temperature of the dual phase region of austenite and ferrite, for a soaking time of 10~60 s;
   c) Cooling
   wherein after soaking, the strip steel or steel plate is slowly cooled to 670~770° C. at a cooling rate of 5~15° C./s, then rapidly cooled from 670~770° C. to room temperature at a cooling rate of 50~200° C./s;
   or the strip steel or steel plate is rapidly cooled from 670~770° C. to 230~280° C. at a cooling rate of 50~200° C./s for over-ageing treatment, wherein an over-ageing treating time is less than or equal to 200 s; after over-ageing treatment, it is finally cooled to room temperature at a cooling rate of 30~50° C./s.

15. The manufacturing process by rapid heat treatment of the low carbon low alloy hot-galvanized dual-phase steel with high formability according to claim 1, which comprises the following steps:
   A) Smelting, casting
   wherein the above components are subjected to smelting and casting to form a slab;
   B) Hot rolling, coiling
   wherein a hot rolling finishing temperature is ≥$A_{r3}$; and a coiling temperature is 550~680° C.;
   C) Cold rolling
   wherein a cold rolling reduction rate is 40~85%, thereby obtaining a rolled hard strip steel or steel plate;
   D) Rapid heat treatment, hot-galvanizing
   a) rapid heating
   wherein the strip steel or steel plate after cold rolling is rapidly heated from room temperature to 750~845° C., which is the target temperature of dual phase region of austenite and ferrite, wherein the rapid heating is performed in one stage or two stages;
   when the rapid heating is performed in one stage, a heating rate is 50~500° C./s;
   when the rapid heating is performed in two stages, the strip steel or steel plate is heated in the first stage from room temperature to 550~650° C. at a heating rate of 15~500° C./s, heated in the second stage from 550~650° C. to 750~845° C. at a heating rate of 30~500° C./s (such as 50~500° C./s);
   b) Soaking
   wherein the strip steel or steel plate is soaked at a temperature of 750~845° C., which is the target temperature of the dual phase region of austenite and ferrite, for a soaking time of 10~60 s;
   c) Cooling, hot-galvanizing
   wherein after soaking, the strip steel or steel plate is slowly cooled to 670~770° C. at a cooling rate of 5~15° C./s, then rapidly cooled to 460~470° C. at a cooling rate of 50~150° C./s and immersed in a zinc pot for hot galvanizing;
   d) after hot galvanizing, the strip steel or steel plate is rapidly cooled to room temperature at a cooling rate of 50~150° C./s to obtain a hot dip galvanized GI product; or
   after hot galvanizing, the strip steel or steel plate is heated to 480~550° C. at a heating rate of 30~200° C./s and alloyed for 10~20 s; after alloying, the strip steel or steel plate is rapidly cooled to room temperature at a cooling rate of 30~250° C./s to obtain an alloy galvannealed GA product.

16. The process according to claim 15, which comprises one or more of the following features:
   a total time of the rapid heat treatment and hot-galvanizing of step D) is 30~142s;
   in step B), the coiling temperature is 580~650° C.;
   in step C), the cold rolling reduction rate is 60~80%;
   in step D), when the rapid heating is performed in one stage, the heating rate is 50~300° C./s;
   in step D), the rapid heating is performed in two stages, wherein the strip steel or steel plate is heated in the first stage from room temperature to 550~650° C. at a heating rate of 15~300° C./s, heated in the second stage from 550~650° C. to 750~845° C. at a heating rate of 50~300° C./s;

in step D), the final temperature after rapid heating is 770~830° C.;

in step D), the rapid cooling rate of the strip steel or steel plate is 50~150° C./s;

in the soaking process of step D), after the strip steel or steel plate is heated to the target temperature of dual phase region of austenite and ferrite, the temperature is kept unchanged for soaking;

in the soaking process of step D), the strip steel or steel plate is slightly heated up or cooled down in the soaking time, wherein the temperature after heating is no more than 845° C. and the temperature after cooling is no less than 750° C.;

the soaking time is 10~40 s;

the over ageing time is 20~200 s;

in step D), after alloying, the strip steel or steel plate is rapidly cooled to room temperature at a cooling rate of 30~200° C./s to obtain an alloy galvannealed GA product.

17. The process according to claim 16, wherein in step D):

the rapid heating is performed in two stages, wherein the strip steel or steel plate is heated in the first stage from room temperature to 550~650° C. at a heating rate of 50~300° C./s, heated in the second stage from 550~650° C. to 750~845° C. at a heating rate of 80~300° C./s; and the final temperature after rapid heating is 790~830° C.

18. The process according to claim 14 comprises one or more of the following features:

a total time of the rapid heat treatment of step 4) is 41~300 s;

in step 2), the coiling temperature is 580~650° C.;

in step 3), the cold rolling reduction rate is 60~80%;

in step 4), when the rapid heating is performed in one stage, the heating rate is 50~300° C./s;

in step 4), the rapid heating is performed in two stages, wherein the strip steel or steel plate is heated in the first stage from room temperature to 550~650° C. at a heating rate of 15~300° C./s, heated in the second stage from 550~650° C. to 750~845° C. at a heating rate of 50~300° C./s;

in step 4), the final temperature after rapid heating is 770~830° C.;

in step 4), the rapid cooling rate of the strip steel or steel plate is 50~150° C./s;

in the soaking process of step 4) after the strip steel or steel plate is heated to the target temperature of dual phase region of austenite and ferrite, the temperature is kept unchanged for soaking;

in the soaking process of step 4), the strip steel or steel plate is slightly heated up or cooled down in the soaking time, wherein the temperature after heating is no more than 845° C. and the temperature after cooling is no less than 750° C.;

the soaking time is 10~40 s;

the over ageing time is 20~200 s.

19. The process according to claim 18, wherein a total time of the rapid heat treatment of step 4) is 41~296s;

in step 4), the rapid heating is performed in two stages, wherein the strip steel or steel plate is heated in the first stage from room temperature to 550~650° C. at a heating rate of 50~300° C./s, heated in the second stage from 550~650° C. to 750~845° C. at a heating rate of 80~300° C./s; and/or in step 4), the final temperature after rapid heating is 790~830° C.

* * * * *